United States Patent
Buckley et al.

(10) Patent No.: US 11,297,111 B2
(45) Date of Patent: Apr. 5, 2022

(54) ESTABLISHING A SESSION INITIATION PROTOCOL SESSION

(71) Applicant: BlackBerry Limited, Waterloo (CA)

(72) Inventors: Adrian Buckley, Tracy, CA (US); Andrew Michael Allen, Hallandale Beach, FL (US); Michael Eoin Buckley, Crystal Lake, IL (US)

(73) Assignee: BlackBerry Limited, Waterloo (CA)

( * ) Notice: Subject to any disclaimer, the term of this patent is extended or adjusted under 35 U.S.C. 154(b) by 201 days.

(21) Appl. No.: 15/415,627

(22) Filed: Jan. 25, 2017

(65) Prior Publication Data

US 2017/0134444 A1 May 11, 2017

Related U.S. Application Data

(63) Continuation-in-part of application No. 15/247,065, filed on Aug. 25, 2016, now Pat. No. 9,913,236.
(Continued)

(51) Int. Cl.
*H04L 29/06* (2006.01)
*H04L 29/08* (2006.01)
(Continued)

(52) U.S. Cl.
CPC ........ *H04L 65/1069* (2013.01); *H04L 9/3271* (2013.01); *H04L 63/205* (2013.01);
(Continued)

(58) Field of Classification Search
None
See application file for complete search history.

(56) References Cited

U.S. PATENT DOCUMENTS 8,413,261 B2 4/2013 Nemoy
9,516,620 B1 * 12/2016 Upp .................... H04L 65/1073
(Continued)

FOREIGN PATENT DOCUMENTS

CN 1801815 7/2006
CN 1941739 4/2007
(Continued)

OTHER PUBLICATIONS

Rajavelsamy et al. "Efficient registration procedure for multi-domain authentication for mission critical communication services", 2015 IEEE conf. on CSCN, Oct. 28, 2015 [retrieved on Jun. 17, 2021]. INSPEC Accession No. 15753972, DOI: 10.1109/CSCN.2015.7390458. (Year: 2015).*
(Continued)

*Primary Examiner* — Kevin T Bates
*Assistant Examiner* — Dae Kim
(74) *Attorney, Agent, or Firm* — Fish & Richardson P.C.

(57) ABSTRACT

The present disclosure describes methods and systems for establishing a Session Initiation Protocol Session. One method includes transmitting a first message requesting authentication configuration information; in response to the first message, receiving a second message that includes the authentication configuration information; transmitting a third message that includes authentication information based upon the received authentication configuration information; receiving an authentication challenge request that is formatted according to the second protocol; and in response to receiving the authentication challenge request, transmitting an authentication response to the second network node.

11 Claims, 37 Drawing Sheets

Related U.S. Application Data which is a continuation of application No. 14/788,099, filed on Jun. 30, 2015, now Pat. No. 9,451,421.

(60) Provisional application No. 62/286,739, filed on Jan. 25, 2016.

(51) Int. Cl.
| | | |
|---|---|---|
| *H04L 65/1069* | (2022.01) | |
| *H04L 65/10* | (2022.01) | |
| *H04L 67/02* | (2022.01) | |
| *H04L 65/1016* | (2022.01) | |
| *H04W 4/10* | (2009.01) | |
| *H04L 65/4061* | (2022.01) | |
| *H04M 15/00* | (2006.01) | |
| *H04L 9/32* | (2006.01) | |
| *H04W 12/06* | (2021.01) | |
| *H04W 12/069* | (2021.01) | |
| *H04L 61/4588* | (2022.01) | |
| *H04L 61/50* | (2022.01) | |
| *H04L 101/395* | (2022.01) | |

(52) U.S. Cl.
CPC ...... *H04L 65/1006* (2013.01); *H04L 65/1016* (2013.01); *H04L 65/4061* (2013.01); *H04L 67/02* (2013.01); *H04M 15/57* (2013.01); *H04M 15/63* (2013.01); *H04W 4/10* (2013.01); *H04W 12/068* (2021.01); *H04W 12/069* (2021.01); *H04L 61/1588* (2013.01); *H04L 61/20* (2013.01); *H04L 61/3095* (2013.01); *H04L 2209/42* (2013.01)

(56) References Cited

U.S. PATENT DOCUMENTS

| | | | | |
|---|---|---|---|---|
| 2008/0295157 | A1* | 11/2008 | Wong | H04L 9/32 726/5 |
| 2008/0305794 | A1 | 12/2008 | Mukaiyama | |
| 2010/0263032 | A1 | 10/2010 | Bhuyan et al. | |
| 2013/0081123 | A1* | 3/2013 | Przybysz | H04L 65/1016 726/7 |
| 2013/0091546 | A1* | 4/2013 | Shen | H04L 63/08 726/3 |
| 2013/0174241 | A1* | 7/2013 | Cha | H04L 63/0815 726/7 |
| 2013/0294339 | A1* | 11/2013 | Shi | H04L 65/1016 370/328 |
| 2016/0344726 | A1* | 11/2016 | Stojanovski | H04W 76/14 |
| 2016/0366127 | A1* | 12/2016 | Tanoni | H04L 63/0853 |
| 2017/0289776 | A1* | 10/2017 | Kim | H04W 4/08 |
| 2018/0131730 | A1* | 5/2018 | Leis | H04L 61/3095 |

FOREIGN PATENT DOCUMENTS

| | | |
|---|---|---|
| CN | 1988722 | 6/2007 |
| CN | 101198148 | 6/2008 |
| EP | 1798910 | 6/2007 |
| EP | 1852999 | 11/2007 |
| WO | 2006128373 | 12/2006 |
| WO | 2009148382 | 12/2009 |
| WO | 2010117587 | 10/2010 |
| WO | 2011157302 | 12/2011 |

OTHER PUBLICATIONS

"3GPP TS 22.179 V13.3.0 (Dec. 2015) Technical Specification". 3GPP Organizational Partners, 3gpp.org, Dec. 31, 2015 [retrieved on Nov. 24, 2021], Retrieved from the Internet: <URL: https://www.arib.or.jp/english/html/overview/doc/STD-T63V12_20/5_Appendix/Rel13/22/22179-d30.pdf>. (Year: 2015).*

3rd Generation Partnership Project, 3GPP Standard; 3GPP TR 21.905: "Vocabulary for 3GPP Specifications", No. V12.0.0, Oct. 2014.
3rd Generation Partnership Project, 3GPP Standard; 3GPP TS 23.002: "Network Architecture", No. V12.6.0, Jan. 2015.
3rd Generation Partnership Project, 3GPP Standard; 3GPP TS 23.228: "IP Multimedia (IM) Subsystem—Stage 2", No. V12.8.0, Mar. 2015.
3rd Generation Partnership Project, 3GPP Standard; 3GPP TS 33.203: "Access Security for IP-based Services", No. V12.8.0, Jan. 2015.
3rd Generation Partnership Project, 3GPP Standard; 3GPP TS 31.102: "Characteristics of the USIM application", No. V12.7.0, Apr. 2015.
3rd Generation Partnership Project, 3GPP Standard; 3GPP TS 31.103: "Characteristics of the IP multimedia services identity module (ISIM) application", No. V12.2.0, Oct. 2014.
3rd Generation Partnership Project, 3GPP Standard; 3GPP TS 22.179: "Mission Critical Push to Talk MCPTT", No. V13.1.0, Mar. 2015.
3rd Generation Partnership Project, 3GPP Standard; 3GPP TR 23.779: "Study on architectural enhancements to support Mission Critical Push to Talk over LTE (MCPTT) services", No. V1.0.0, Jun. 17-19, 2015.
3rd Generation Partnership Project, S6-150067: "MCPTT Network Deployment Scenarios", Jan. 26-30, 2015.
Funk and Blake-Wilson, IETF RFC 5281: "Extensible Authentication Protocol Tunneled Transport Layer Security Authenticated Protocol Version 0 (EAP-TTLSv0)", Aug. 2008.
3rd Generation Partnership Project, S6-150073: "Updates to MCPTT Architecture within a PS Ecosystem with User-based Services Application Sublayer", Jan. 26-30, 2015.
3rd Generation Partnership Project, 3GPP Standard; 3GPP TS 24.229: "IP multimedia call control protocol based on Session Initiation Protocol (SIP) and Session Description Protocol (SDP); Stage 3", No. V12.8.0, Apr. 2015.
3rd Generation Partnership Project, 3GPP Standard; 3GPP TS 29.228: "IP Multimedia Subsystem Cx and Dx Interfaces; Signalling flows and message contents", No. V12.5.0, Apr. 2015.
3rd Generation Partnership Project, 3GPP Standard; 3GPP TS 29.229: "Cx Interface based on Diameter—Protocol details", No. V12.5.0, Apr. 2015.
3rd Generation Partnership Project, 3GPP Standard; 3GPP TS 33.402: "3GPP System Architecture Evolution: Security aspects of non-3GPP accesses", No. V12.5.0, Jan. 2015.
3rd Generation Partnership Project, 3GPP Standard; 3GPP TS 24.302: "Access to the 3GPP Evolved Packet Core (EPC) via non-3GPP access networks", No. V12.8.0, Apr. 2015.
3rd Generation Partnership Project, ETSI TS 102 223 V12.0.0: "Smart Cards; Card Application Toolkit", Apr. 2015.
International Telecommunications Union, ITU-T Recommendation X.509 (2005) ISO/IEC 9594-8:2005, "Information technology—Open Systems Interconnection—The Directory: Public-key and attribute certificate frameworks", Aug. 2005.
International Telecommunication Union, ITU-T Recommendation E.164: "The international public telecommunication numbering plan", Nov. 2010.
3rd Generation Partnership Project, 3GPP Standard; 3GPP TS 29.328 "IP Multimedia (IM) Subsystem Sh interface; signalling flows and message contents", No. V12.8.0, Apr. 2015.
Ahoba et al., IETF RFC 4282: "The Network Access Identifier", Dec. 2005.
International Search Report and Written Opinion of the International Searching Authority issued in International Application No. PCT/CA2016/050765 dated Oct. 18, 2016; 8 pages.
3GPP TSG-SA WG6 Meeting #13; S6-161192; 3GPP TR 23.781; BlackBerry UK Ltd.; "Pseudo-CR on Solution—migration—configuration"; Sophia Antipolis, France, Oct. 10-14, 2016.
International Search Report and Written Opinion of the International Searching Authority issued in International Application No. PCT/US2017/014971 dated Apr. 28, 2017; 11 pages.
Communication under Rule 71 (3) EPC issued in European Application No. 17703895.7 dated Jul. 21, 2020, 7 pages.

(56) References Cited

OTHER PUBLICATIONS

Office Action issued in Chinese Application No. 201780019752.4 dated Aug. 20, 2020, 21 pages (With English Translation).
Notice of Allowance issued in Chinese Application No. 201780019752.4 dated Mar. 1, 2021, 5 pages (With Partial English Translation).

* cited by examiner

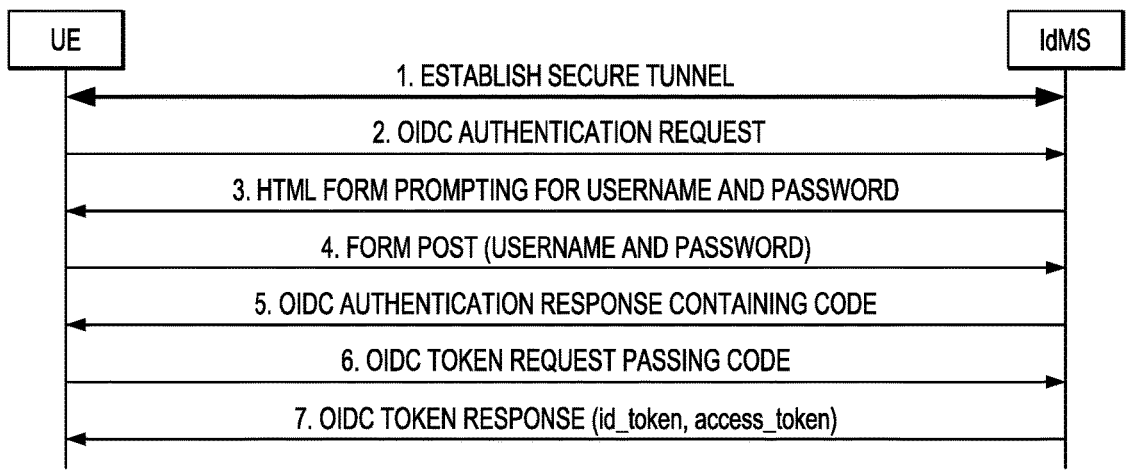

5.5.1 OpenID CONNECT (OIDC) EXAMPLE USING USERNAME/PASSWORD

THE FOLLOWING FIGURE DESCRIBES THE MCPTT USER AUTHENTICATION FRAMEWORK. SPECIFICALLY, IT DESCRIBES THE STEPS BY WHICH AN MCPTT USER AUTHENTICATES TO THE IDENTITY MANAGEMENT SERVER (IdMS), RESULTING IN A SET OF CREDENTIALS DELIVERED TO THE UE UNIQUELY IDENTIFYING THE MCPTT USER'S IDENTITY. THE MEANS BY WHICH THESE CREDENTIALS ARE SENT FROM THE UE TO THE MCPTT SERVICES ARE OUT OF SCOPE OF THIS AUTHENTICATION FRAMEWORK. THE AUTHENTICATION FRAMEWORK SUPPORTS EXTENSIBLE USER AUTHENTICATION SOLUTIONS BETWEEN STEPS 2 AND 5. PASSWORD-BASED USER AUTHENTICATION (ILLUSTRATED IN STEPS 3 AND 4) IS SHOWN AS A MANDATORY TO SUPPORT AUTHENTICATION SOLUTION. OTHER USER AUTHENTICATION SOLUTIONS (RUNNING BETWEEN STEPS 2 AND 5) ARE POSSIBLE BUT NOT DEFINED HERE

| UE | | IdMS |
|---|---|---|
| | 1. ESTABLISH SECURE TUNNEL | |
| | 2. OIDC AUTHENTICATION REQUEST | |
| | 3. HTML FORM PROMPTING FOR USERNAME AND PASSWORD | |
| | 4. FORM POST (USERNAME AND PASSWORD) | |
| | 5. OIDC AUTHENTICATION RESPONSE CONTAINING CODE | |
| | 6. OIDC TOKEN REQUEST PASSING CODE | |
| | 7. OIDC TOKEN RESPONSE (id_token, access_token) | |

OpenID CONNECT (OIDC) EXAMPLE USING USERNAME/PASSWORD

STEP 1: UE ESTABLISHES A SECURE TUNNEL WITH THE IDENTITY MANAGEMENT SERVER (IdMS)

STEP 2: UE SENDS AN OpenID CONNECT AUTHENTICATION REQUEST TO THE IdMS. THE REQUEST MAY CONTAIN AN INDICATION OF AUTHENTICATION METHODS SUPPORTED BY THE UE STEP 3: IdMS SENDS AN HTML FORM TO UE PROMPTING THE USER FOR THEIR USERNAME AND PASSWORD STEP 4: UE SENDS THE USERNAME AND PASSWORD (AS PROVIDED BY THE USER) TO THE IdMS STEP 5: IdMS SENDS AN OpenID CONNECT AUTHENTICATION RESPONSE TO THE UE CONTAINING AN AUTHORIZATION CODE STEP 6: UE SENDS AN OpenID CONNECT TOKEN REQUEST TO THE IdMS, PASSING THE AUTHORIZATION CODE STEP 7: IdMS SENDS AN OpenID CONNECT TOKEN RESPONSE TO THE UE CONTAINING AN id_token AND AN access_token (EACH WHICH UNIQUELY IDENTIFY THE USER OF THE MCPTT SERVICE). THE id_token IS CONSUMED BY THE UE TO PERSONALIZE THE MCPTT CLIENT FOR THE MCPTT USER, AND THE access_token IS USED BY THE UE TO COMMUNICATE THE IDENTITY OF THE MCPTT USER TO THE MCPTT SERVER

2602

```
HTTP/1.1 200 OK
Content-Type: application/json
Cache-Control: no-cache, no-store
Pragma: no-cache {
   "access_token":"SlAV32hkKG",
   "token_type":"Bearer",
   "expires_in":3600,
   "refresh_token":"tGzv3JOkF0XG5Qx2TlKWIA",
   " id_ token":"eyJ0 ... NiJ9.eyJ1c ... I6IjlifX0.DeWt4Qu ... ZXso"
}
```

2604

```
{
   "sub": "248289761001",
   "name": "Jane Doe",
   "given_name": "Jane",
   "family_name": "Doe",
   "preferred_username": "j.doe",
   "email": "janedoe@example.com",
   "picture": "http://example.com/janedoe/me.jpg"
}
```

| Sh-Update | | | |
|---|---|---|---|
| INFORMATION ELEMENT NAME | MAPPING TO DIAMETER AVP | CAT. | DESCRIPTION |
| USER IDENTITY (SEE 7.1) | UserIdentity | M | IMS PUBLIC USER IDENTITY OR PUBLIC SERVICE IDENTITY OR MSISDN FOR WHICH DATA IS UPDATED. SEE SECTION 7.1 FOR THE CONTENT OF THIS AVP |
| ○○○ | ○○○ | ○○○ | ○○○ |
| PRIVATE IDENTITY (SEE 7.6.19) | UserName | C | PRIVATE IDENTITY OF THE USER FOR WHOM THE DATA IS REQUIRED. CHECK TABLE 7.6.1 TO SEE WHEN IT IS APPLICABLE |
| <u>MCPTT USER IDENTITY</u> | <u>MCPTTUserIdentity</u> | <u>O</u> | <u>MCPTT USER IDENTITY</u> |

| DATA ACCESSIBLE VIA Sh INTERFACE | | | | |
|---|---|---|---|---|
| DATA REF. | XML TAG | DEFINED IN | ACCESS KEY | OPERATIONS |
| 0 | RepositoryData | 7.6.1 | DATA REFERENCE + ( IMS PUBLIC USER IDENTITY OR PUBLIC SERVICE IDENTITY ) + SERVICE INDICATION | Sh-Pull Sh-Update Sh-Subs-Notif (NOTE 1, NOTE 3) |
| ○○○ | ○○○ | ○○○ | ○○○ | ○○○ |
| 33 | IMSPrivateUserIdentity | 7.6.25 | DATA REFERENCE + IMS PUBLIC USER IDENTITY | Sh-Pull Sh-Subs-Notif (NOTE 8) |
| <u>34</u> | <u>MCPTTUserIdentity</u> | <u>7.6.26</u> | <u>DATA REFERENCE + IMS PUBLIC USER IDENTITY</u> | <u>Sh-Pull Sh--Update Sh-Push</u> |
| <u>35</u> | <u>MCPTTUserToken</u> | <u>7.6.27</u> | <u>DATA REFERENCE + MCPTTUserIdentity</u> | <u>Sh-Pull Sh--Update Sh-Push</u> |

<u>7.6.26 MCPTTUserIdentity</u>
<u>THIS INFORMATION ELEMENT CONTAINS THE MCPTT USER IDENTITY ASSOCIATED WITH THE IMS PUBLIC USER IDENTITY PRESENT IN THE REQUEST. SEE 3GPP TS 23.003 [37] FOR MCPTT USER IDENTITY DEFINITION.</u>

<u>7.6.27 MCPTTUsertoken</u>
<u>THIS INFORMATION ELEMENT CONTAINS TOKEN THAT WAS ASSIGNED TO THE UE IN THE MCPTT USER AUTHENTICATION PHASE</u>

ONE IMPLEMENTATION IS THAT THE MCPTT SERVER SENDS AN SH-Pull AND INCLUDES THE IMS PRIVATE AND PUBLIC USER IDENTITIES 2a RECEIVED IN STEP 21) IN THE THIRD PARTY REGISTRATION, OPTIONALLY INCLUDES TOKEN RECEIVED IN STEP 21. IN THE SH-Pull MESSAGE THE MCPTT SERVER INCLUDES A "REQUESTED DATA" INFORMATION (SEE TABLE 6.1.1.1 3GPP TS 29.328[35]) AND INCLUDES A REQUEST FOR THE MCPTTUserIdentity AS DEFINED IN TABLE 7.6.1 BELOW

| Sh-Pull | | | |
|---|---|---|---|
| INFORMATION ELEMENT NAME | MAPPING TO DIAMETER AVP | CAT. | DESCRIPTION |
| USER IDENTITY (SEE 7.1) | UserIdentity | M | IMS PUBLIC USER IDENTITY, PUBLIC SERVICE IDENTITY, OR MSISDN OF THE USER FOR WHOM THE DATA IS REQUIRED. SEE SECTION 7.1 FOR THE CONTENT OF THIS AVP |
| ○○○ | ○○○ | ○○○ | ○○○ |
| PRIVATE IDENTITY (SEE 7.6.19) | UserName | C | PRIVATE IDENTITY OF THE USER FOR WHOM THE DATA IS REQUIRED. CHECK TABLE 7.6.1 TO SEE WHEN IT IS APPLICABLE |
| TOKEN | MCPTTToken | C | TOKEN THAT WAS ASSIGNED TO THE UE DURING THE MCPTT USER AUTHENTICATION PHASE |
| MCPTT USER IDENTITY | MCPTTUserIdentity | O | MCPTT USER IDENTITY |

FROM FIG. 28A

| \multicolumn{5}{c}{DATA ACCESSIBLE VIA Sh INTERFACE} |
|---|---|---|---|---|
| DATA REF. | XML TAG | DEFINED IN | ACCESS KEY | OPERATIONS |
| 0 | RepositoryData | 7.6.1 | DATA REFERENCE + ( IMS PUBLIC USER IDENTITY OR PUBLIC SERVICE IDENTITY ) + SERVICE INDICATION | Sh-Pull Sh-Update Sh-Subs-Notif (NOTE 1, NOTE 3) |
| ○○○ | ○○○ | ○○○ | ○○○ | ○○○ |
| 33 | IMSPrivateUserIdentity | 7.6.25 | DATA REFERENCE + IMS PUBLIC USER IDENTITY | Sh-Pull Sh-Subs-Notif (NOTE 8) |
| 34 | MCPTTUserIdentity | 7.6.26 | DATA REFERENCE + IMS PUBLIC USER IDENTITY | Sh-Pull Sh--Update Sh-Push |

7.6.26 MCPTTUserIdentity
THIS INFORMATION ELEMENT CONTAINS THE MCPTT USER IDENTITY ASSOCIATED WITH THE IMS PUBLIC USER IDENTITY PRESENT IN THE REQUEST. SEE 3GPP TS 23.003 [37] FOR MCPTT USER IDENTITY DEFINITION

7.6.27 MCPTTtoken
THIS INFORMATION ELEMENT CONTAINS TOKEN THAT WAS ASSIGNED TO THE UE IN THE MCPTT USER AUTHENTICATION PHASE

| MODIFICATION OF 3GPP TS 29.329[36] |
|---|

6.3.XX MCPTT User-Identity AVP
THE MCPTT USER IDENTITY AVP CONTAINS AN MCPTT USER IDENTITY. THE FORMAT IS THE SAME AS THE Public-Identity AVP AS DEFINED IN SUB-CLAUSE 6.3.15

6.3.XX+1 MCPTT Token AVP
THE MCPTT TOKEN AVP CONTAINS THE MCPTT TOKEN THAT WAS ASSIGNED DURING THE MCPTT USER AUTHENTICATION. THE FORMAT IS

FIG. 28B

| Sh-Pull | | | |
|---|---|---|---|
| INFORMATION ELEMENT NAME | MAPPING TO DIAMETER AVP | CAT. | DESCRIPTION |
| USER IDENTITY (SEE 7.1) | UserIdentity | M | IMS PUBLIC USER IDENTITY, PUBLIC SERVICE IDENTITY, OR MSISDN OF THE USER FOR WHOM THE DATA IS REQUIRED. SEE SECTION 7.1 FOR THE CONTENT OF THIS AVP |
| ⋮ | ⋮ | ⋮ | ⋮ |
| PRIVATE IDENTITY (SEE 7.6.19) | UserName | C | PRIVATE IDENTITY OF THE USER FOR WHOM THE DATA IS REQUIRED. CHECK TABLE 7.6.1 TO SEE WHEN IT IS APPLICABLE |
| MCPTT USER IDENTITY | MCPTTUserIdentity | O | MCPTT USER IDENTITY |

| DATA ACCESSIBLE VIA Sh INTERFACE | | | | |
|---|---|---|---|---|
| DATA REF. | XML TAG | DEFINED IN | ACCESS KEY | OPERATIONS |
| 0 | RepositoryData | 7.6.1 | DATA REFERENCE + ( IMS PUBLIC USER IDENTITY OR PUBLIC SERVICE IDENTITY ) + SERVICE INDICATION | Sh-Pull Sh-Update Sh-Subs-Notif (NOTE 1, NOTE 3) |
| ⋮ | ⋮ | ⋮ | ⋮ | ⋮ |
| 33 | IMSPrivateUserIdentity | 7.6.25 | DATA REFERENCE + IMS PUBLIC USER IDENTITY | Sh-Pull Sh-Subs-Notif (NOTE 8) |
| 35 | userprofile | 7.6.27 | DATA REFERENCE + MCPTT USER IDENTITY | Sh-Pull Sh-Subs-Notif Sh-Push |

7.6.27 userprofile
THIS INFORMATION ELEMENT MAY CONTAIN THE URL LOCATION TO WHERE A USER PROFILE CAN BE FOUND AND OR THE USER PROFILE. IF THE INFORMATION ELEMENT IS EMPTY IT IMPLIES THAT THE REQUESTING ELEMENT IS REQUIRING THIS DATA

FIG. 29

| Sh-Pull RESP ||||
|---|---|---|---|
| INFORMATION ELEMENT NAME | MAPPING TO DIAMETER AVP | CAT. | DESCRIPTION |
| MCPTT USER IDENTITY | MCPTTUserIdentity | O | MCPTT USER IDENTITY |

| DATA ACCESSIBLE VIA Sh INTERFACE |||||
|---|---|---|---|---|
| DATA REF. | XML TAG | DEFINED IN | ACCESS KEY | OPERATIONS |
| 0 | RepositoryData | 7.6.1 | DATA REFERENCE + ( IMS PUBLIC USER IDENTITY OR PUBLIC SERVICE IDENTITY ) + SERVICE INDICATION | Sh-Pull Sh-Update Sh-Subs-Notif (NOTE 1, NOTE 3) |
| ooo | ooo | ooo | ooo | ooo |
| 33 | IMSPrivateUserIdentity | 7.6.25 | DATA REFERENCE + IMS PUBLIC USER IDENTITY | Sh-Pull Sh-Subs-Notif (NOTE 8) |
| 35 | userprofile | 7.6.27 | DATA REFERENCE + MCPTT USER IDENTITY | Sh-Pull Sh-Subs-Notif Sh-Push |

7.6.27 userprofile
THIS INFORMATION ELEMENT MAY CONTAIN THE URL LOCATION TO WHERE A USER PROFILE CAN BE FOUND AND OR THE USER PROFILE. IF THE INFORMATION ELEMENT IS EMPTY IT IMPLIES THAT THE REQUESTING ELEMENT IS REQUIRING THIS DATA

FIG. 30

6.3.X userprofile AVP
THE userprofile AVP IS OF TYPE GROUPED. THIS AVP CONTAINS INFORMATION TO ASSIST THE MCPTT SERVER IN OBTAINING USER DATA THAT IS REPRESENTED VIA AN XML DOCUMENT
AVP FORMAT
    Server-Capabilities ::=<AVP header: abcd>
        [URI]
        [XMLdocument]
        [AVP]

6.3.X+1 URI AVP
THE URI AVP IS OF TYPE UTF8String. THIS AVP CONTAINS AN IDENTIFIER THAT HELPS THE MCPTT SERVER TO IDENTIFY THE LOCATION OF A USER PROFILE

SECOND EMBODIMENT

THE URI AVP IS OF TYPE GROUPED. THIS AVP CONTAINS INFORMATION SO THAT THE MCPTT CAN CONSTRUCT AN IDENTIFIER THAT HELPS THE MCPTT SERVER TO IDENTIFY THE LOCATION OF A USER PROFILE
AVP FORMAT
    Server-Capabilities ::=<AVP header: abcd>
        [URI]
        [Version]
        [Lifetime]
        [type]
        [size]
        [purpose]
        [AVP]

6.3.X+2 URI AVP
THE URI AVP IS OF TYPE UTF8String. THIS AVP CONTAINS AN IDENTIFIER THAT HELPS THE MCPTT SERVER TO IDENTIFY THE LOCATION OF A USER PROFILE. HTTP URI SPECIFICATIONS MUST CONFORM TO RFC 2396 [7]

FOR EXAMPLE:
    URL="https://www.example.com/UserProfile/user-role-ID/contact-list"

FROM FIG. 31A

6.3.X+3 VERSION AVP
THE VERSION AVP IS OF TYPE UTF8String. THIS AVP CONTAINS AN IDENTIFIER THAT HELPS THE MCPTT SERVER TO IDENTIFY THE VERSION OF THE USER PROFILE REFERENCED BY URI AVP. THE SYNTAX OF THIS HEADER IS DEFINED IN RFC 2045[39]

FOR EXAMPLE:

<4232423424@www.example.com>

6.3.X+4 LIFETIME AVP
THE LIFETIME AVP IS OF TYPE UTF8String. THIS AVP CONTAINS AN IDENTIFIER THAT HELPS THE MCPTT SERVER TO IDENTIFY WHEN THE USER PROFILE REFERENCED BY URI AVP IS VALID AND ACCESSIBLE. THE FORMAT OF THIS EXPIRATION PARAMETER IS AN RFC 1123[40] DATE-TIME VALUE

FOR EXAMPLE:

"Mon, 24 June 2002 09:00:00 GMT"

6.3.X+5 TYPE AVP
THE TYPE AVP IS OF TYPE UTF8String. THIS AVP CONTAINS AN IDENTIFIER THAT HELPS THE MCPTT SERVER TO IDENTIFY THE TYPE OF A USER PROFILE REFERENCED BY URI AVP. VALUES INCLUDE: JPEG, PNG, SDP, CODEC, BOOK

6.3.X+6 SIZE AVP
THE SIZE AVP IS OF TYPE UTF8String. THIS AVP CONTAINS AN IDENTIFIER THAT HELPS THE MCPTT SERVER TO IDENTIFY THE SIZE OF A USER PROFILE REFERENCED BY URI AVP. THE SIZE IS A NUMERIC VALUE THAT IDENTIFIES THE NUMBER OF BYTES

6.3.X+7 PURPOSE AVP
THE PURPOSE AVP IS OF TYPE UTF8String. THIS AVP CONTAINS AN IDENTIFIER THAT HELPS THE MCPTT SERVER TO IDENTIFY THE PURPOSE OF A USER PROFILE REFERENCED BY URI AVP. VALUES INCLUDE: RENDER

FIG. 31B

| Sh-Subs-Notif |||||
|---|---|---|---|---|
| INFORMATION ELEMENT NAME | MAPPING TO DIAMETER AVP | CAT. | DESCRIPTION ||
| USER IDENTITY (SEE 7.1) | UserIdentity | M | IMS PUBLIC USER IDENTITY OR PUBLIC SERVICE IDENTITY OR MSISDN FOR WHICH DATA IS UPDATED. SEE SECTION 7.1 FOR THE CONTENT OF THIS AVP ||
| ○ ○ ○ | ○ ○ ○ | ○ ○ ○ | ○ ○ ○ ||
| PRIVATE IDENTITY (SEE 7.6.19) | UserName | C | PRIVATE IDENTITY OF THE USER FOR WHOM THE DATA IS REQUIRED. CHECK TABLE 7.6.1 TO SEE WHEN IT IS APPLICABLE ||
| <u>MCPTT USER IDENTITY</u> | <u>MCPTTUserIdentity</u> | <u>O</u> | <u>MCPTT USER IDENTITY</u> ||
| DATA ACCESSIBLE VIA Sh INTERFACE |||||
| DATA REF. | XML TAG | DEFINED IN | ACCESS KEY | OPERATIONS |
| 0 | RepositoryData | 7.6.1 | DATA REFERENCE + ( IMS PUBLIC USER IDENTITY OR PUBLIC SERVICE IDENTITY ) + SERVICE INDICATION | Sh-Pull Sh-Update Sh-Subs-Notif (NOTE 1, NOTE 3) |
| ○ ○ ○ | ○ ○ ○ | ○ ○ ○ | ○ ○ ○ | ○ ○ ○ |
| <u>35</u> | <u>userprofile</u> | <u>7.6.27</u> | <u>DATA REFERENCE + MCPTT USER IDENTITY</u> | Sh-Pull Sh-Subs-Notif <u>Sh-Push Sh-Notif</u> |

<u>7.6.27 userprofile</u>
<u>THIS INFORMATION ELEMENT CONTAINS THE MCPTT USER IDENTITY ASSOCIATED WITH THE IMS PUBLIC USER IDENTITY PRESENT IN THE REQUEST. SEE 3GPP TS 23.003 [37] FOR MCPTT USER IDENTITY DEFINITION</u>

FIG. 32

HTTP/XCAP GET REQUEST (MCPTT SERVER TO MCPTT USER DATABASE)
GET https://xcap.example.com/UserProfile/user-role-ID/MCPTT-User-A.xml HTTP/1.1
User-Agent: IMS subscriber
Date: Thu, 08 Jan 2004 11:13:17 GMT
Content-Length: 0

XCAP 200 (OK) RESPONSE (MCPTT USER DATABASE TO MCPTT SERVER)
HTTP/1.1 200 OK
Server: Apache/1.3.22 (Unix) mod_perl/1.27
Etag: "askdajdsaj"
Date: Thu, 08 Jan 2016 11:50:35 GMT
Content-Type:application/resource-lists+xml
Content-Length: (...)

```
<?xml version="1.0" encoding="UTF-8"?>
    <resource-lists xmlns="urn:ietf:params:xml:ns:resource-lists"
        xmlns:cp="urn:ietf:params:xml:ns:copycontrol">
            <list>
                <entry uri="sip:bill@example.com" cp:copyControl="to" />
                <entry uri="sip:randy@example.net" cp:copyControl="to" />
                <entry uri="sip:eddy@example.com" cp:copyControl="to" />
                <entry uri="sip:joe@example.org" cp:copyControl="to" />
                <entry uri="sip:carol@example.net" cp:copyControl="to" />
                <entry uri="sip:ted@example.net" cp:copyControl="to" />
                <entry uri="sip:andy@example.com" cp:copyControl="to" />
            </list>
    </resource-lists>
```

FIG. 33

XCAP 200 (OK) RESPONSE (MCPTT USER DATABASE TO MCPTT SERVER)

```
HTTP/1.1 200 OK
Server: Apache/1.3.22 (Unix) mod_perl/1.27
Etag: "askdajdsaj"
Date: Thu, 08 Jan 2016 11:50:35 GMT
Content-Type:application/contact-lists+xml
Content-Length: (...)

<?xml version="1.0" encoding="UTF-8"?>
    <contact-list uri=https://xcap.example.com/UserProfile/user-role-ID/contact-list"/>
```

FIG. 34

NETWORK STORED DIRECTORY OF CONTACTS

```
<?xml version="1.0" encoding="UTF-8"?>
    <resource-lists xmlns="urn:ietf:params:xml:ns:resource-lists"
        xmlns:cp="urn:ietf:params:xml:ns:copycontrol">
        <list>
            <entry uri="sip:bill@example.com" cp:copyControl="to" />
            <entry uri="sip:randy@example.net" cp:copyControl="to" />
            <entry uri="sip:eddy@example.com" cp:copyControl="to" />
            <entry uri="sip:joe@example.org" cp:copyControl="to" />
            <entry uri="sip:carol@example.net" cp:copyControl="to" />
            <entry uri="sip:ted@example.net" cp:copyControl="to" />
            <entry uri="sip:andy@example.com" cp:copyControl="to" />
        </list>
    </resource-lists>
```

FIG. 35

ESTABLISHING A SESSION INITIATION PROTOCOL SESSION

CROSS REFERENCE TO RELATED APPLICATIONS

This application claims the benefit of priority of U.S. Application Ser. No. 62/286,739, filed on Jan. 25, 2016, which is hereby expressly incorporated by reference herein in its entirety. This application is also a continuation-in-part of the U.S. Non-Provisional application Ser. No. 15/247,065, filed on Aug. 25, 2016, which is a continuation of U.S. Non-Provisional application Ser. No. 14/788,099, filed Jun. 30, 2015, both of which are hereby expressly incorporated by reference herein in their entireties.

FIELD OF THE DISCLOSURE

The present disclosure relates to an internet protocol (IP) multimedia subsystem (IMS), and in particular relates to the validation of identities in an IMS network.

BACKGROUND

The IP multimedia subsystem is an architectural framework for providing packet data to mobile devices in a standardized fashion. Such IMS network allows for voice calls over a packet system rather the circuit switched system. It allows for other functionalities such as push to talk (PTT), and in particular, mission critical push to talk (MCPTT) used for first responders.

IMS authentication authenticates both a private identifier and a public identifier for use on the IMS network. However, the IMS authentication does not allow different individual IMS public user identities to be separately authenticated with the same or different IMS private user identities. This can lead to problems in various situations. For example, if used by first responders, a MCPTT application may need a device to be authenticated by a different public identity than that tied to the private identity of the device.

BRIEF DESCRIPTION OF THE DRAWINGS

The present disclosure will be better understood with reference to the drawings, in which:

FIG. 25 illustrates an example process for obtaining the tokens according to an implementation.

FIG. 26 illustrates example codes for obtaining the token, according to an implementation.

FIGS. 27-32 illustrate example implementations using the 3GPP Sh interface.

FIGS. 33-34 illustrate example messages, according to an implementation.

FIG. 35 illustrates an example contact list, according to an implementation.

DETAILED DESCRIPTION OF THE DRAWINGS

Figure 1:
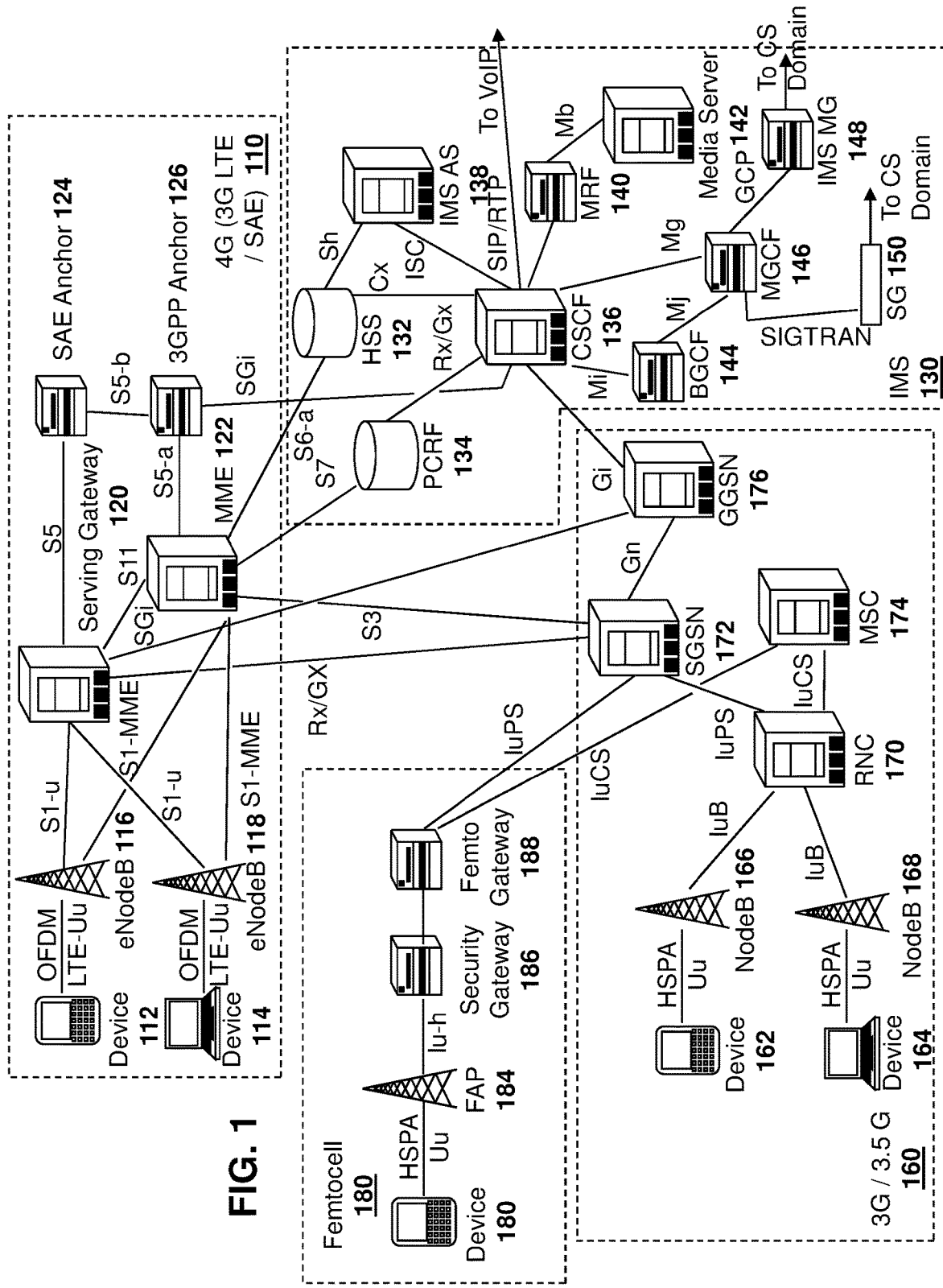
FIG. 1 is a block diagram of an example IMS network.

The present disclosure provides a method at a user equipment for registering with a third network node using an internet protocol (IP) multimedia subsystem (IMS), the method comprising: creating a tunnel between the user equipment and a first network node; authenticating a first public identity associated with the user equipment to the first network node; receiving configuration information from the first network node with a second private user identifier and a second public user identifier, the second private user identifier and second public user identifier being associated with a second network node; and registering with a third network node using the second private user identifier and the second public user identifier.

The present disclosure further provides a user equipment configured for registering with a third network node using an internet protocol (IP) multimedia subsystem (IMS), the user equipment comprising: a processor; and a communications subsystem, wherein the user equipment is configured to:

create a tunnel between the user equipment and a first network node; authenticate a first public identity associated with the user equipment to the first network node; receive configuration information from the first network node with a second private user identifier and a second public user identifier, the second private user identifier and second public user identifier being associated with a second network node; and register with a third network node using the second private user identifier and the second public user identifier.

The present disclosure further provides a method at first network node configured for authentication between a user equipment and a third network node using an internet protocol (IP) multimedia subsystem (IMS), the method comprising: establishing a tunnel with the user equipment; authenticating a first public identity of the user equipment at first network node; receiving a configuration information message from the user equipment, the configuration information message including a network identifier for a network the user equipment is registered on; obtaining, from a second network node, a second private user identifier and second public user identifier; and providing the second private user identifier and second public user identifier to the user equipment.

The present disclosure further provides a first network node configured for authentication between a user equipment and a third network node using an internet protocol (IP) multimedia subsystem (IMS) the first network node comprising: a processor; and a communications subsystem, wherein the first network node is configured to: establish a tunnel with the user equipment; authenticate a first public identity of the user equipment at first network node; receive a configuration information message from the user equipment, the configuration information message including a network identifier for a network the user equipment is registered on; obtain, from a second network node, a second private user identifier and second public user identifier; and provide the second private user identifier and second public user identifier to the user equipment.

The present disclosure relates generally to authentication in IMS systems. In one aspect of such authentication, the use of the IMS system with regard to MCPTT is discussed below. However, this is not the only use of the IMS network and IMS authentication could equally be used for separate or different applications. The use of MCPTT below is therefore meant to be illustrative only.

One example of a deficiency of IMS authentication is illustrated with regard to MCPTT. MCPTT is utilized, for example, by first responders, and has various requirements. These may include, but are not limited to, that any user should be able to pick up any device and use it. Thus, if a fire station has a number of devices that are not individually assigned, but are provided to users on an as needed basis, any firefighter should be able to pick up any of the devices that are available and utilize such device.

MCPTT may further require that authentication of the MCPTT application on a device needs to be independent of the cellular/IMS network in order to meet security requirements of the public safety service provider and public safety users.

In a third aspect, MCPTT may need to be capable of hiding or obscuring the identity or role of a user who is using the device. For example, in the case where the first responder is a police officer, in some situations it may be desirable to protect the confidentiality of the identity of that police officer when using the MCPTT application. The obscuring may need to include obscuring a true public identity from a carrier or network operator.

Given the three aspects described above, and the way that IMS authentication works as described below, IMS authentication does not provide for compatible functionality with MCPTT. Specifically, the current IMS method of authentication is based on an IMS private user identity, and does not allow for different individual IMS public user identities to be separately authenticated with the same or different IMS private user identity. Thus, for example, if a first user and a second user use the same mobile device in a non-concurrent way, then the system is unable to differentiate who the user is and hence unable to authenticate the two users differently and is incapable of denying one access while granting the other access. Thus the present disclosure provides for a method and system for authenticating both the device and the user and then providing for a determination if a user should be allowed to use the device or not.

As used herein, the terms private identifier and private user identifier may be used interchangeably.

In accordance with the disclosure below, various solutions to the above problem are provided. In particular, the present disclosure describes various in band solutions, which utilize current IMS authentication messaging to piggy back a separate public identity verification. Other solutions described below include out of band solutions which provide for the verification of a public identity utilizing messaging outside of regular IMS authentication. Further, various keying based on a public user identity are provided which may be used in either the in band or out of band signaling solutions described below. One skilled in the art will appreciate that these in band, out of band and keying based on public user identity can be combined in numerous ways to result in additional embodiments.

In one aspect of the embodiments described below, the user identity of a particular user may be obscured in a system, and various solutions are provided for the obscuring of a public identity.

Reference is now made to FIG. 1, which shows an overview of an example IMS network attached to a 4th Generation (4G) network. The example of FIG. 1 is merely meant to illustrate various components within a network architecture. The embodiment of FIG. 1 is not limiting and real networks will have some or all of the components, along with additional components, in most cases.

Further, as described below, each of the elements may be considered to be a logical block. That is, the functionality of elements may be combined onto one server. Further, the functionality of a single element may be split over multiple physical servers and the present disclosure is not limited to the use of any particular physical architecture.

In the example of FIG. 1, a 4th Generation (4G) network 110 may utilize an IMS network 130 to provide for standardized packet data communications. In particular, 4G network 110 may be a third generation (3G) long term evolution (LTE) or system architecture evolution (SAE) network in which a device 112 or a device 114 may communicate. Devices 112 and 114 may be any device that is capable of communicating over a cellular network, and may include, for example, a user equipment (UE), a mobile device, a smartphone, a laptop, a tablet, or any other data capable device.

Device 112 communicates through an evolved Node-B (eNB) 116 utilizing orthogonal frequency division multiplexing (OFDM), communication over an LTE-Uu interface.

Similarly, device 114 communications with eNB 118 over an LTE-Uu interface.

Each of eNBs 116 and 118 communicate with two entities, namely serving gateway 120 and mobility management entity (MME) 122. MME 122 is responsible for idle mode UEs paging and is also responsible for choosing a serving gateway 120 when a UE moves into a connected mode.

Serving gateway 120 routes and forwards packets from devices 112 and 114.

The serving gateway 120 communicates with SAE anchor 124. SAE anchor 124 is a functional entity that anchors the user plane for mobility between the $3^{rd}$ Generation Partnership Project (3GPP) access stratum and non-3GPP access stratum for systems such as the Institute for Electrical and Electronics Engineers (IEEE) 802.11 (Wi-Fi), among other non-3GPP access systems.

MME 122 communicates with a 3GPP anchor 126. 3GPP anchor 126 is a functional entity that anchors the user plane for mobility between second generation and third generation access stratum and the LTE access system.

IMS network 130 may communicate with 4G network 110 through various logical entities. In a first aspect, MME 122 may communicate with a home subscriber server (HSS) 132. HSS 132 is a database that contains the subscriber's profile including identities and what services they have subscribed to, and that provides location functionality as well as an authentication database.

MME 122 may also communicate with the policy and charging rules function (PCRF) server 134. The PCRF 134 is an element within the IMS network that controls both the policies of subscribers as well as the amounts charged to such subscribers.

The PCRF 134 and the HSS 132, as well as 3GPP anchor 126, may communicate with the call server control function (CSCF) 136 of IMS network 130. CSCF 136 provides several session initiation protocol (SIP) servers or proxies that are used to process SIP signaling packets in the IMS network 130.

In particular, CSCF 136 may include various logical entities including a proxy call session control function (P-CSCF), which is the first point of entry into the IMS network. Further, a serving call session control function (S-CSCF) handles sessions in the network and routes SIP messages to appropriate P-CSCFs as well as IMS application servers (IMS AS). Further, CSCF 136 may include an interrogating call session control function (I-CSCF) that is used as an entry point to find a subscriber in the network and assist in assigning an S-CSCF when a subscriber registers in the network.

IMS application server (AS) 138 is an application server that has the logic and software which executes services for an IMS subscriber. IMS network 130 may have between 0 and many of these IMS AS 138 in the network. CSCF 136 may provide output to voice-over IP services (VOIP), as shown in the example of FIG. 1.

CSCF 136 may further communicate with a media resource function (MRF) 140, which provides media related functions such as media manipulation. MRF 140 may further be connected to a media server 142.

CSCF 136 may be connected with a breakout gateway control function (BGCF) 144, which allows for the processing of SIP requests from an S-CSCF when domain name server (DNS) routing cannot be used.

Both CSCF 136 and BGCF 144 may communicate with a media gateway control function (MGCF) 146, which is in communication with an IMS media gateway (IMS MG) 148 to allow access to a circuit switched domain.

Further, MGCF 146 may communicate with a signaling gateway (SG) 150, which may also allow for communications with a circuit switched domain.

In certain circumstances, besides a 4G network 110, a 3G network or 3.5G network 160 may be utilized. In this case, devices 162 or 164 may communicate with node-B 166 and node-B 168 respectively, utilizing high speed packet access (HSPA) over a Uu interface.

Both node-Bs 166 and 168 communicate with a radio network control (RNC) 170, which controls the node-Bs that are connected to RNC 170.

RNC 170 communicates with a serving general packet radio service (GPRS) support node (SGSN) 172, which is responsible for delivering packets to and from mobile stations that are in the geographical location of the SGSN 172. RNC 170 further communicates with mobile switching center (MSC) 174 which controls network switching elements.

SGSN 172 may be connected to a gateway GPRS support node (GGSN) 176. SGSN 172 further communicates with MME 122 and with serving gateway 120 in a 4G network for transferring devices between the 4G and the 3G networks.

GGSN 176 may further utilize the IMS network 130 through CSCF 136.

In the embodiment of FIG. 1, a femtocell 180 is further provided. In this example, a device 182 communicates with a femtocell access point 184 over a high speed packet access link.

Femtocell 180 may include a security gateway 186 as well as a femtogateway 188. Femtogateway 188 may then communicate with SGSN 172 and MSC 174 in 3G network 160.

As indicated above, FIG. 1 is meant to merely show elements of the communications utilizing an IMS network 130 and other examples and network architectures are therefore possible.

IMS Authentication

As indicated above, a device such as device 112, 114, 162, 164 or 180 from FIG. 1 above, may wish to authenticate with the IMS network 130. Currently, authentication includes first registering with the network. The IMS registration is independent of the underlying access network, allowing for access agnostic services to be standardized.

When the user registers with the network, a security association is created between the network and the IMS device. This allows the user to use an IMS service that they have subscribed to, and to also protect data by setting up an internet protocol security (IPSec) tunnel between the device and the P-CSCF.

As described below, an IMS device will be referred to as a SIP User Agent (UA). However, this is not limiting and any device could be utilized.

A SIP UA is a logical entity that implements the client SIP functionality. Some implementations of the SIP UA can be wireless or fixed, such as but not limited to set-top boxes, laptops, desktops etc. The SIP UA provides two identities to the network. A first is a private IMS identity, known as the IMS private identity (IMPI) and the other is known as the public user identity, referred to as the IMS public identity (IMPU).

The public identity is the identity that may be used to contact the user. The IMPI is the identity which is used to authenticate the SIP UA and grant access to the IMS system. The IMPI is stored in the HSS 132 in the home operator's network, and may be derived from the international subscriber identity (IMSI) stored on the universal subscriber identity module (USIM) or may be stored in the IMS subscriber identity module (ISIM).

The above is described, for example, in the Third Generation Partnership Project (3GPP) Technical Specification (TS) 33.203, "3G security; Access security for IP-based services", v.12.8.0, December 2012, the contents of which are incorporated herein by reference.

Section 6.1 of this technical standard deals with the authentication and key agreement (AKA). In particular, as described in Section 6.1.0, the IMS AKA achieves mutual authentication between the ISIM if present, else the USIM, and the home network (HN). The identity used for authenticating a subscriber is the private identity, IMPI, which has the form of a network access identifier (NAI), as described, for example in 3GPP TS 23.228 which is in a format as described in RFC 4282. The HSS and the ISIM/USIM share a long-term key associated with the IMPI.

Further, as described in Section 6.1.1 of the 3GPP TS 33.203 specification, before a user can get access to the IM services at least one IMPU needs to be registered and the IMPI authenticated in the IMS at an application level. The IMPI is also therefore used to identify the HSS where the subscription profile is stored.

Both the IMPI and the IMPU can be changed on the USIM/ISIM using Over The Air (OTA) functionality. This OTA functionality allows an operator to change data items on ISIM/USIM.

If the hardware associated with the SIP UA functionality is used to access a 3GPP system, there will also be a universal integrated circuit card (UICC). The UICC contains applications such as a USIM application and possibly an ISIM application. The USIM and ISIM applications contain identities and authentication algorithms to access the 3GPP network.

The USIM contains the IMSI and the authentication mechanism, which is called 3GPP AKA. The ISIM contains the private identity in the form of a username@domain and the public user identity is also in same form. The ISIM also contains an authentication mechanism called IMS AKA, but the output of the algorithm is different.

Authentication of a SIP UA is therefore performed using the IMPI. The IMPI used for authentication can be likened to that of the IMSI and can be either obtained from the ISIM Private Identity; or derived from the USIM IMSI if the ISIM is not present or does not have an IMPI stored on it.

The IMPI along with an IMPU, is sent in a SIP REGISTRATION message to the network. The network, based on the IMPI used in conjunction with the AKA mechanism, will send back a number of authentication vectors. These are, for example, described in 3GPP TS 33.203 in Section 6.1.1.

Figure 2:
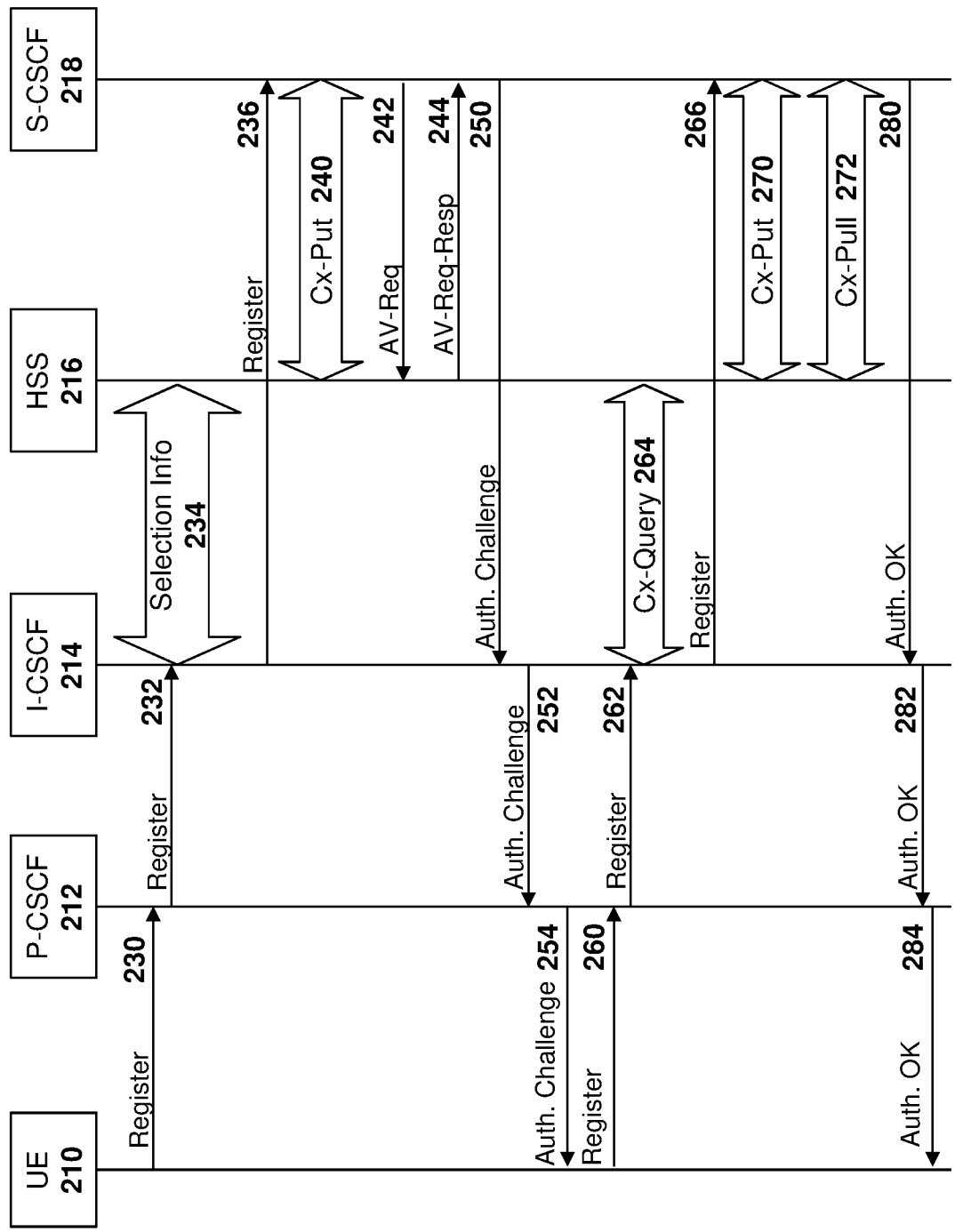
FIG. 2 is a data flow diagram showing authentication of an IM-subscriber.

Reference is now made to FIG. 2. In particular, as seen in FIG. 2, the UE 210 sends a SIP registration message 230 to the P-CSCF 212. The SIP registration message is then forwarded to the I-CSCF 214 as message 232. I-CSCF 214 then chooses the HSS 216 and the S-CSCF 218 for the registration message, as shown by block 234 and message 236.

A challenge is then sent back to the UE and the registration occurs based on the challenge. In particular, the S-CSCF performs a PUT with HSS 216, as shown by block 240, and then sends an AV-request to HSS 216, shown by message 242. An AV-request-response 244 is received from HSS 216 at S-CSCF 218.

S-CSCF 218 then sends the authentication challenge to I-CSCF 214 in message 250. The authentication challenge is forwarded to P-CSCF 212 in message 252 and then to UE 210 in message 254.

The response to the challenge is in the form of a vector with regard to the IMSI and the response is then sent back to the HSS and S-CSCF which may then confirm whether or not the authentication is okay. Specifically, the response is register message 260, which is sent from UE 210 to P-CSCF 212. The response is then forwarded in message 262 to I-CSCF 214. I-CSCF 214 performs a Cx-Query, shown by block 264, with HSS 216, and then forwards the response to S-CSCF 218 as shown by message 266.

S-SCSF 218 then verifies the response with HSS 216, shown with Cx-Put block 270 and Cx-Pull block 272. If the authentication is successful, a success message 280 is sent from S-CSCF 218 to I-CSCF 214. The success message is then forwarded as message 282 to P-CSCF 212, and as message 284 to UE 210.

The IMS also allows more than one public user identity to be associated with the private user identity. In fact the public user identity can be associated with many private user identities as shown, for example, with regard to FIG. 3.

Figure 3:
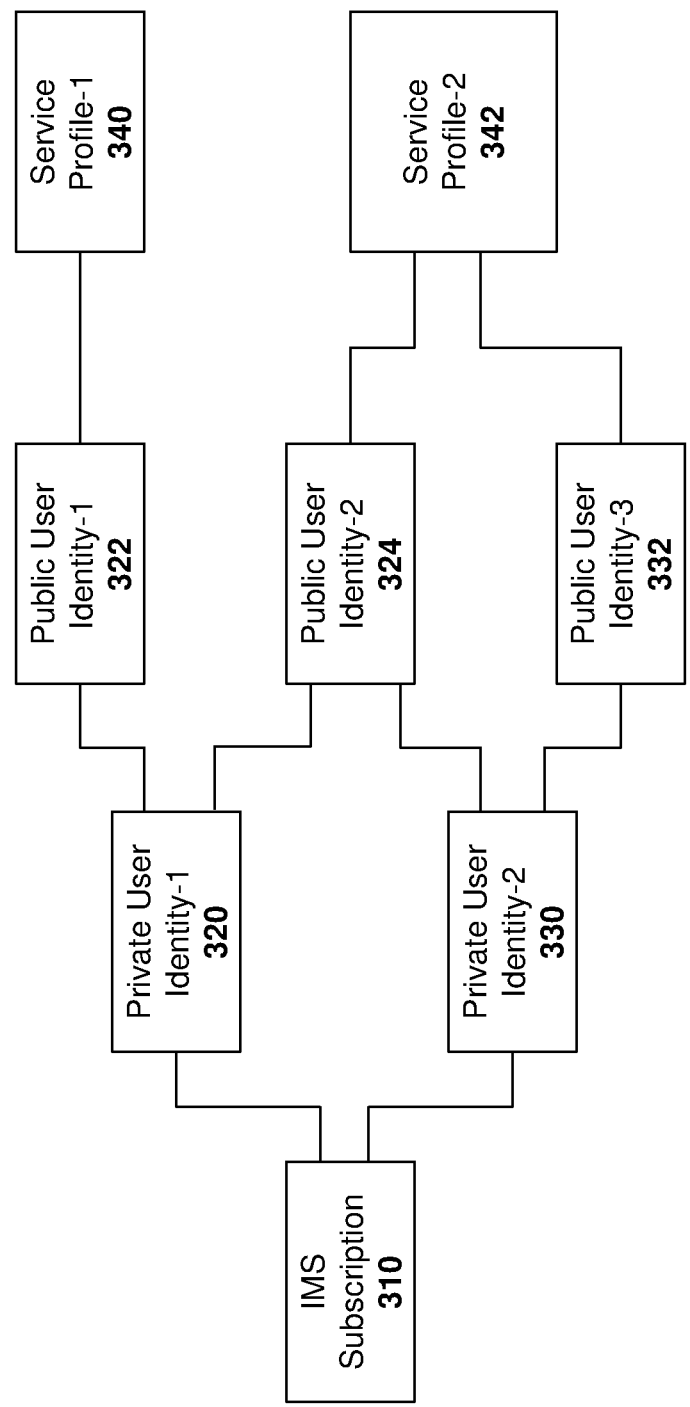
FIG. 3 is a block diagram showing an association between private and public user identities in an IMS system.
Figure 4:
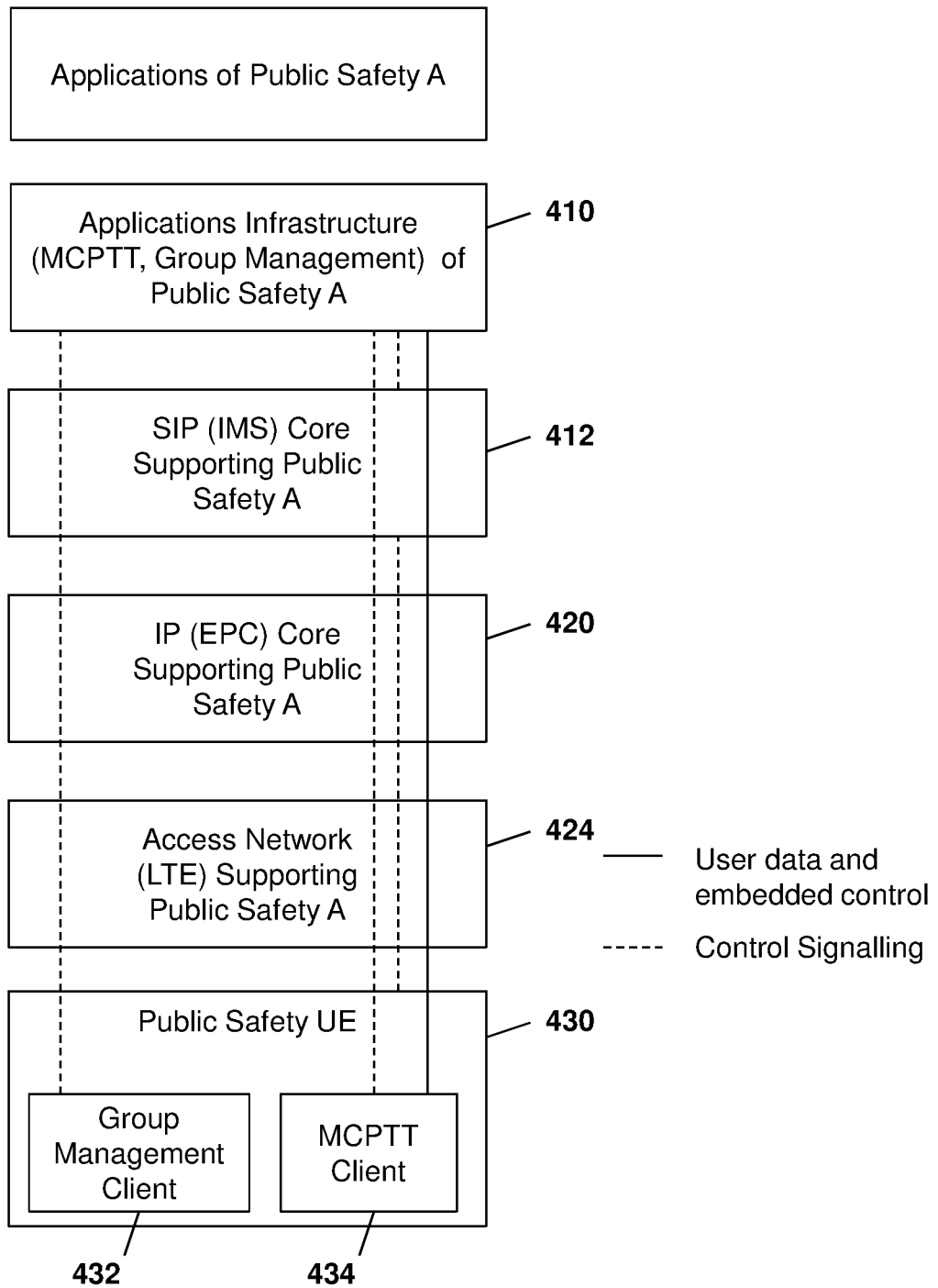
FIG. 4 is a block diagram showing signaling between a public safety operator and a public safety UE, including various network elements.

FIG. 3 is a reproduction of Figure 4.6 of 3GPP TS 23.228, "IP Multimedia Subsystem (IMS); Stage 2", v.13.2.0, March 2015, the contents of which are incorporated here by reference. In particular, as seen as in FIG. 3, an IMS subscription 310 includes two private user identities 320 and 330. Private user identity 320 includes two public user identities, namely public user identity 322 and 324.

Private user identity 330 further includes public user identity 324 as well as public user identity 332.

Public user identity 322 is associated with a service profile 340 and public user identity 324 and public user identity 332 share a service profile 342.

Thus, as seen in FIG. 3, the IMS subscription may have various private user identities and public user identities that are associated with one or more of the private user identities.

There is no authentication associated with public user identities 322, 324 or 332. Policing of what user identity can be used by the UE is performed by the HSS downloading via S-CSCF into the P-CSCF the public user identities that can be used by the device. When the device originates a session, the P-CSCF will ensure only valid public user identities are used.

When the IMPU is registered with the IMS network, the HSS will download to the S-CSCF a service profile. Service profile such as service profile 340 or 342 from FIG. 3, describe under what circumstances the IMS application servers should be involved in a call/session. For example, the servers may be involved in the execution of services associated with the public user identity and will be controlled by the S-CSCF.

As identified above, the IMS authentication mechanism is called IMS AKA. IMS also allows for other authentication schemes to be supported including, but not limited to, SIP Digest, Transport Layer Security (TLS), GPRS-IMS-Bundled Authentication (GIBA). Network Access Subsystem (NASS)-IMS bundled authentication is also allowed to be used for authentication from either a fixed specific location or for early IMS deployments where IMS AKA is not available. GPRS IMS Bundled Authentication is another variant of NASS-IMS bundled, and is used for early IMS deployments. Such authentication schemes are, for example, described in 3GPP TS 33.203 in Sections N.1, O.1.1, R.1, and T.1.

However, there is no way to verify the public user identity. This presents issues in certain applications. For example, one application that this may present an issue with is mission critical push to talk (MCPTT), which is described below.

Mission Critical Push to Talk

Mission critical push to talk is a push to talk service used for mission critical type operations such as emergency services. However, it may also extend to commercial users including utilities, taxi cabs, among others. In some cases, MCPTT may be used anywhere that private mobile radio (PMR) systems are present today.

The MCPTT 3GPP service is described in 3GPP TS 22.179, "Mission Critical Push to Talk (MCPTT) over LTE; Stage 1", v. 13.1.0, March 2015, the contents of which are incorporated herein by reference.

As described in Section 4.5 of this specification:

The MCPTT Service supports MCPTT User Profiles. The MCPTT User Profile contains important information related to the MCPTT User receiving the MCPTT Service, including the MCPTT User identity, which is globally unique and independent of the mobile subscriber identity (IMSI) assigned by a 3GPP network operator. Part of the content of the MCPTT User Profile (e.g., containing some display preferences, some UE audio settings, some address books) can be set/modified/updated by the MCPTT User, but significant portions might be set/modified/updated only by authorized persons. The MCPTT User Profile is stored permanently in database(s) associated with the infrastructure providing the MCPTT Service. Relevant parts of the profile might be downloaded to and cached temporarily or permanently on certain MCPTT Ues. When stored on an MCPTT UE, the MCPTT User Profile associated with an MCPTT User might be confidentiality and integrity protected, with the information available only to a trusted application client associated to the MCPTT User, upon authentication. The MCPTT User Profile information can be synchronized automatically or on demand between the cache on the MCPTT UE and the main copy held in the database(s) of the MCPTT Service infrastructure. The MCPTT User Profile is part of the MCPTT application service domain and forms the basis of MCPTT application layer security and identifies an MCPTT User to the MCPTT Service.

Each MCPTT User has at least one MCPTT User Profile, and possibly several. Typically, one of the MCPTT User Profiles is designated as the default MCPTT User Profile, to be used unless an MCPTT User Profile is explicitly selected. In general, a user profile is associated with a specific device, with a specific mode of operation (i.e., on the network or off the network) and/or with a specific situation (e.g., user being off-duty, in a certain city, or playing a certain role). When an MCPTT User Profile is synchronized between the infrastructure and an MCPTT device, information could be downloaded to the device and updated, as necessary. Subsequently and subject to permissions, the MCPTT User might choose a different associated MCPTT User Profile to be downloaded and stored on the device. Only one MCPTT User Profile is active at a time. Authorized users are allowed to create, delete and alter MCPTT User Profiles for an MCPTT User and/or pre-stored MCPTT User Profiles.

Further, Section 4.5.1 of the 3GPP TS 22.179 specification indicates:

Consistent with the EPS paradigm, when an MCPTT UE is powered on, it accesses the LTE system, and connects to the EPC. During this phase, the credentials from a USIM application (or possibly, an ISIM application, if IMS is used) on a UICC associated with the MCPTT UE is used for authentication with an HSS. This is followed by the MCPTT Application, resident on the MCPTT UE, establishing a connection, employing application layer security in its connection to the MCPTT Service.

Furthermore, as Section 4.5.2. of the 3GPP TS 22.179 specification states:

A user can enter his identifying/authenticating credentials (e.g., user name/password, PIN, biometrics, asserted identity from a remote, trusted device). This step typically gives the MCPTT User access to local information and applications stored on the MCPTT UE, and in particular, to the MCPTT client application.

The MCPTT Service allows the same MCPTT User to sign in (and stay simultaneously signed in) from different MCPTT Ues. For example, an incident manager or commander might use a portable phone, a command tablet, or a separate messaging unit.

Finally, Section 4.5.4 of this technical specification states:

The conceptual model for shareable MCPTT Ues is that of a pool of Ues, each UE being interchangeable with any other, and users randomly choosing one or more Ues from the pool, each user for his temporary exclusive use. A shareable MCPTT UE can be used by user who can gain access to the MCPTT client application stored on it and can become an authenticated MCPTT User. A shareable MCPTT UE can serve only one MCPTT User at a time. An MCPTT User who signs into a shareable MCPTT UE that is already in-use causes the sign-off of the previous MCPTT User.

An MCPTT User can simultaneously have several active MCPTT Ues, which, from an MCPTT Service point of view, are addressable individually and/or collectively within the context of their association to the MCPTT User.

From the above technical specifications, various things may be deduced. One requirement, for example, is that users from a first group could use devices that belong to a second group. For example, police in France may be able to use devices that belong to the police in the Netherlands.

One example of MCPTT architecture is provided in 3GPP TS 23.779, "Study on application architecture to support Mission Critical Push To Talk over LTE (MCPTT) services", v.0.5.0, February 2015, and is shown, for example, in Figure 5.2.1.1.1-1 of that specification, the contents of which are incorporated herein by reference. In particular, public safety users may have their own applications in a server or group of servers. Such applications may include applications that communicate with the S-CSCF of the IMS network and include a PS-UDF (public safety-user data function) which is operated by the Public Safety Administration and functions as a type of "mobile virtual network operator" and provides the functions of the HSS required by the IMS and the public safety application. Thus the PS-UDF, replaces the HSS.

Due to the replacement of the HSS, roaming with traditional virtual public land mobile networks (VPLMNs) could be required. However in some embodiments, EPC level security uses traditional HSS while the Public Safety Administration uses a PS-UDF.

Other applications that may be part of a public safety authority server may include a MCPTT server. In this case, the PS-UDF provides authorization for mobile terminated call/session establishment and service invocation an updates the S-CSCF with filter criteria to trigger the services to be provided to the user by public safety application servers. The PS-UDF communicates with the MCPTT server and a group management function to support MCPTT services in the IMS. In one embodiment, the MCPTT server is equivalent to a push to talk over cellular (PoC) server in the open mobile alliance (OMA) push to communicate for public safety (PCPS) architecture.

From the above, the architecture of the public safety service includes one or more servers which communicate with the IMS system through the S-CSCF and include a PS-UDF and a MCPTT server.

In operation, MCPTT may be deployed as described in FIG. 4. In particular, as described in FIG. 4, a public safety operator may have an applications infrastructure 410, as well as a SIP IMS core supporting the public safety operator 412.

A regular PLMN may then be used for certain signaling including an IP (EPC) core supporting the public safety operator 420, as well as an access network such as LTE 424.

A public safety UE 430 may include a group management client 432 as well as an MCPTT client 434.

As seen by FIG. 4, control signaling between the applications infrastructure of the public safety authority provide control signaling to a group management client 432 as well as the MCPTT client 434.

Further, user data and embedded control are provided to the MCPTT client 434 from applications infrastructure 410.

In one use of the deployment model of FIG. 4, full control of the IMS layer may be provided in which a cellular operator does not know what device is being used for, or by whom. In this case, the device would have a generic public user identity that would be used in the cellular network. However, in the IMS network this identity would be changed with no visibility of the change to a cellular operator.

Extensible Authentication Protocol

Extensible Authentication Protocol is an extensible authentication framework. It provides the necessary tools to incorporate other authentication schemes into the basic messaging structure. There are a number of EAP mechanisms that have been created. One EAP mechanism is the EAP-tunneled transport layer security (TTLS). In this authentication scheme a client can be securely authenticated with an authentication, authorization and accounting (AAA) infrastructure by setting up a secure tunnel between the client and a TTLS server, and then within a secure tunnel allowing another authentication protocol to be used to authenticate the client.

Figure 5A:
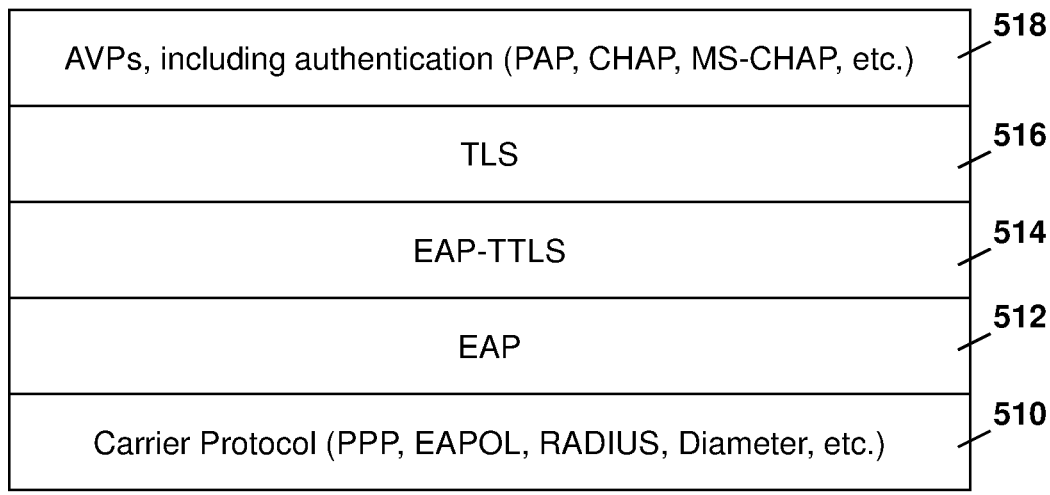
FIG. 5A is a block diagram of a protocol stack for EAP authentication.
Figure 5B:
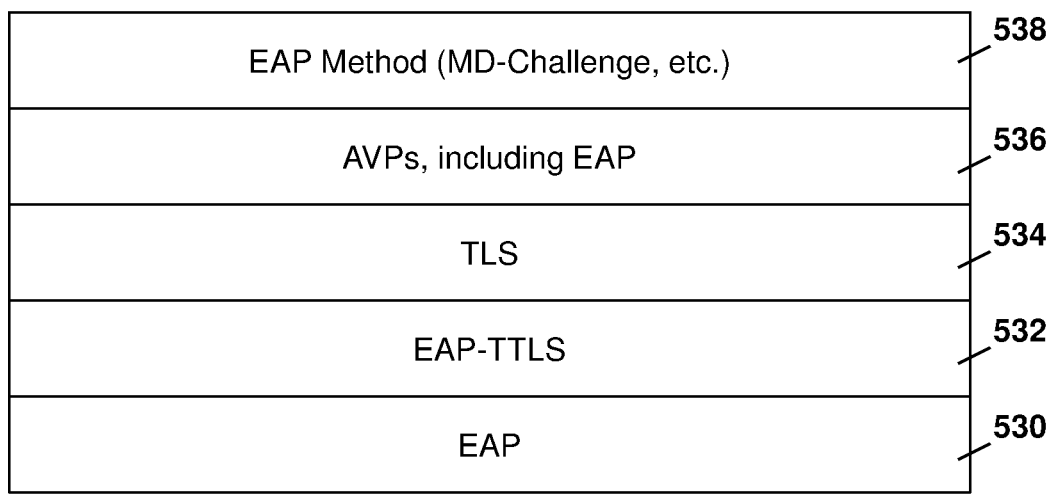
FIG. 5B is a block diagram of a protocol stack when the EAP is the user authentication protocol.

EAP-TTLS is, for example, described in the Internet Engineering Task Force (IETF) request for comments (RFC) 5281 "Extensible Authentication Protocol Tunneling Transport Layer Security Authenticated Protocol version 0", August 2008, the contents of which are incorporated herein by reference. Reference is now made to FIGS. 5A and 5B, which show protocol stacks from Section 6 of RFC 5281.

In particular, as seen in FIG. 5A, when the user authentication protocol is not itself the EAP, EAP-TTLS packets are encapsulated within the EAP and the EAP in turn requires a carrier protocol to transport it. EAP-TTLS packets themselves encapsulate TLS, which is then used to encapsulate attribute-value pairs (AVPs), which may carry user authentication or other information. Thus, as seen in FIG. 5A, the protocol stack includes a carrier protocol layer 510, an EAP layer 512, an EAP-TTLS layer 514, a TLS layer 516 and an EAP layer 518.

When user authentication protocol is itself an EAP, the protocol stack is shown with regard to FIG. 5B. In particular, as seen in FIG. 5B, the protocol stack includes an EAP layer 530, an EAP-TTLS layer 532, a TLS layer 534 and a layer 536 for AVPs including EAP. However, the protocol stack further includes an EAP method layer 538 in which methods for encapsulating EAP within carrier protocols are already defined. For example, point to point protocol (PPP) or Extensible Authentications Protocol over LAN (EAPOL) may be used to transport EAP between a client and an access point RADIUS or Diameter are used to transport EAP between access point and TTLS server.

IMS Authentication for MCPTT

Thus MCPTT requires that any users should be able to pick up any device and use it. For example, a fire station may have a box of devices that any firefighter may be able to pick up and use. Further, the authentication of the MCPTT application needs to be independent of the cellular/IMS network to meet the security requirements of the Public Safety service provider and Public Safety users and in some instances it may be desirable to hide or obscure the identity or the role of the user that is using a device. Thus, MCPTT does not fit well within the current IMS authentication protocols.

In accordance with the embodiments of the present disclosure, various authentication schemes are described for providing separate public and private user identities. Further, methods and systems for obscuring the identity of the user are also described. While the disclosure below is described with regard to MCPTT, the use of the authentication systems and methods described below can equally be used for other applications. Thus the present disclosure is not limited to MCPTT.

In the embodiments described below, solutions are provided for both in band signaling and out of band signaling. As used herein, in band signaling implies signals that utilize existing IMS messaging for authenticating an IMS UE that are enhanced to carry additional information to indicate a new form of authentication needs to be performed. Further, as used herein, out of band signaling implies that a new signaling path is used other than that of the current signaling path used to authenticate the IMS UE. In other words, the out of band signaling implies that the signaling currently used to authenticate the IMS UE is not enhanced and another mechanism is used to authenticate an individual subscriber.

Various in band and out of band embodiments are provided below.

The embodiments described below are provided as complete embodiments. However, one skilled in the art will appreciate that parts of each solution can be used with other solutions to form other potential solutions. In addition, some encoding mechanisms are shown with specific implementations. However, the specific implementations can be mixed and matched across the various solutions. In addition, various changes to standards are described in Appendices and tables. These show other specific embodiments and can equally be mixed and matched. One skilled in the art will appreciate that such example changes are used for illustrative purposes as well and the coding could be equally done numerous other ways.

In Band—Indication for Double Authentication

In one embodiment, an IMS registration message is enhanced to contain a new indication. The new indication signals to the network that instead of only authenticating the IMS Private User Identity (1st authentication mechanism), that the IMS Public User Identity authentication also needs to be performed (2nd authentication mechanism). The indication may be sent to authentication databases such as the HSS or PS-UDF to indicate that two sets of authentication vectors are needed at the UE.

Figure 6:
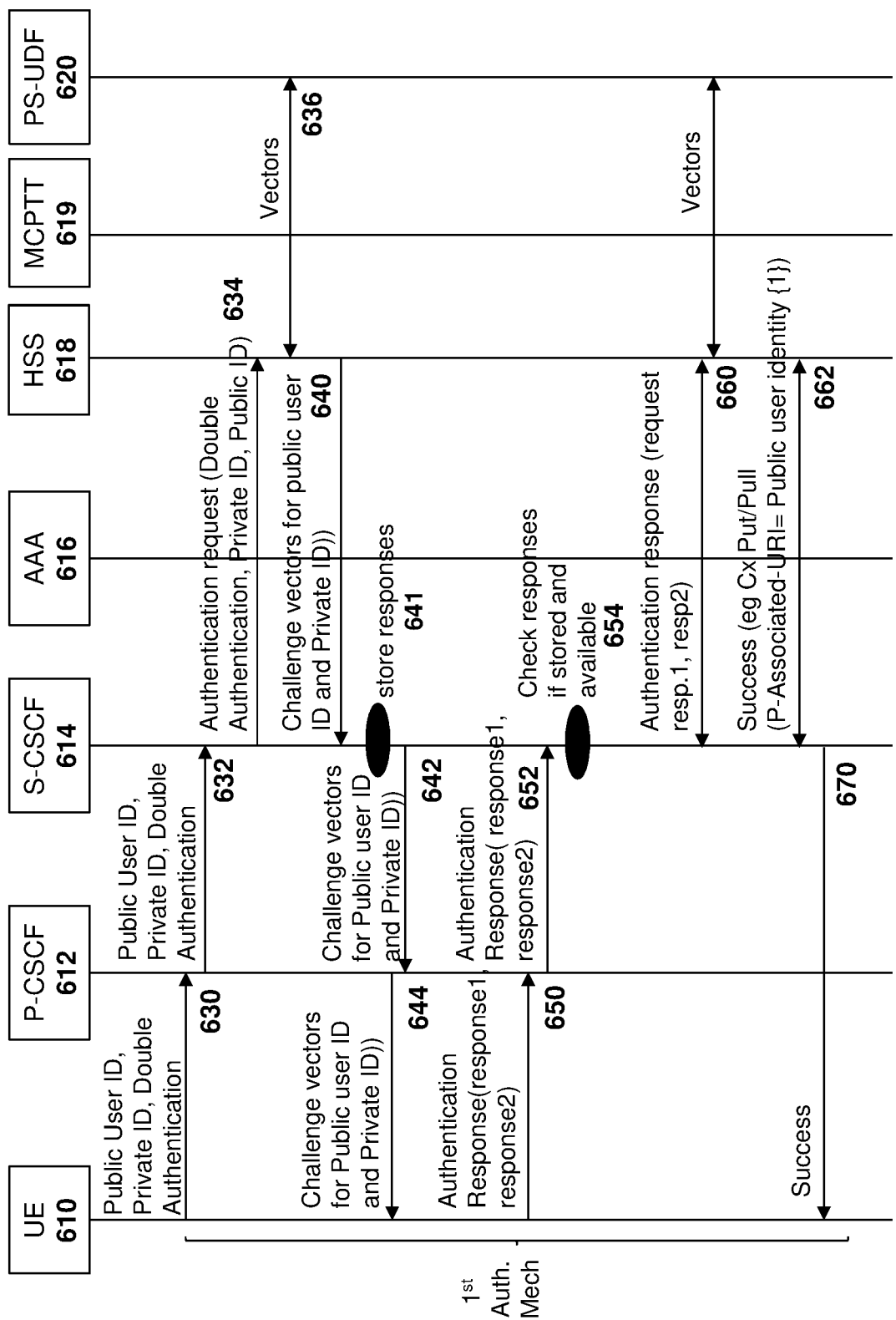
FIG. 6 is a data flow diagram showing a first in band embodiment providing an indication for double authentication.

Reference is now made to FIG. 6. In the embodiment of FIG. 6, UE 610 wishes to be authenticated with the IMS system. Communications may proceed through a P-CSCF 612, an S-CSCF 614, an AAA 616, an HSS 618 and a PS-UDF 620. The logical elements of FIG. 6 however may be rearranged and certain logic may be placed in other elements and therefore FIG. 6 is merely an example. For example, the AAA server could be combined with the PS-UDF. In another example, the PS-UDF could be combined with the HSS. Other examples are possible.

In FIG. 6, as well as in the remainder of the specification, various network nodes are identified, for example as MCPTT server, PS-UDF, HSS etc. However, in general each of these entities may be considered as one of several network nodes interacting with each other to perform the methods described herein.

In the embodiment of FIG. 6, the UE 610 sends a message 630 to the P-CSCF 612. The message 630 contains various information including, but not limited to, a first public user identity, a first private user identity, and an indicator that indicates "double authentication" (Authentication of Private and Public user ID) is supported or needed. In one embodiment, the identifier of message 630 may be encoded as a new mechanism/name identifying a new security method. For example, such method may be referred as IPSEC-MCPTT. Alternatively, or in addition, the identifier may be coded as mech-parameters in a security-client field, for example, as described in IETF RFC 3329.

In an alternative embodiment, the identifier in message 630 may be a new parameter in the authorization header field. For example, a new AKA version number may be used.

In a further embodiment, the identifier may be encoded as an option tag in the supported or required header fields.

In a further embodiment, the identifier may be encoded as a feature tag.

Further, the identifier may be encoded as a universal resource identifier (URI) parameter such as, for example, "doubleauthentication=yes".

In a further embodiment, the identifier may be encoded as an extensible markup language (XML) body. It may also be encoded as a new header or may be appended to either the first public user identity or a first private user identity.

For example, in Table 1 below, items in bold represent some coding of the various methods described above. Table 1 below shows the various options all placed within the same registration message. However, one skilled in the art would know that in some circumstances only one identifier is needed and could be any of those shown in bold below. In other circumstances there could be a plurality of indicators.

TABLE 1

Possible Changes to an IMS Registration Message

REGISTER sip:registrar.home1.net;\doubleauthentication=yes SIP/2.0
Via: SIP/2.0/UDP
[5555::aaa:bbb:ccc:ddd];comp=sigcomp;branch=z9hG4bKnashds7
Max-Forwards: 70
P-Access-Network-Info: 3GPP-UTRAN-TDD; utran-cell-id-
3gpp=234151D0FCE11
From: <sip: home1.net!user1 public@doubleauthentication>;tag=4fa3
To: <sip: home1.net!user1 public@doubleauthentication>
Contact: <sip:[5555::aaa:bbb:ccc:ddd];comp=sigcomp>;expires=600000,
doubleauthentication=yes
Call-ID: apb03a0s09dkjdfglkj49111
Authorization: Digest
username="home1.net!user1private@doubleauthentication",
realm="registrar.home1.net", nonce="", uri="sip:registrar.home1.net", response=""
Security-Client: ipsec-MCPTT; alg=hmac-sha-1-96; spi-c=23456789; spi-
s=12345678; port-c=2468; port-s=1357
Require: sec-agree
Proxy-Require: sec-agree
CSeq: 1 REGISTER
Supported: path
Content-Length: 0
Or
REGISTER sip:registrar.home1.net SIP/2.0
Via: SIP/2.0/UDP
[5555::aaa:bbb:ccc:ddd];comp=sigcomp;branch=z9hG4bKnashds7
Max-Forwards: 70
P-Access-Network-Info: 3GPP-UTRAN-TDD; utran-cell-id-
3gpp=234151D0FCE11
From: <sip:user1_public1@home1.net>;tag=4fa3
To: <sip:user1_public1@home1.net>
Contact: <sip:[5555::aaa:bbb:ccc:ddd];comp=sigcomp>;expires=600000
Call-ID: apb03a0s09dkjdfglkj49111
Authorization: Digest username="user1_private@home1.net",
realm="registrar.home1.net", nonce="", uri="sip:registrar.home1.net", response=""
Security-Client: ipsec-3gpp; alg=hmac-sha-1-96; spi-c=23456789; spi-
s=12345678; port-c=2468; port-s=1357
Authorization: Digest username="user1_public@home1.net",
realm="registrar.home1.net", nonce="", uri="sip:registrar.home1.net",
response=""
Security-Client: ipsec-MCPTT; alg=biometric finger prnt; spi-c=23456789;
spi-s=12345678; port-c=2468; port-s=1357
Require: sec-agree
Proxy-Require: sec-agree
CSeq: 1 REGISTER
Supported: path
Content-Length: 0

Similarly, 3GPP TS 24.229 may be changed in accordance with Appendix A attached hereto. As shown in bold in Appendix A, additions to the text of TS 24.229 are provided. However, as with Table 1 above, various changes are all grouped into the Appendix A and one skilled in the art will appreciate that only one change or a sub-combination of the bold changes may be needed in practice.

Referring again to FIG. 6, once P-CSCF 612 receives message 630, it sends message 632 containing the contents of message 630 to S-CSCF 614.

S-CSCF receives message 632 and sends an authentication request message 634 to HSS 618. One example of the changes that may be made for message 634 in the 3GPP TS 29.228 Specification are provided in Appendix B in bold. As seen in Appendix B, the description of the authentication may include biometric fingerprint data and IMS-AKA authentication, as examples. However, the changes in Appendix B are merely meant as examples.

An alternative embodiment is shown with regard to Appendix C, where the S-CSCF recognizes the second authentication digest header and includes a new MCPTT SIP authentication scheme attribute value pairs (AVP) with the indication of the authentication scheme to be used.

Specifically, as seen in Appendix C, an entirely new authentication scheme is defined.

A $1^{st}$ database function, e.g. HSS 618 receives message 634 and may then obtain authentication vectors from the $2^{nd}$ database function e.g. PS-UDF 620, as shown by messages 636. Specifically, the HSS may obtain the set of vectors for a public user identity number from the PS-UDF as shown with regard to message 636 in FIG. 6. The HSS will send the authentication request message to the PS-UDF containing any or all of the data as identified above.

With regard to implementation, the HSS 618 may in some embodiments be combined with the PS-UDF 620.

The PS-UDF 620 receives the public user identity and will respond with a set of vectors. Vectors can include one or more of the following challenges, although the challenge response is not restricted to the examples below. Specifically, an example set of vectors based on AKA are:

AV=$RAND_n$|$AUTN_n$|$XRES_n$||$CK_n$||$IK_n$ where:
RAND: random number used to generate the XRES, CK, IK, and part of the AUTN. It is also used to generate the RES at the UE.
AUTN: Authentication token (including MAC and SQN).
XRES: Expected (correct) result from the UE.
CK: Cipher key (optional).
IK: Integrity key.

The vectors could however be different based on the algorithm being used. For example, the vectors may be based on the data communicated in the SIP register, which is then converted into an entry in Appendix B. A message such as: Security-Client: ipsec-MCPTT; alg=biometric finger pmt; spi-c=23456789; spi-s=12345678; port-c=2468; port-s=1357 could be used.

Implementation wise the PS-UDF may be combined with the MCPTT server 619 or the AAA server 616.

The HSS 618 may then provide the challenge vectors back to the S-CSCF 614 in message 640. The challenge vectors in message 640 can be for the first private user identity and first public user identity. Challenge vectors for the first public user identity may be encoded as any one of a feature tag; XML body; AVP; or new header, among other possibilities. For example, Appendix D shows one possible change in bold to 3GPP 29.228 for an AVP challenge.

In the embodiment of FIG. 6, the HSS has therefore included a second set of authentication vectors due to identification of a double authentication scheme. The data that then follows this information element is associated with the first public user identity. In the change in Appendix D, the last four rows are data items associated with the second IMS AKA function but the authentication mechanism could be any authentication mechanism. Thus, the SIP-authenticate shown in the Appendix D contains a challenge that is presented to a first public user identity. In addition, there is also a data item that the first public user identity can use to ensure it is being challenged by an authorized entity.

The SIP-authorization elements in Appendix D are the expected results to the challenge. S-CSCF 614 receives message 640 and provides message 642 to P-CSCF 612. Message 642 provides the challenge vectors for both the private user and public user identities. For example, as seen in Table 2 below, the bold section provides an addition to the message for authentication. The bold section represents the $2^{nd}$ set of authentication vectors.

TABLE 2

Possible Changes to an Authenticate Request

SIP/2.0 401 Unauthorized
Via: SIP/2.0/UDP icscf1_p.home1.net;branch=z9hG4bK351g45.1, SIP/2.0/UDP
pcscf1.visited1.net; branch=z9hG4bK240f34.1, SIP/2.0/UDP
[5555::aaa:bbb:ccc:ddd];comp=sigcomp;branch=z9hG4bKnashds7
From: <sip:user1_public1@home1.net>;tag=4fa3
To: <sip:user1_public1@home1.net>; tag=5ef4
Call-ID: apb03a0s09dkjdfglkj49111
WVWV-Authenticate: Digest realm="registrar.home1.net", nonce=base64(RAND +
AUTN + server specific data), algorithm=AKAv1-MD5,
ik="00112233445566778899aabbccddeeff",
ck="ffeeddccbbaa11223344556677889900"
**WWW-Authenticate: Digest realm="registrar.home1.net",
nonce=base64(CHALLENGE + AUTHN server specific data), algorithm=
biometric finger prnt, ik="00112233445566778899aabbccddeeff",
ck="ffeeddccbbaa11223344556677889900"**CSeq: 1 REGISTER
Content-Length: 0

In Table 2 above, the second nonce is a construct of various sets of data that are similar to the 1st nonce. The use of such second nonce is merely for illustrative purposes and one skilled in the art will appreciate that what is important is that the second nonce contains a challenge and additional data to verify if the challenge has come from a legitimate source.

P-CSCF 612 receives message 642 and forwards challenge vectors for the public user ID and private user ID to UE 610, as shown by message 644. Message 644 will typically contain the nonce, the algorithm to use, the second nonce and the second algorithm associated with the second nonce.

For example, reference is made to Table 3, which shows in bold additions that may be made to a message 644.

TABLE 3

Possible Changes to an Authenticate Request

SIP/2.0 401 Unauthorized
Via: SIP/2.0/UDP
[5555::aaa:bbb:ccc:ddd];comp=sigcomp;branch=z9hG4bKnashds7
From:
To:
Call-ID:
VWWV-Authenticate: Digest realm="registrar.home1.net", nonce=base64(RAND + AUTN + server specific data), algorithm=AKAv1-MD5
Security-Server: ipsec-3gpp; q=0.1; alg=hmac-sha-1-96; spi-c=98765432; spi-s=87654321; port-c=8642; port-s=7531
WWW-Authenticate: Digest realm="registrar.home1.net", nonce=base64(CHALLENGE + AUTHN + server specific data), algorithm= biometric finger prnt
CSeq:
Content-Length:

When the UE 610 receives message 644 containing two authentication challenge vectors, the second set of challenge vectors may be encoded as a feature tag, XML body, AVP, new header or www-authenticate-header, among others.

The UE 610 contains both a mobile element (ME) and a UICC. The ME performs the first authentication. If a UICC is contained in the ME, then the authentication vectors may be sent across the ME-UICC interface.

Either after the first authentication or during the first authentication the ME will run the second authentication challenge and the second authentication challenge is described in detail below.

One example of a change to the 3GPP TS 24.229 specification to support such double authentication at the UE is shown with regard to Appendix E below. In particular, Section 5.1.1.5 of 3GPP TS 24.229 has been amended in the example of Appendix E to show that the UE can extract the challenge and authentication parameters and check the validity of the authentication parameter. If the authentication parameter is valid then the UE may execute the MCPTT application authentication.

Once the UE 610 has completed the first authentication, the UE may then send an authentication response 650 containing two responses. The second challenge response may be encoded as any one of: a feature tag; XML body; AVP; a second authorization header; a new header; or appended to the existing response value using a separator character eg, XXXXX yyyyyy, where XXXXX is the first response value and YYYYY is the second response value, among other options. Such response values can be any number of characters in length.

Reference is made to Table 4 below, which shows a second authorization header including that contained in the second response in bold. The user name is that of the first public user identity.

TABLE 4

Second Authorization Header

REGISTER sip:registrar.home1.net SIP/2.0
Via: SIP/2.0/UDP
[5555::aaa:bbb:ccc:ddd]:1357;comp=sigcomp;branch=z9hG4bKnashds7
Max-Forwards: 70
P-Access-Network-Info: 3GPP-UTRAN-TDD; utran-cell-id-3gpp=234151D0FCE11
From: <sip:user1_public1@home1.net>;tag=4fa3
To: <sip:user1_public1@home1.net>
Contact: <sip:[5555::aaa:bbb:ccc:ddd]:1357;comp=sigcomp>;expires=600000
Call-ID: apb03a0s09dkjdfglkj49111
Authorization: Digest username="user1_private@home1.net", realm="registrar.home1.net", nonce=base64(RAND + AUTN + server specific data), algorithm=AKAv1-MDS, uri="sip:registrar.home1.net", response="6629fae49393a05397450978507c4ef1"
Authorization: Digest username="user1_public@home1.net", realm="registrar.home1.net", nonce=base64(CHALLENGE + AUTHN + server specific data), algorithm=[ biometric finger prnt], uri="sip:registrar.home1.net", response="6629fae49393a05397450978507c4ef1"
Security-Client: ipsec-MCPTT; alg=hmac-sha-1-96; spi-c=23456789; spi-s=12345678; port-c=2468; port-s=1357
Security-Verify: ipsec-MCPTT; q=0.1; alg=hmac-sha-1-96; spi-c=98765432; spi-s=87654321; port-c=8642; port-s=7531
Require: sec-agree
Proxy-Require: sec-agree
CSeq: 2 REGISTER
Supported: path
Content-Length: 0

An example of a change to the 3GPP TS 24.229 for the response is provided in bold in Appendix F below.

As seen in Appendix F, the response is provided with a second calculated response appended to the first response, as shown in bold in Appendix F.

Message 650 is received at P-CSCF 612 and forwarded to S-CSCF 614, as shown by message 652. S-CSCF 614 may then perform, as shown by block 654, a check of the expected responses. If both nonce and nonce2 successfully match those stored in the S-CSCF 614 at block 641 in FIG. 6, the UE 610 will be registered for MCPTT services. If the second nonce does not match the value stored in the S-CSCF, the UE will only be registered for IMS services. If the first nonce does not match the one stored in the S-CSCF 614, the UE 610 will not be registered for any services.

In an optional embodiment, if the S-CSCF 614 does not already have the stored vectors for the public user identity, a message 660 may be sent to HSS 618. An example of message 660 is shown with regard to Appendix G, which shows proposed changes in bold to 3GPP TS 29.228.

HSS 618 or other authentication function e.g. PS-UDF receives message 660 and determines the request for authentication vectors is for the public user identity contained in the public user identity field. The determination is based on indications identified above. In particular, Appendix H shows potential changes in bold to provide for authentication request data in 3GPP TS 29.228.

The authentication function such as HSS 618 will either generate the authentication vectors, request another function to generate the authentication vectors by forwarding the message or using an alternative protocol. The authentication function such as HSS 618 then sends the authentication vectors for the public user identity. Potential changes to 3GPP TS 29.228 are shown in bold by Appendix I.

As shown in Appendix I, the public user authentication vectors are provided in the response. Thus, message 660 has the HSS including the site of authentication vectors for the public user identity via identifying a public-user-authentication. The data that then follows this information element is associated with the first public user identity. One skilled in the art will appreciate that the last four rows in Appendix I are data items associated with the second IMS AKA function but the authentication mechanism could be anything. Again, one aspect is that the SIP-authentication contains a challenge that is presented to the public user identity. For example, if a first public user identity is being authenticated, then the challenge is directed to that first public authentication user identity. In addition, there are data items in the first public user identity data items in the message that the first public user identity can use to ensure that it is being challenged by an authorized entity. Further, the SIP authorization fields in Appendix I are the expected results of the challenge.

Referring again to FIG. 6, if the UE 610 has been registered for MCPTT services, the S-CSCF 614 may send message 662 containing an indication that the second authentication has been successful to the authentication function e.g. HSS, PS-UDF etc. This indication may be encoded as, but not limited to, a feature tag, XML body, AVP or new header, among others.

An example of an AVP that could be updated is shown with regard to Appendix J. As shown in bold in Appendix J, changes to the 3GPP 29.229 specification and in particular to Section 6.3.15 are provided.

Another example of a new AVP is shown with regard to Appendix K. In Appendix K the applications that are being registered for are identified in Section 6.1.3 of 3GPP TS 29.229, as shown in bold.

Message 662 may also be used if the UE has not been registered for public safety/MCPTT services and has only registered for either IMS services. In this case, the S-CSCF 614 may send message 662 containing information pursuant to 3GPP TS 29.228.

In FIG. 6, once success has been confirmed with the S-CSCF 614, a success message 670 may be provided to UE 610.

In the above, when the UE receives data for the second authentication challenge, the UE needs to provide a response to the network. This may be performed either at the ME or an application on the UICC. The result may be generated by either an automated or a manual process. An automated response could utilize an external authentication token. The external authentication token could be swiped in a card reader in the ME, the ME could communicate via wireless mechanism to an authentication token, for example using Bluetooth™, near field communications (NFC), radio frequency identifier (RFID), among others. Basically the ME sends a message to an external node and the external node responds back to the ME with authentication credentials.

In a manual authentication, the ME provides an indication that could be any one of, but is not limited to, an audio, visual or other message. The ME receives data via keyboard, screen, movement of the ME, fingerprint reader, retina scanner, NFC, swipe car reader among other options. The data received is then used as the challenge response and encoded in, for example, a MIME type message.

Thus, from the above, the IMS registration message is enhanced to contain a new indication. The new indication signals to the network that instead of only authenticating the IMS private identity, the IMS public user identity authentication is also to be performed. The new indication is also sent to the authentication database to indicate that two sets of authentication vectors are required.

The network, upon receipt of the new indication, will respond with two sets of authentication vectors instead of one or a single set of authentication vectors is associated with the IMS public user identity if a security association already exists for the IMPI.

A device should be capable of receiving two sets of authentication vectors and upon successful validation of the IMS private user identity set, the device may then validate and run a second set of authentication vectors. The second set of authentication vectors could be a password or some other unique identification of the user such as fingerprint, QR-code from ID card, biometric data such as retina scan, among others.

A successful response from the device to the 1st set of authentication vectors may allow the device to perform limited functionality in the IMS network such as to receive configuration information.

A successful response to the $2^{nd}$ authentication vector allows the device to be used by a particular user. The exact functionality is dictated by the filter criteria and service description characteristics associated with that public user identity that has been successfully authenticated.

In Band-Second Public User Id And Authentication Response

In accordance with a further embodiment of the present disclosure, IMS registration is performed as normal, including a first public identity and a first private user identity. However, when the device responds to authentication challenge, it may also include new additional information in the challenge response including a second public user identity instead of the first public user identity that was sent in the initial IMS registration.

In some embodiments, the UE may also provide a challenge response for that second public user identity if it knows the challenge vectors for the public user identities. In particular, if the same challenge vector is utilized for the second public identity as was provided for the first identity, then the challenge response will be different but will be derivable at the network.

In one embodiment, the challenge response for the second public user identity could be a password or some other unique identification of the user such as a fingerprint, a QR code from an ID card or other biometric data such as a retina scan, among others. In some cases, the second public user identity may be sent either in clear text or may be encrypted or obscured by the device and therefore must be decrypted or unobscured by a network entity such as the HSS. If the second public user identity has been encrypted, an identifier may need to be provided during the IMS registration to indicate such encryption. Encryption can be based on a public key that is known to the device and the HSS, PS-UDF or Public Safety AAA server.

When the network receives the second public user identity that does not match the first public user identity, the S-CSCF may need to obtain authentication vectors for the second public user identity. If the challenge response for the second public user identity is correct for the second public user identity, the network responds at the second user identity as the one to be used for the device. However, if the challenge response is incorrect for the second public user identity, the network responds with the first public identity as the one to be used by the device.

Figure 7:
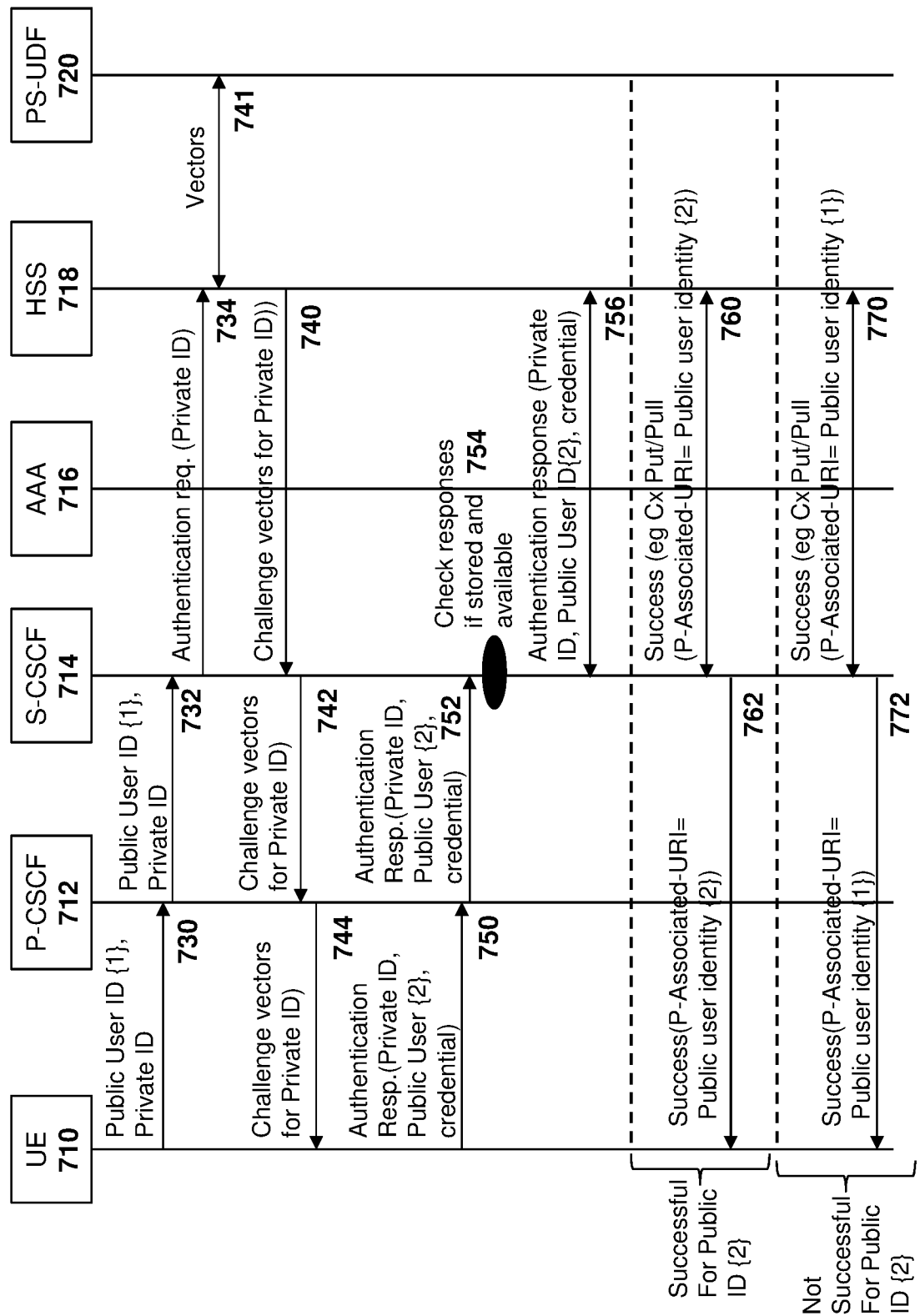
FIG. 7 is a data flow diagram for an alternative in band embodiment in which a second public user identity is used in authentication.

Reference is now made to FIG. 7. In FIG. 7, UE 710 communicates with a P-CSCF 712. Further elements of the network include an S-CSCF 714, an AAA 716, an HSS 718, and a PS-UDF 720. Again one skilled in the art will appreciate that these are logical functions and could be combined together.

In the embodiment of FIG. 7, UE 710 wishes to register with an IMS network, for example a public safety IMS network. In this case, UE 710 provides message 730 to the P-CSCF 712 which provides a first public user identity and a first private identity. The P-CSCF 712 receives message 730 and forwards a message to S-CSCF 714, shown by message 732, which again provides the first user identity and the first private identity.

S-CSCF 714 then provides an authentication request 734 to HSS 718 and HSS 718 may obtain challenge vectors for the private identifier as and provide them to the S-CSCF 714 in message 740. The challenge vectors may, in some instances, be obtained from the P-UDF 720, as shown by arrow 741.

The challenge vectors are then passed from S-CSCF 714 to P-CSCF 712 in message 742 and then to UE 710 in message 744.

The UE 710, upon receipt of the authentication challenge of message 744, provides message 750 back to the P-CSCF 712. If the UE supports MCPTT service then the message may contain information consisting of, but not limited to a first private user identity, a second public user identity and credentials associated with the second public user identity. An optional indication that the second public user identity and/or credentials has been encrypted may also be provided if such is the case.

The information in message 750 may be encoded to include a new mechanism-name identifying the new security method. For example this may be IPSEC-MCPTT and/or MEC-PARAMETERS in a security-client header field. For example, IETF RFC 3329 describes such encoding. Further, the encoding may be a new parameter in the authorization header field such a new AKA version as described in IETF RFC 3310. Further, the information may be encoded as an option tag in the supported or required header fields, feature tags, URI parameters, XML body, new headers or appended to either the first public identity or first private user identity.

For example, reference is made to Appendix L which shows a potential change to the 3GPP TS 24.229, and in particular to Section 5.1.1.5 of this specification. The bold sections of Appendix L are those which are added.

Further, Table 5 shows potential changes in two implementations of messaging for providing for message 750.

TABLE 5

Authentication Response

REGISTER sip:registrar.home1.net SIP/2.0
Via: SIP/2.0/UDP
[5555::aaa:bbb:ccc:ddd]:1357;comp=sigcomp;branch=z9hG4bKnashds7
Max-Forwards: 70
P-Access-Network-Info: 3GPP-UTRAN-TDD; utran-cell-id-3gpp=234151D0FCE11
From: <sip:user1_public1@home1.net>;tag=4fa3
To: <sip:user1_public1@home1.net>
Contact: <sip:[5555::aaa:bbb:ccc:ddd]:1357;comp=sigcomp>;expires=600000
Call-ID: apb03a0s09dkjdfglkj49111
Authorization: Digest username="user1_public@home1.net",
realm="registrar.home1.net", nonce="public user authentication",
algorithm="public user authentication", uri="sip:registrar.home1.net",
response="6629fae49393a05397450978507c4ef1"
Security-Client: ipsec-MCPTT; alg=hmac-sha-1-96; spi-c=23456789; spi-s=12345678; port-c=2468; port-s=1357
Security-Verify: ipsec-MCPTT; q=0.1; alg=hmac-sha-1-96; spi-c=98765432; spi-s=87654321; port-c=8642; port-s=7531
Require: sec-agree
Proxy-Require: sec-agree
CSeq: 2 REGISTER
Supported: path
Content-Length: 0
For purposes of discussion the nonce in italics with be called nonce2.
A second implementation could look like following with the response to the 1$^{st}$ challenge and second Authorization header with Public User ID and response TABLE 5-continued Authentication Response REGISTER sip:registrar.home1.net SIP/2.0
Via: SIP/2.0/UDP
[5555::aaa:bbb:ccc:ddd]:1357;comp=sigcomp;branch=z9hG4bKnashds7
Max-Forwards: 70
P-Access-Network-Info: 3GPP-UTRAN-TDD; utran-cell-id-3gpp=234151D0FCE11
From: <sip:user1_public1@home1.net>;tag=4fa3
To: <sip:user1_public1@home1.net>
Contact: <sip:[5555::aaa:bbb:ccc:ddd]:1357;comp=sigcomp>;expires=600000
Call-ID: apb03a0s09dkjdfglkj49111
Authorization: Digest username="user1_private@home1.net",
realm="registrar.home1.net", nonce=base64(RAND + AUTN + server specific
data), algorithm=AKAv1-MD5, uri="sip:registrar.home1.net",
response="6629fae49393a05397450978507c4ef1"
Security-Client: ipsec-3gpp; alg=hmac-sha-1-96; spi-c=23456789; spi-
s=12345678; port-c=2468; port-s=1357
Security-Verify: ipsec-3gpp; q=0.1; alg=hmac-sha-1-96; spi-c=98765432; spi-
s=87654321; port-c=8642; port-s=7531
**Authorization: Digest username="user1_public@home1.net",
realm="registrar.home1.net", nonce="public user authentication",
algorithm="public user authentication", uri="sip:registrar.home1.net",
response="6629fae49393a05397450978507c4ef1"**
Require: sec-agree
Proxy-Require: sec-agree
CSeq: 2 REGISTER
Supported: path
Content-Length: 0

P-CSCF 712 receives message 750 and forwards message 752 to the S-CSCF 714. Message 752 includes the same information as message 750.

In the example of FIG. 7 and as shown by Table 5, the S-CSCF sees that the information received does not match with the information provided in message 732 and which was subsequently stored. Such information may include the public user identity received in a username header, the nonce or the algorithm. The S-CSCF will then request authentication vectors from the authentication function such as the HSS 718 or the P-UDF 720 or the AAA 716 if it does not already have stored vectors for the public identity, shown by block 754.

The obtaining of vectors is shown by message 756 and is the same as message 660 from FIG. 6 above with the exception that the information contains the second user identity.

As seen in FIG. 7, message 752 provides the parameters and the authentication response to allow for a successful authentication of the second public user identity. Thus, once the authentication is checked from message 756, if the authentication is successful then message 760 is provided between S-CSCF 714 and HSS 718.

Further, a success message 762 may be provided to UE 710, and such message may be the same as that provided as message 670 of FIG. 6.

Conversely, if the authentication was not successful for the second public user identifier, then the message 770 includes success, but only for the first public user identifier, not the second public user identifier. Message 772 therefore provides for success but utilizing the first public user identifier.

The above therefore allows for the obscuring of a public user identity and the authentication of such second public user identity using in-band authentication mechanism for ISM.

In Band Keying Based On Public User Id

In a further embodiment, IMS registration from the UE is performed as normal with a new indication that authentication is also required for MCPTT or public user identification. This indication is sent to and from the S-CSCF and HSS/PS-UDF.

The key derivation process and challenge response process is enhanced to include a personal identification number (PIN) that is associated with the public user identity that is being used to access the system. The PIN is combined into the IMS AKA algorithm to create the authentication vectors.

The term PIN, as used herein, is being used in a generic fashion and can include, but is not limited to, a set of alpha numeric characters, a picture, iris scan, biometric data, fingerprint, voice print, key card, barcode, Qcode, a combination of some or all of the above, among other options.

Figure 8:
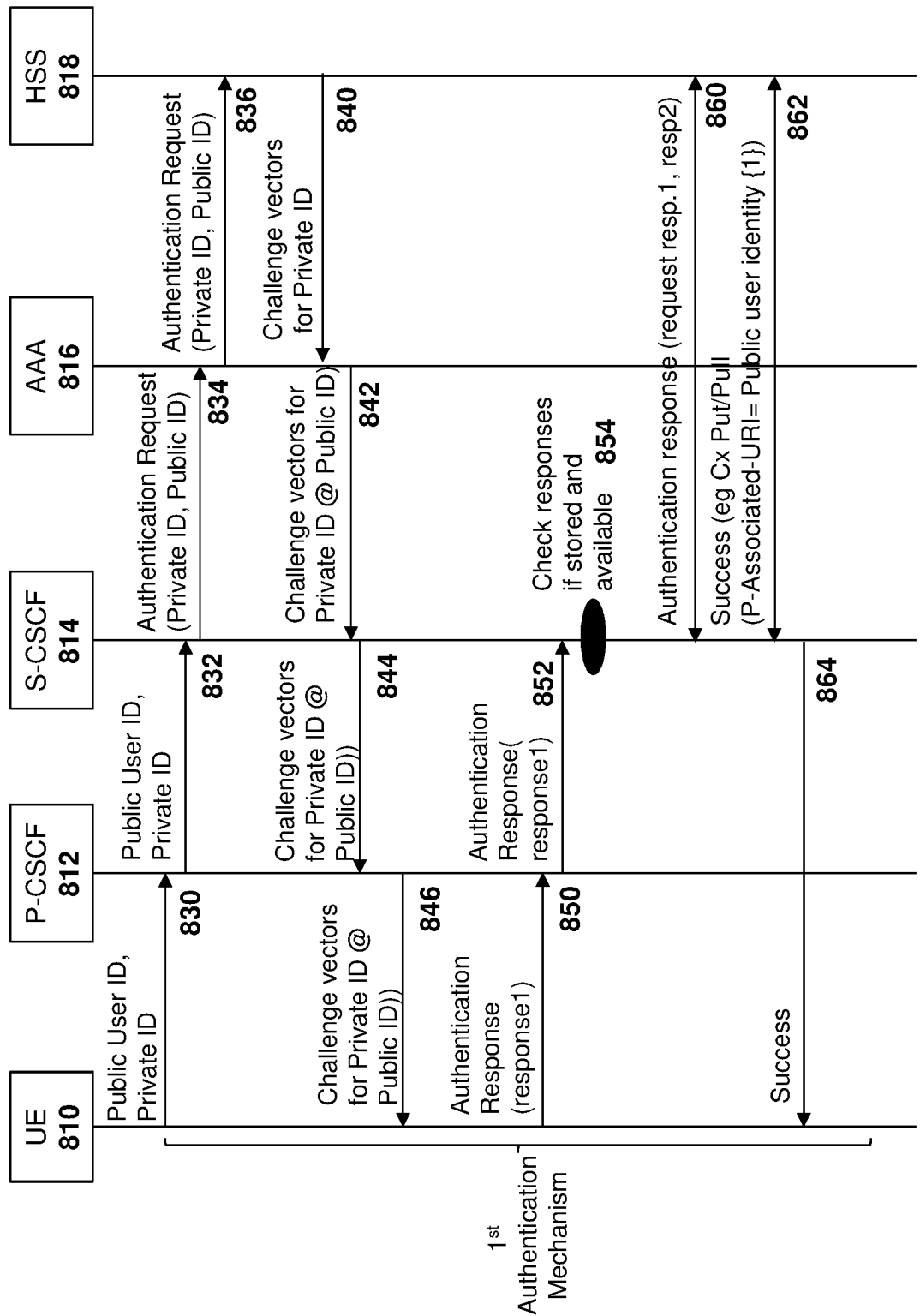
FIG. 8 is a data flow diagram of an in band embodiment showing keying based on public user identifiers.

Reference is now made to FIG. 8, which shows information flow for such keying. In particular, UE 810 communicates with P-CSCF 812, which communicates with S-CSCF 814, AAA 816 and HSS 818. In some embodiments, HSS 818 may also communicate with a PS-UDF.

As seen in FIG. 8, the UE 810 sends message 830 including the public user identifier and private user identifier. This message is then forwarded from P-CSCF 812 to S-CSCF 814, as shown by message 832. The S-CSCF 814 may, upon receipt of message 832, provide the authentication request to the AAA 816, as shown by message 834. AAA 816 provides the authentication request to HSS 818 in message 836.

Challenge vectors are created and HSS 818 provides the challenge vectors for the private ID in message 840 to AAA 816. The challenge vectors are then provided from AAA 816 to S-CSCF 814 in message 842.

The challenge vectors are then forwarded from the S-CSCF 814 to the P-CSCF 812 in message 844 and finally provided to UE 810 in message 846. UE, as described below, performs the authentication and provides an authentication response 850 back to the P-CSCF 812. The authentication response is then forwarded to S-CSCF 814 as shown by message 852.

If the S-CSCF 814 includes or has stored the challenge vector responses then a check may be made, as shown as block 854. Otherwise, a response request may be made between the S-CSCF 814 and HSS 818, as shown by message 860.

If the authentication is successful then message 862 is used for the determination and message 864 is provided back to UE 810.

In the above, the UE therefore sends a registration to the message to the network which includes an indication that authentication is performed for the MCPTT application. Such indication may be encoded as any one of: a new mechanism-name identifying a new security method such as ipsec-MCPTT and/or mech-parameters in a Security-Client header field; a new parameter in the Authorization header field; an option tag in the Supported or Require header fields; feature tags; URI parameters; XML body; new headers; or appended to either the first Public User Identity or the first Private User Identity. An example encoded in Table 6 below shows in bold the changes, where the new Security-Client has been called the "ipsec-3GPP-MCPTT".

TABLE 6

MCPTT Authentication Encoding

REGISTER sip:registrar.home1.net SIP/2.0
Via: SIP/2.0/UDP
[5555::aaa:bbb:ccc:ddd];comp=sigcomp;branch=z9hG4bKnashds7
Max-Forwards: 70
P-Access-Network-Info: 3GPP-UTRAN-TDD; utran-cell-id-3gpp=234151D0FCE11
From: <sip:user1_public1@home1.net>;tag=4fa3
To: <sip:user1_public1@home1.net>
Contact: <sip:[5555::aaa:bbb:ccc:ddd];comp=sigcomp>;expires=600000
Call-ID: apb03a0s09dkjdfglkj49111
Authorization: Digest username="user1_private@home1.net",
realm="registrar.home1.net", nonce="", uri="sip:registrar.home1.net", response=""
Security-Client: ipsec-3gpp-MCPTT; alg=hmac-sha-1-96; spi-c=23456789; spi-s=12345678; port-c=2468; port-s=1357
Require: sec-agree
Proxy-Require: sec-agree
CSeq: 1 REGISTER
Supported: path
Content-Length: 0

Further, at the UE, upon receiving message 846, the UE may obtain a challenge response associated with the public user identity that was sent in the IMS registration message in the "from" header. The challenge response, which is referred to as the public user ID PIN, may then be sent into a function to modify it, either at the ME or UICC, and then from the ME the response may be sent across the ME-UICC to the UICC. The UICC may receive the public user ID PIN and use it to generate keys and challenge responses.

An example of potential changes to the 3GPP TS 31.103 specification are shown in bold in Appendix M below.

For the keying, S-CSCF 814 may be enhanced by sending the message to the authentication function to obtain authentication vectors. The message may include an indication that it is for an MCPTT service and may be encoded as a feature tag, XML body, new AVP, the use of an existing AVP with a new code point, or a new header.

The authentication function could be the HSS, AAA, PS-UDF or some combination of the three.

The authentication request may be in the form described in Appendix N below.

As seen in Appendix N, the authentication request may include a public user identity, private user identity, number of authentication items, authentication data, the S-CSCF name and routing information, among other information.

Upon receipt of a message requesting authentication vectors for the public user identity being registered, the authentication function obtains the private user ID PIN associated with the public identity in the public identity AVP. Using the indication sent by the UE in message 846, the authentication function generates or requests authentication vectors and sends the response back within an indication of a new mechanism used to create the vectors. Such message may be encoded as, for example, a feature tag, XML body, new AVP, existing AVP using a new code point or a new header, among other options.

Figure 9:
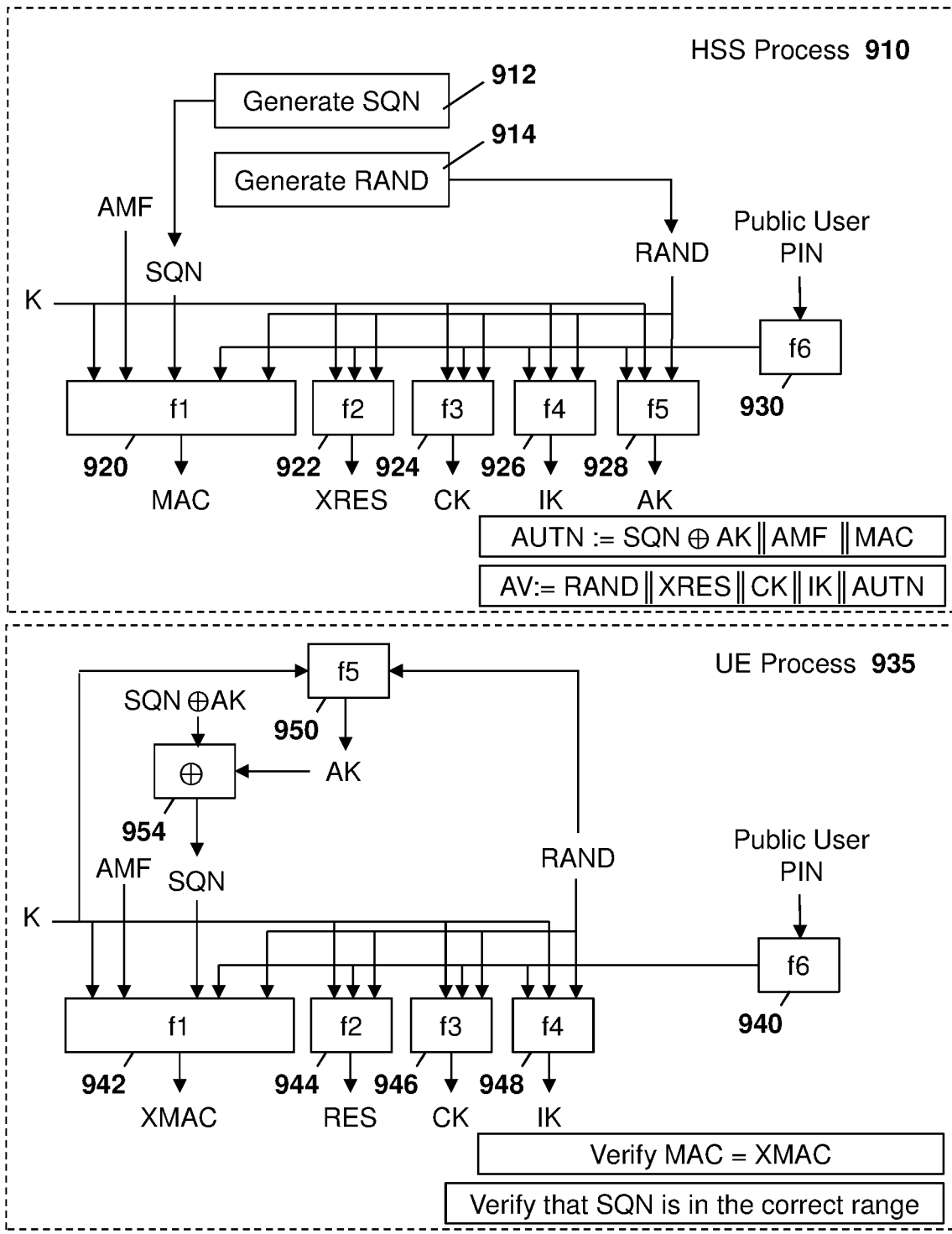
FIG. 9 is a block diagram showing a process for key generation in an HSS and a UE.

Reference is now made to FIG. 9, which shows a possible key generation implementation.

In particular, the key generation includes an HSS process 910 which includes the generation of a sequence number (SQN) block 812 and a generation of a random number (RAND) block 914. These are fed into various function blocks labelled as F1 to F5 and shown with reference numerals 920, 922, 924, 926 and 928.

In the embodiment of FIG. 9, block F1 920 includes inputs of the SQN, authentication management field (AMF) and RAND, and further includes a key value K. An authentication token (AUTN) consists of SQN⊕AK∥AMF∥MAC.

Further, blocks F2 to F5 include the key value K along with the RAND as inputs.

In the embodiment of FIG. 9, a new function F6, as shown by block 930 is also provided as an input to block 920, 922, 924, 926 and 928. Block 930 takes the public user id PIN as an input. The PIN may have been obtained from the PS-UDF ($2^{nd}$ authentication function).

On the UE side 935, the function f6 is shown by block 840 and has the public user id PIN as an input. Output from block 940 is provided to function block F1 942, as well as to block 944, block 946, block 948. Further, an encryption key K is also provided to these blocks as well as to block 950. RAND is provided also to block 950 and the SQN is derived at block 954.

The UE can then verify that the MAC=XMAC and verify that the SQN is in the correct range. Thus, FIG. 9 shows the key generation process whereby the public user ID PIN is combined either with some or all of the F1 to F5.

In order to hide the public user ID PIN, the PIN may also be sent through a function F6.

In Band-Keying Based on Public User Id, Alternative Embodiment

In an alternative embodiment, the output of the IMS AKA algorithm is now combined with the public user ID key to create a set of authentication vectors. In particular, the solution is similar to that above, but has the advantage that the operator of the HSS, which is traditionally a public operator carrier, does not get visibility of the public user ID PIN. This is achieved by combining the PIN with the private user ID authentication vectors in the AAA/PS-UDF instead of the HSS. The main difference between this embodiment and the embodiment above is the way in which the keys are generated, which is shown in FIGS. 10 and 11.

Figure 10:
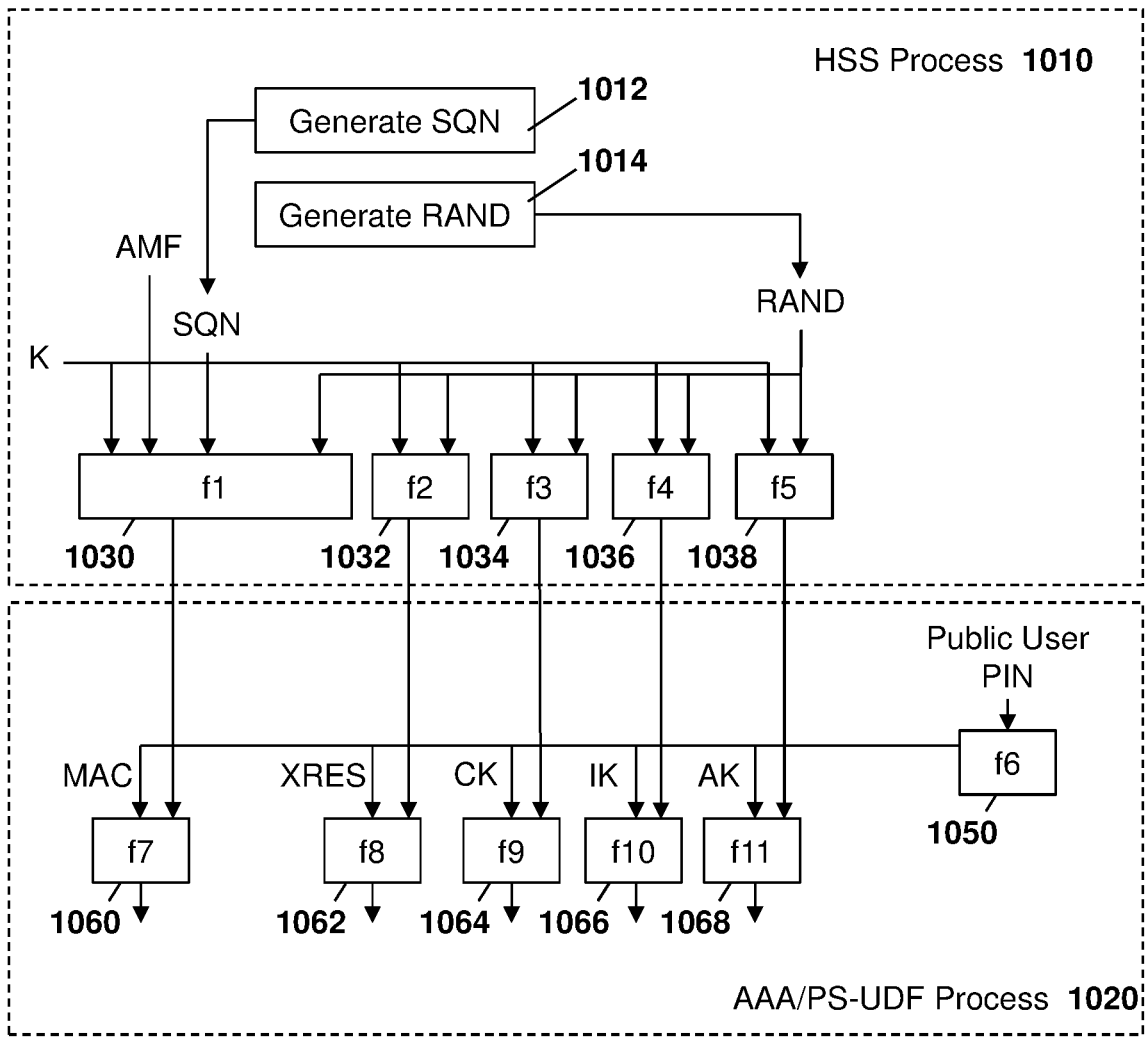
FIG. 10 is a block diagram of a key generation process at a network element in which a public user PIN is obscured from a carrier.

In particular, reference is now made to FIG. 10, which shows a diagrammatic view of the authentication vector generation in the HSS and AAA/PS-UDF. Note the HSS, AAA and PS-UDF could be a single node or multiple nodes.

An HSS process block 1010 communicates with an AAA/PS-UDF process block 1020. Thus, in accordance with the embodiment of FIG. 10, similar key generation blocks to those of FIG. 9, including an SQN block 1012, and RAND block 1014 are provided. Output from these blocks are input to function blocks 1030, 1032, 1034, 1036 and 1038. However, the output from blocks 1030, 1032, 1034, 1036 and 1038 is provided to the AAA/PS-UDF process 1020 and thus the public user ID PIN is never used at the HSS. Instead, the public user ID PIN is provided for block F6 as shown by block 1050 and can generate output for blocks 1060, 1062, 1064, 1066, and 1068.

Figure 11:
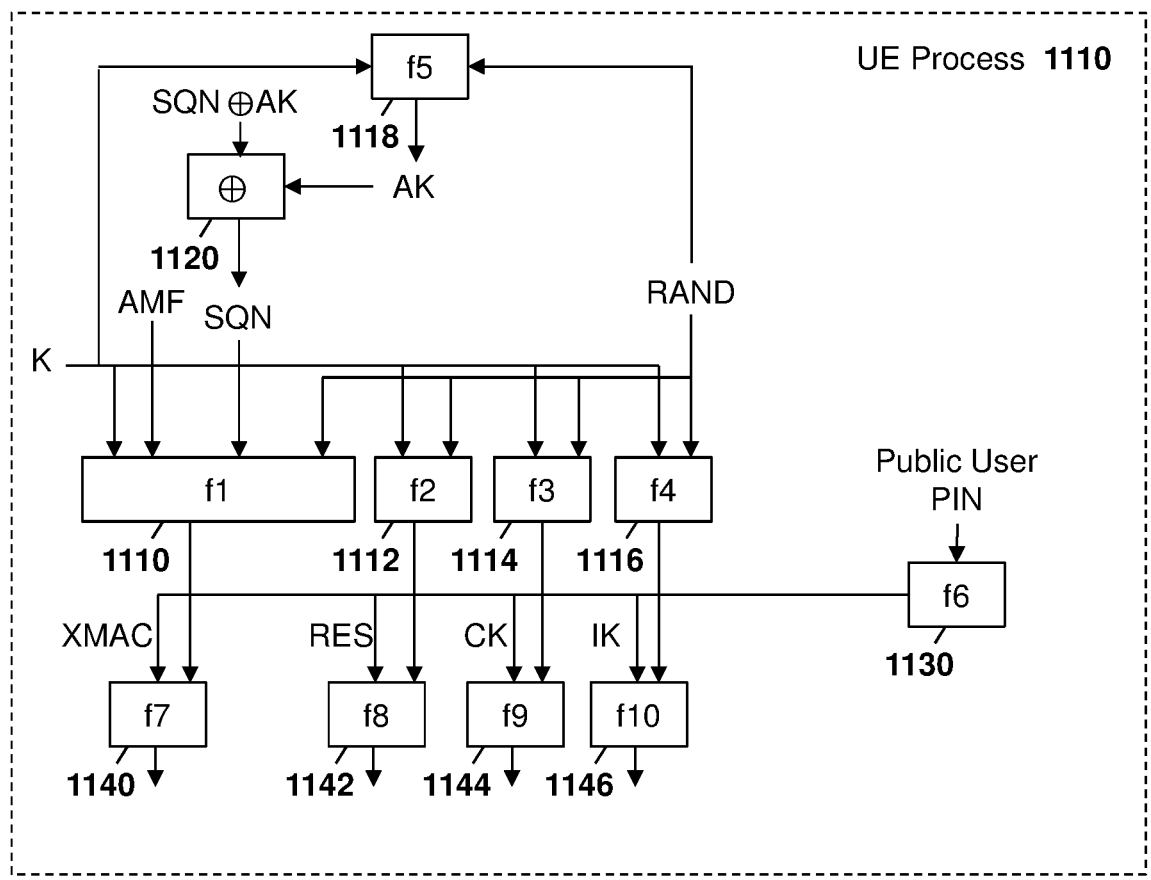
FIG. 11 is a block diagram of a key generation process at a user equipment in which a public user PIN is obscured from a carrier.

FIG. 11 shows a diagrammatic view of the authentication vector generation at the UE. In particular, the parameter key may be used as an input to function blocks 1110, 1112, 1114, 1116, and 1118. Further, the SQN can be generated at block 1120.

The public user ID PIN is provided at function block 1130 and may be provided. Along with outputs of blocks 1110, 1112, 1114 and 1116, to blocks 1140, 1142, 1144, and 1146.

Thus the use of the public user id PIN may be kept secret from the carrier.

While the solutions of FIGS. 9, 10 and 11 are provided above for in band solutions, they may be equally utilized with some of the out of band solutions described below.

Out of Band Signalling

In a further embodiment, out of band signaling may be used for authenticating an IMS individual subscriber. Out of band signaling implies that a new signaling path is used than the signaling currently used to authenticate the IMS UE. The out of band signaling mechanism can be used either before or after IMS registration.

In a first embodiment, the device may signal to a network a first authentication procedure. This may, for example, be an EAP message that authentication is required. The message may contain the public user identity for which the authentication is required, and optionally the private user identifier that the public user identifier is associated with. The network may respond with an authentication challenge that is appropriate to the EAP authentication mechanism being used.

Upon successful authentication of the public user identity, the UE then provides the same public user identity in an IMS registration message to the network as well as the private identifier used in the first authentication procedure (if it was provided at all). This is known as the second authentication procedure in the description below.

The network will then check that the public user identity has been successfully authenticated and signal the public user identity back in the response to the registration. If authentication of the public user identity was unsuccessful, the network may respond with another default public user identity that is used for configuration purposes or may allow the user a limited ability to contact staff to fix authentication problems, for example. Alternatively, the network may respond with an authentication failure indication.

Keys for the second authentication mechanism may be generated, for example, utilizing the techniques described above with regard to FIGS. 9, 10 and 11.

Thus, in accordance with one embodiment of the present disclosure, the out of band solution links the public and private user IDs together. This means that only the public user ID can be used with a specific private user ID after the public user ID has been first authenticated.

Figure 12:
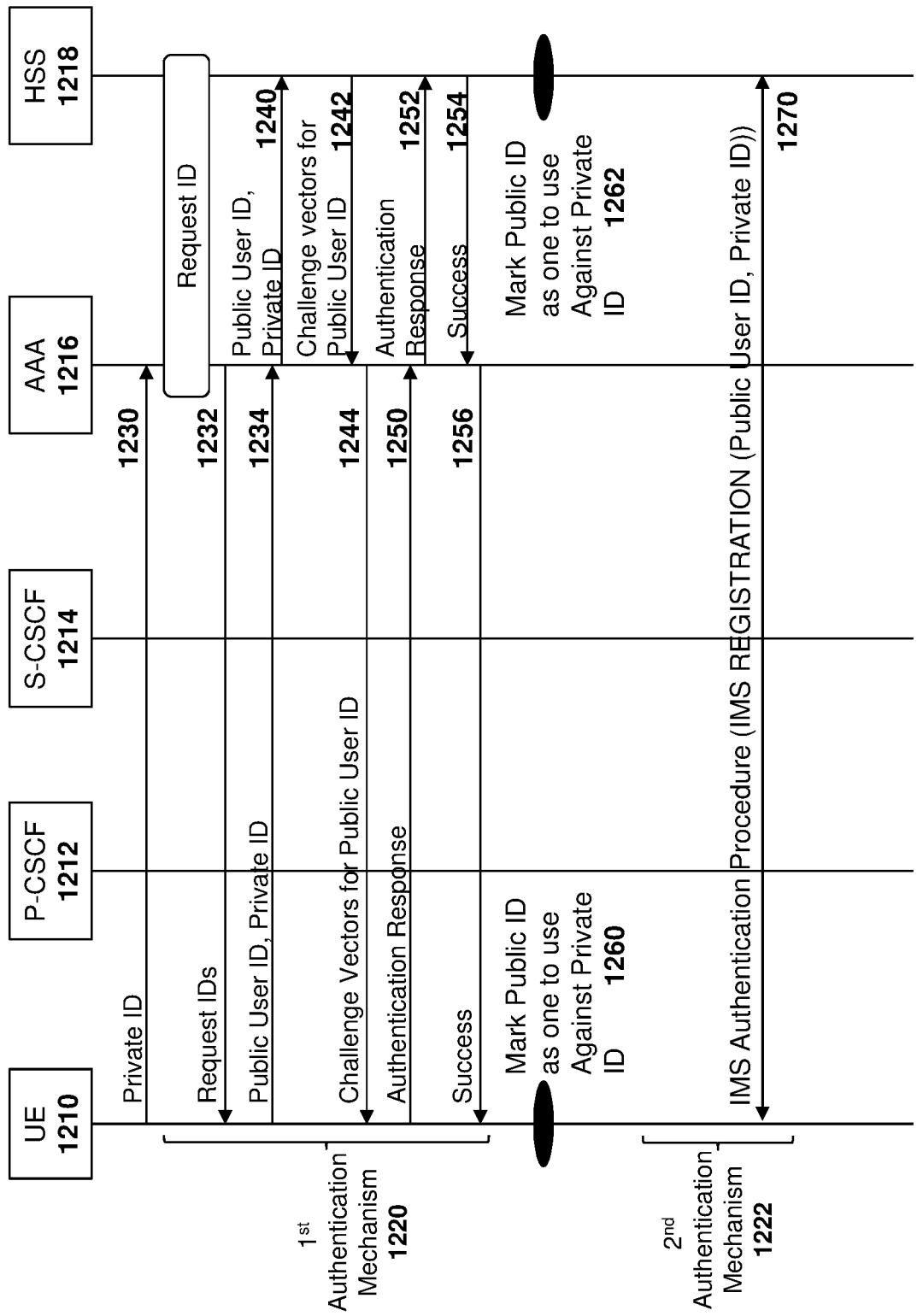
FIG. 12 is a data flow diagram showing an out of band embodiment for IMS authentication.

Reference is now made to FIG. 12. In FIG. 12, a UE 1210 communicates with a P-CSCF 1212. Further, various elements may include a S-CSCF 1214, an AAA 1216 and an HSS 1218. In some embodiments, a PS-UDF (not shown) may also be provided and could be co-located with the AAA 1216 and/or HSS 1218.

In the embodiment of FIG. 12, a first authentication mechanism 1220 is shown to be performed first. A second authentication mechanism 1222 is then shown to be performed. However, in other embodiments the second authentication mechanism 1222 could equally be performed first and the first authentication mechanism 1220 performed subsequently. In this case, in one embodiment the response to the public user identity authentication in the first authentication mechanism may need to already be available to the UE and HSS for the second authentication.

The first authentication mechanism 1220 comprises various messages. A first message 1230 sent from UE 1210 to AAA 1216 typically contains at least of a public user identity and optionally a private user identity.

AAA 1216 receives message 1230. If message 1230 does not contain two identities, then the network may send message 1232 back to UE 1210 to either request both the public user identity and private user identity or, in other embodiments, to request only the public user identity.

One example of a change to the 3GPP TS 24.302 specification to allow for the request of message 1232 is provided in Appendix O. As seen in Appendix O, an octet may be used to indicate the request for the various identities back to the UE.

Referring again to FIG. 12, once the UE receives message 1232, the UE determines whether or not to send one or both identities. If only one identity is sent back, EAP-AKA supports the sending of this one identity already.

In one embodiment, the UE will additionally send a second identity using a new encoding scheme. For example, referring to Appendix P, a possible change to the 3GPP TS 24.302 is provided in which the alternative encoding scheme is provided.

The UE will then send message 1234 back to the network, for example to AAA 1216. However, in other embodiments the receiving party may be the PS-UDF or MCPTT AS or HSS 1218.

Once the network receives message 1234, it may then provide a message to HSS 1218 containing both the private user ID and public user ID, as shown by message 1240 in FIG. 12. HSS 1218 receives message 1240 and generates authentication vectors for the public user ID and provides these back to AAA 1216 in message 1242. As described in previous in band embodiments and other out of band embodiments, the HSS can communicate with the PS-UDF to obtain authentication vectors. In addition the HSS maybe a PS-UDF.

The AAA 1216 receives message 1242 and forwards the challenge vectors to UE 1210 in message 1244.

UE 1210 receives message 1244 and generates an authentication response, which is provided back to AAA 1216 in message 1250.

AAA 1216 receives the authentication response and forwards it to the HSS 1218 in message 1252, which then checks the authentication response and provides a result back in message 1254.

If message 1254 is a success message, the success may then be forwarded to UE 1210 in message 1256.

At this point, the first authentication mechanism 1220 has been successful. In this case both the UE and the HSS mark the public user ID as the one to use against the private user ID, as shown by block 1260 for the UE 1210 and block 1262 for the HSS 1218.

The process of FIG. 12 then proceeds to the second authentication mechanism 1222. From a UE perspective, the UE performs IMS registration per 3GPP TS 24.229 and includes the public user ID and private user ID determined in the first authentication mechanism 1220.

When the UE receives the 401k challenge from the network, it optionally uses the response it used for the public authentication in the first authentication mechanism 1220 in creating the response that is put in the SIP register to the network. For example, the mechanism of FIGS. 9, 10 and 11 above may be utilized in which the response is the same as the public user identifier PIN.

From the HSS 1218 perspective, the HSS receives a request to provide authentication vectors. These authentication vectors may be created as described above with regard to FIGS. 9, 10 and 11, where the response for the public authentication in the first authentication step is the same as the public user ID PIN. The HSS then ties the public user ID to the private user ID. For example, a key overview is provided with regard to FIG. 13.

Figure 13:
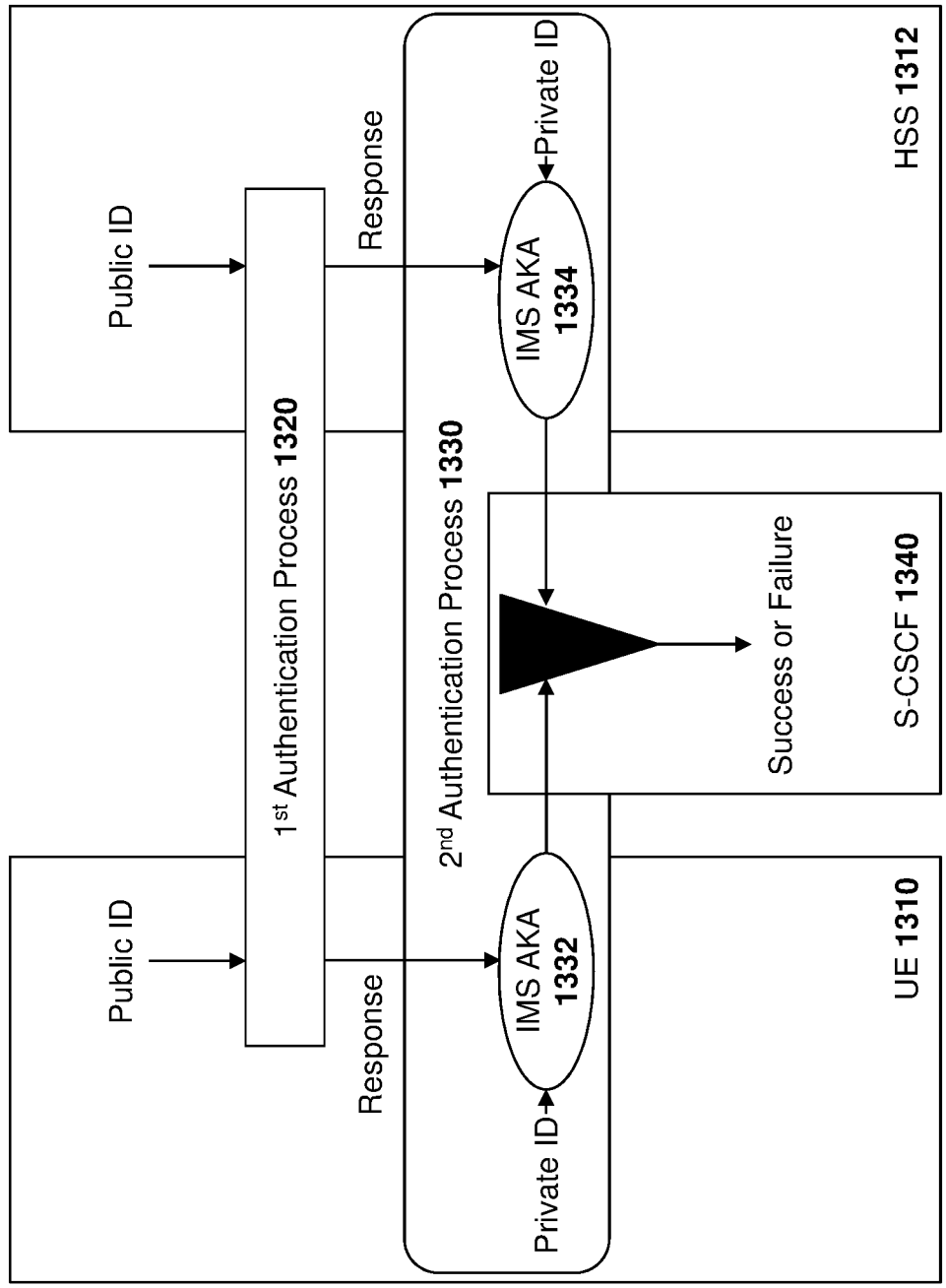
FIG. 13 is a block diagram showing an out of band authentication process.

In FIG. 13, UE 1310 and HSS 1312 proceed through an authentication procedure. A first authentication process 1320 includes the public ID 1322 as an input from both the UE and HSS.

The result of the first authentication process at each of UE 1310 and HSS 1312 is provided to the second authentication process 1330 and particularly to an IMS AKA 1332 for the UE and IMS AKA 1334 for the HSS. Described another way, as part of the $1^{st}$ Authentication Process the HSS 1312 sends a challenge to the UE 1310. At the same time the HSS calculates the Response that it expects to get from the UE. The UE responds to the challenge with a response. The Response generated by the UE is used as an input into IMS AKA 1332 and the Response generated by the HSS is used as an input into IMS AKA 1334.

The IMS AKA 1332 includes an input for the private identifier at the UE. Similarly, IMS AKA 1334 includes an input for the private identifier at the HSS.

The results of the second authentication processes (XRES) are provided to the S-CSCF 1340 which determines the success or failure.

The above therefore provides an out of band solution in which a public user ID is tied to a private ID prior to the IMS registration. However, as indicated above, the out of band authentication may also occur after IMS registration in some embodiments.

Second Out of Band Embodiment

In an alternative embodiment, the solution provided above with regard to the first out of band embodiment may be utilized. However, in a situation where a user of a first Public Safety Service provider is providing assistance to a second Public Safety Service provider and needs to use the MCPTT service of the second public safety user provider, enhancements to the solution of FIG. 12 above may be made.

Figure 14:
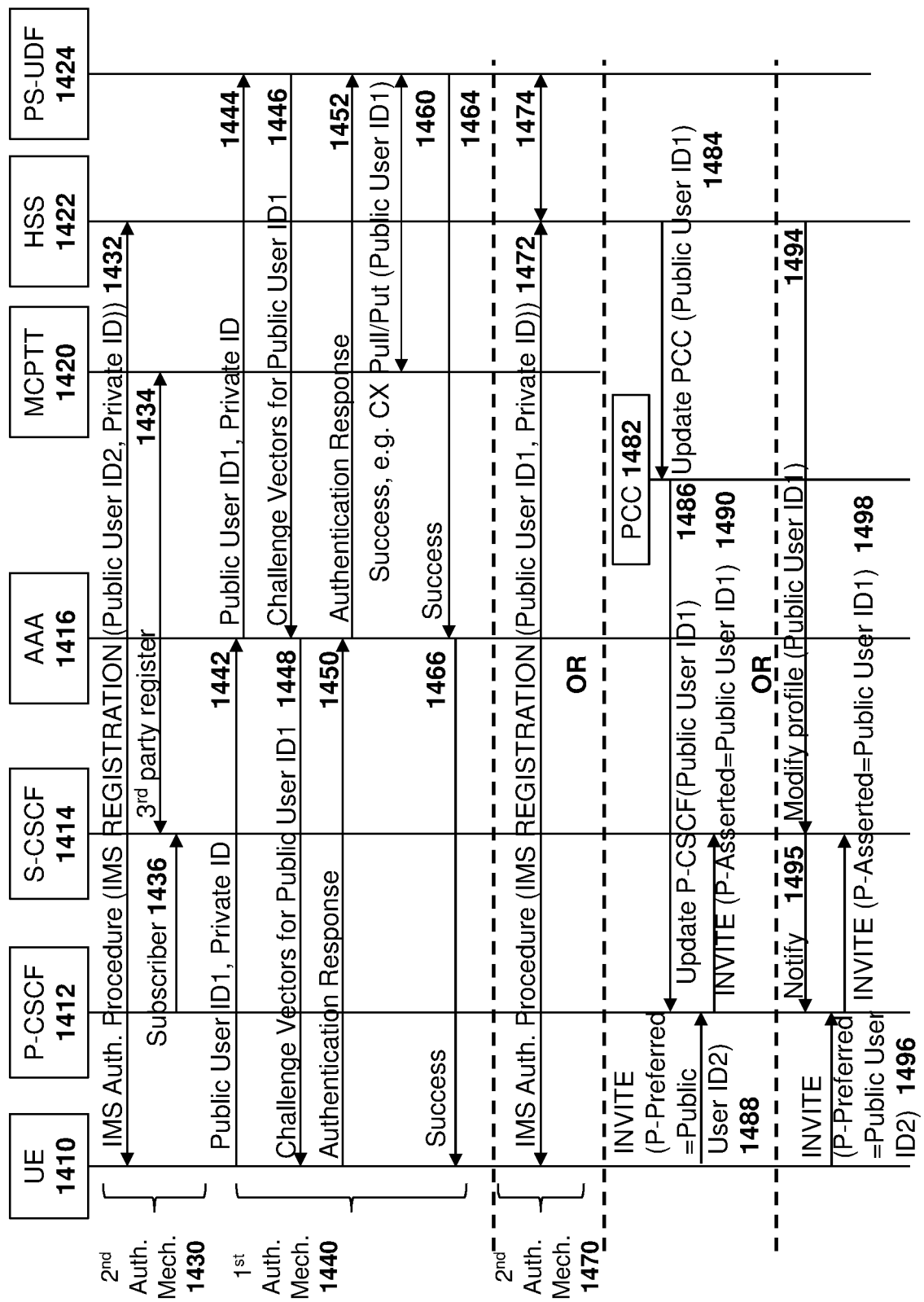
FIG. 14 is a data flow diagram showing an out of band embodiment utilizing different public user identities for authentication.

For example, if a first police officer of a first police force is assisting a second police force and needs to use the MCPTT service of the second police force, the embodiments described below with regard to FIG. 14 may be utilized. FIG. 14 may equally be used where first Public Safety Service provider is same as the second Public Safety Service provider.

In a second embodiment, the device performs a second authentication mechanism. For example such authentication mechanism may be the IMS registration with a second public user identity and a private user identity.

The IMS third party registration is then performed with the MCPTT AS. The MCPTT AS uses an enhanced Sh interface and sends an indication that the user identity has been now successfully registered for the MCPTT service.

The device may then perform a second authentication mechanism using a first public user identity via a secure tunnel that was created as part of the first IMS registration or could be part of a second authentication mechanism such as EAP-TLS.

The first public user identity is the public user identity the UE wants to use for communication. Upon successful authentication, the PS-UDF over an enhanced Sh interface signals that the first public user identity and private user identity have been successfully authenticated for the MCPTT service.

Upon success of the second authentication, in one embodiment the device performs a second IMS registration using the first public user identity. In an alternative embodiment, when the network indicates a successful authentication back to the device, the network element, such as the HSS, updates the P-CSCF with the first public user identity. This could be either via an HSS-PCC-P-CSCF to modify the public user identities in the P-CSCF by using the PCC. Alternatively this may be used via HSS-S-CSCF where the Cx interface command or message that changes the public user identity in the profile in the S-CSCF triggers a NOTIFY for the registration event package to be sent to the P-CSCF to update the identities that can be used with the private user identity.

Thus when the device sends an INVITE, the P-CSCF will assert the first public user identity for any session originations.

The above therefore provides a way to trigger configuration mechanisms so that the UE can roam to a second MCPTT network and thus provide mutual aid.

Reference is now made to FIG. 14. In the embodiment of FIG. 14, a UE 1410 communicates with a P-CSCF 1412. Further, an S-CSCF 1414 and an AAA 1416 are provided in the system.

Further, an MCPTT 1420, HSS 1422 and PS-UDF 1424 are provided in the system.

In the embodiment of FIG. 14, a second authentication mechanism 1430 is performed first. In particular, the IMS authentication registration 1432 utilizes a second public identity instead of a first public user identity. This registration process allows the UE to get basic IMS services but not MCPTT services.

The third party registration 1434 just registers the first private user identity and a second public identity with the MCPTT service. The MCPTT service then updates the PS-UDF 1424 with at least one of the private user ID, second public user identity, or device ID that have been registered with the MCPTT service.

The signaling for the above, may for example may be provided utilizing a change to the 3GPP TS 29.328. One example of such change is shown, with regard to Appendix Q.

As seen in Appendix Q, the IMS user state may be registered for a particular service such as an MCPTT or not registered for a particular service such as MCPTT.

Once the second authentication mechanism in which the second public user identifier has been used is completed, a third party register message may be provided between the MCPTT 1420 and S-CSCF 1414, as shown by message 1434 and a subscriber message 1436 may be provided between P-CSCF 1412 and S-CSCF 1414.

Subsequently, the first authentication mechanism 1440 may be performed. The first authentication mechanism 1440 is the same as that provided above with regard to the first authentication mechanism 1220 of FIG. 12. In particular, the first authentication mechanism utilizes a first public user identity and a first private user identity for the authentication. This is shown by message 1442 which is passed to the AAA 1416. The first public user identity and private user identity are then provided to the PS-UDF 1424 in message 1444.

Challenge vectors are then provided for the first public user ID, as shown in message 1446, to AAA 1416. AAA 1416 then provides these challenge vectors to UE 1410 in message 1448.

The UE then provides an authentication response shown by message 1450 to AAA 1416. The authentication response is forwarded to the PS-UDF 1424 in message 1452. If the authentication process is successful, the PS-UDF 1424 (or the AAA in some cases) updates the MCPTT server 1420, as shown by message 1460 via the Sh interface. An example message is shown with regard to Appendix K, as described above. The message on the Sh interface contains the $1^{st}$ Public User Identity and optionally the first private user identity. The MCPTT server is then able to correlate that the $1^{st}$ Public User identity has been registered from the same device the $2^{nd}$ Public User identity was registered from in the $2^{nd}$ authentication mechanism. Equally the Sh interface can be used so the MCPTT server can provide the first private user identity and $2^{nd}$ Public User identity to the PS-UDF so it can create a relationship between $1^{st}$ Public User identity, $2^{nd}$ Public User identity and first private user identity. The PS-UDF can then update the HSS with this relationship, as shown by message 1474. The term "update" as used herein means that the HSS may query the PS-UDF to determine if $1^{st}$ Public User identity can be used with the first private user identity, or PS-UDF provides information to the HSS so that it can create a relationship between $1^{st}$ Public User identity, $2^{nd}$ Public User identity and first private user identity.

Messages 1464 and 1466 may be provided to show success. In particular message 1464 is provided from PS-UDF 1424 to AAA 1416. The message 1466 is provided from AAA 1316 to UE 1410.

The Sh notification could be enhanced to provide an indication that authentication for the MCPTT service has been successful. An example message with enhancements is shown in Appendix R below.

As seen in Appendix R, possible changes to 3GPP TS 29.328 are provided which allow for a device to be registered or not registered for the service X (can be MCPTT or PTT). Further, the information element contains a device ID of the device that the IMS user has registered for the MCPTT services.

After the first authentication mechanism, a second authentication mechanism 1470 may occur as described above with regard to the second authentication mechanism 1222 of FIG. 12.

Further, once the first authentication step has been successful the HSS 1422 then updates the network to use different public user identity, two optional elements are provided. In a first optional mechanism, the HSS 1422 may update the PCC 1482 with an updated PCC message 1484. The PCC may then update the P-CSCF 1412 in message 1486.

The P-CSCF 1412 may then translate incoming messages. Thus, the UE 1410 may send an INVITE 1488 with the second public identity and this invite is then translated at P-CSCF 1412 to reflect the first identity, as shown by message 1490.

In a further alternative, HSS 1422 may modify the profile for the first public user identity, as shown by message 1494 which may be then notified to P-CSCF 1412 in message 1495.

The UE 1410 may then provide an INVITE with the second user identity, shown by message 1496, which may be translated by the P-CSCF 1412. P-CSCF 1412 may then forward the INVITE, but having the first user identity, as shown with message 1498.

Out of Band Mutual Aid

In a further embodiment of the out of band solution, a first authentication mechanism is performed in which additional enhancements allow a network to request, and the UE to provide, information regarding the PLMN it is registered on in the authentication mechanism. This PLMN information is then used to determine which public service safety provider should be contacted.

A new message is sent from the MCPTT server of the first public safety operator to the PS-UDF of the second public safety operator to request a private user ID. It may be that such message includes the public user ID of the user being authenticated.

The PS-UDF of the second public safety operator then provides back the private user ID and public user ID. This information may be then sent to the UE via messaging such as open mobile alliance (OMA) device management, hypertext transfer profile (HTTP), XML Configuration Access Protocol (XCAP), or over the air (OTA) message to the USIM or ISIM application, where new fields are present that store this information.

The UE may then perform a second authentication mechanism using the new private and public user identifiers. When the PS-UDF of the second safety operator receives the second authentication mechanism, it then contacts the PS-UDF of the first public safety operator to obtain the credentials and uses them to authenticate the user.

Figure 15:
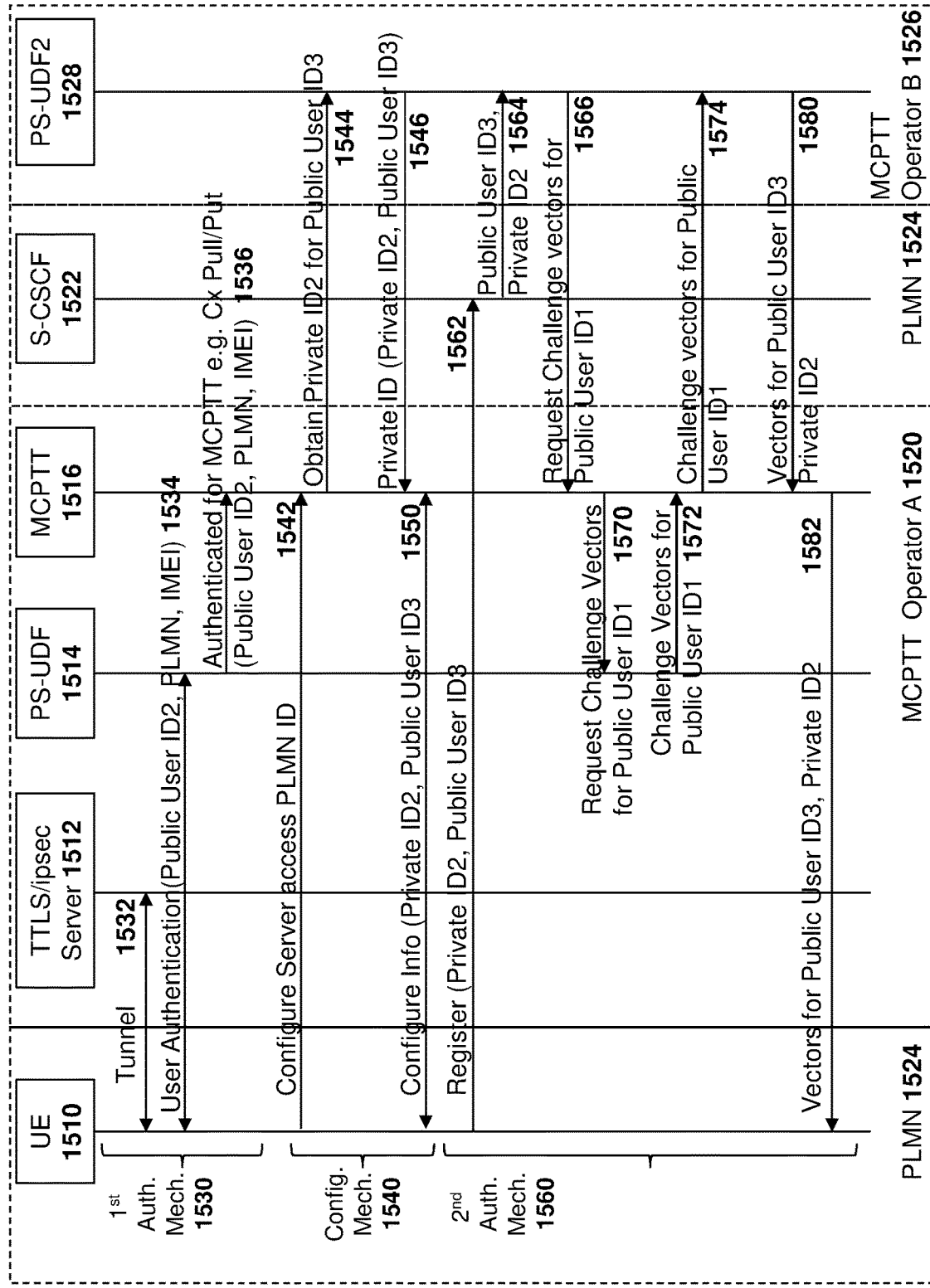
FIG. 15 is a data flow diagram shown an out of band embodiment in which a UE can roam into a second MCPTT network.

Reference is now made to FIG. 15 in which a UE 1510 communicates through a TTLS/IPSec server 1512 with a PS-UDF 1514 and MCPTT server 1516 of the first MCPTT operator 1520. An S-CSCF 1522 of PLMN 1524 is utilized for the MCPTT of the first operator 1520. Note that TTLS/IPSec server 1512 could be combined with either or both of the PS-UDF 1514 and MCPTT server 1516. Such an implementation is shown as a dotted line 1590.

A second MCPTT operator 1526 has a second PS-UDF 1528.

In the embodiment of FIG. 15, UE 1510 contains a first private user identity, a second public user identity, a device identity and a certificate that could be linked to the first private and/or public user identity.

A first authentication mechanism 1530 is provided. As part of an optional first part of authentication mechanism 1530, UE 1510 could set up a TTLS/ipsec tunnel with a TTLS/ipsec server 1512, as shown by messages 1532. In one embodiment the TTLS/ipsec server could be an AAA server, a PS-UDF or an MCPTT AS, or could be a combination of some or all of these servers.

The UE 1510, as part of the tunnel setup, includes a certificate. Possible certificate mechanisms are described below. The certificate may have a relationship between the device and/or private user ID being used with that device. As part of such mechanism, the network may request specific attributes from the UE. Such attributes may include, but are not limited to: an identity that identifies the user equipment and a network that the UEs registered on.

These attributes are requested by sending a request from the network to the UE. If the TTLS/ipsec server 1512 communicates with a AAA server (not shown) or a PS-UDF, then the AAA server or the PS-UDF could send the attribute request via the TTLS/ipsec server to the UE. Or, if all of the servers are combined in a network node then the network node sends the request to the UE for the attributes.

EAP extension attributes may be provided for such request. These are, for example, shown in Appendix S, which shows that an octet may be used for requesting certain information.

A first authentication mechanism may then be used. Examples of such first authentication mechanisms are described above with regard to FIG. 12 or 14.

As shown by message 1534, the authentication mechanism may provide certain information. In one option the UE may send an identity including a second public user identity to be authenticated. Optional additional information to be sent may include, but is not limited to, a device identifier that identifies the equipment and/or a network that the UE is or was registered on. This additional information may be obtained by the network node, for example by PS-UDF 1514 sending a message to the UE. Such message may include indicators that ask for additional information, including for example the PLMN the UE is registered on, the device ID, among other information. The UE receives this message and sends a message to the network, for example to the PS-UDF, containing a device identifier that identifies the equipment and/or a network that the UE is or was registered on.

The additional information may be sent based on the receipt, at the UE, of the request of a message as shown in Appendix S.

Upon successful authentication, the PS-UDF 1514 sends an indication to the MCPTT AS 1516 that authentication for the second public user identity has been successful. This is shown in message 1536. The first private user identity, first public user identity, second public user identity, PLMN and IMEI may also be indicated. The PS-UDF 1514 in one implementation could be the MCPTT AS. One example of possible changes to the 3GPP TS 24.302 specification for this are shown with Appendix T below. Note the first public user identity could have been derived from the certificate exchange that has taken place in authentication mechanism 1530 and is explained in more detail below.

Once the first authentication mechanism 1530 is finished, a configuration mechanism 1540 may occur. One skilled in the art will appreciate that the authentication mechanism shown in message 1534 can be exploded out to be that as described in but not limited to authentication mechanisms 1440, 1220, among others.

During the configuration mechanism, a message 1542 may be provided from UE 1510 to the MCPTT AS 1516. Message 1542 may optionally provide a configuration request to the network. It may contain the PLMN identity of the network that the UE has registered on. This request may occur because the UE uses OMA management objects for configuration of the MCPTT identities.

MCPTT AS 1516 may then request a second private identifier and $3^{rd}$ public user identity from the second MCPTT operator 1526 as shown by message 1544. Message 1544 may contain 0 or more of: a first private user identity, a first public user identity, a second public user identity. The MCPTT operator 1526 may be derived based on static configuration or by performing a DNS look up on the PLMN identity that the UE is registered with.

The second PS-UDF 1528 receives message 1544. In one embodiment the MCPTT AS may only send the first public user ID to the second PS-UDF 1528 in order to ensure that the first private user ID is not released.

The second PS-UDF 1528 associates the second private user ID with the following, if received: the first private user identity; the first public user identity; the second public user identity; and/or the equipment identity.

PS-UDF 1528 sends at least one of the second private user identity and a third public user identity back in message 1546. MCPTT AS 1516 receives at least one of the second private user identity and the third public user identity.

The UE may then be provisioned with data. A data model can be found in FIG. 16 below, where the UE is provisioned with the private identifier and public identifier. Those skilled in the art will appreciate that this is an example of an OMA Device Management (DM) Object that describes a set of data. However it can be equally used as an abstract data model. For example, the private identifier could be an IMSI as defined in E.212 or a network address indicator (NAI) as defined in RFC 4282. The public ID could be an MSISDN as defined by E.164 or an NAI as defined by RFC 4282 whereby the NAI also may contain a digit strings that represents the MSISDN.

A validity area for these identities that could be specific to a PLMN, a region within the PLMN, geographical area or even WLAN or combination thereof.

Figure 16:
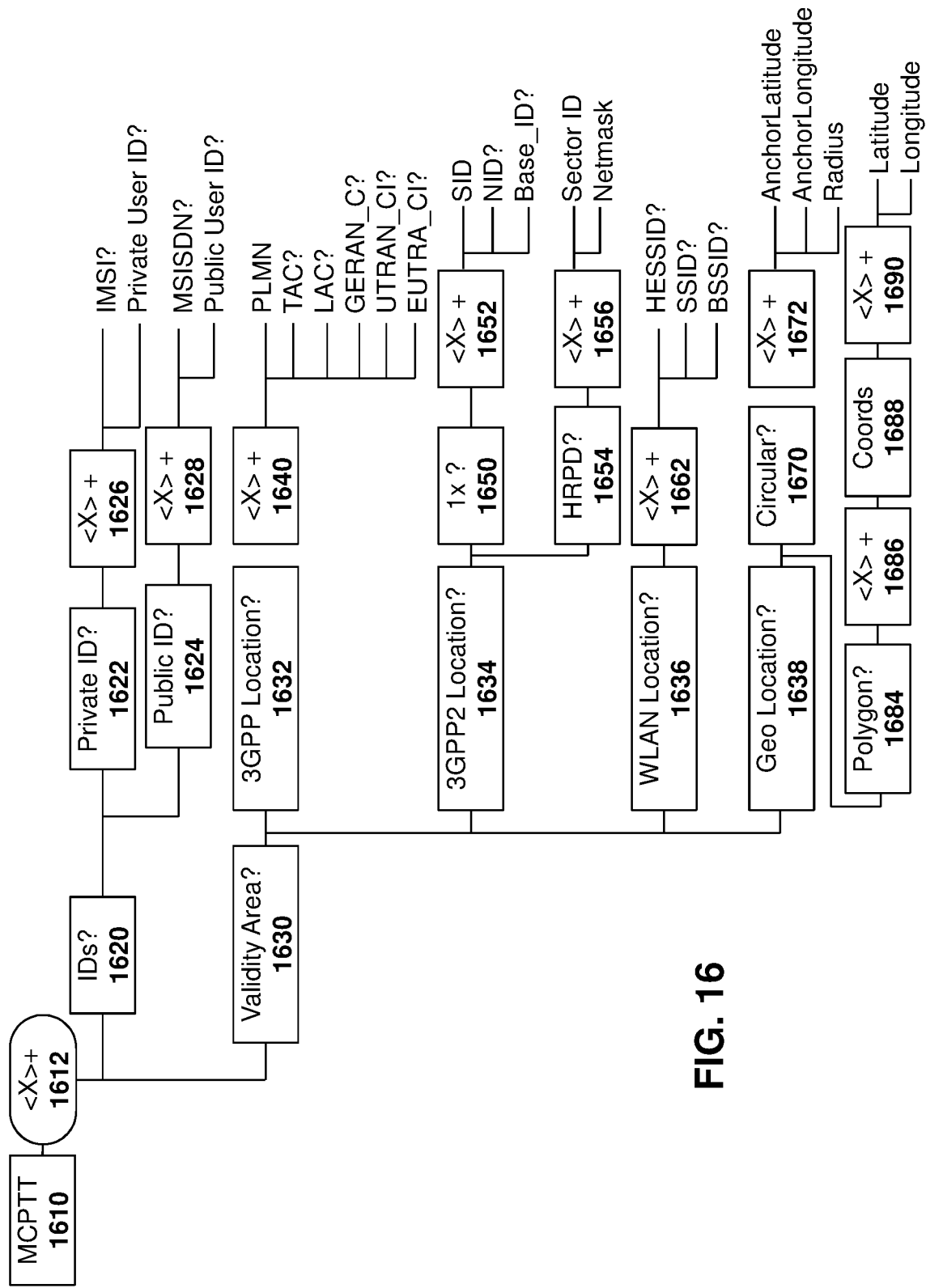
FIG. 16 is a block diagram showing an example data structure for MCPTT data.

For the purposes of describing FIG. 16 the analogy of a book/novel shall be used. However, as identified, OMA DM describes the nomenclature of the diagrams in detail. Thus, referring to FIG. 16, an MCPTT 1610 may have 0 to multiple pages, as shown by block 1612.

In the embodiment of FIG. 16, a question mark indicates an optional element. Thus, one option element includes a series of identifiers 1620. Each identifier may either be a private identifier 1622 or a public identifier 1624, and may include various paragraphs (e.g. sets of data items) 1626 and 1628 which may include IMSIs or private user identifiers or MSISDNs or public user identifiers. Note a set may contain 0 to many entries.

The pages may each also contain a validity area 1630. The validity area may be based on a 3GPP location 1632, a 3GPP2 location 1634, a WLAN location 1636 or a geographic location 1638, among others.

Each location may then have several criteria to make determinations. Thus, a 3GPP location may have various paragraphs 1640, and may include information such as a PLMN, Type Allocation Code (TAC), Location Area Code (LAC), GSM Edge Radio Access Network (GERAN) Cell Identifier (CI), Universal Mobile Telecommunications Service (UMTS) Terrestrial Radio Access Network (UTRAN) CI, Evolved Universal Terrestrial Radio Access (EUTRA) CI, among other information.

A 3GPP2 location may have a check to determine if the connection is a 1× connection as shown by block 1650 in which case multiple paragraphs 1552 may be provided. Information in these paragraphs may include system ID (SID), network ID (NID) or a base ID.

Similarly, if the 3GPP location is high rate packet data (HRPD) as shown by block 1654, then multiple pages 1656 may be provided. These pages may include information such as a sector ID or netmask.

A WLAN location 1636 may have various paragraphs 1662. Information in these paragraphs may include a homogenous extended service set identifier (HESSID), a service set identifier (SSID), or basic service set identifier (BSSID), among other information.

A Geograpic location 1638 may have a check to determine if it is a circular location shown by block 1670 in which case multiple paragraphs 1672 may be provided. Information in these paragraphs may include an anchor latitude, an anchor longitude, and a radius, among other information.

Further, the geographic location 1638 may check this to determine if the location is a polygon as shown by block 1684, in which case multiple paragraphs 1686 may be provided.

Paragraphs 1686 may include including coordinates 1688, which themselves have multiple paragraphs 1690. Information in paragraphs 1690 may include latitude and longitude.

Referring again to FIG. 15, once a MCPTT 1516 receives the information of message 1546 then a configuration may occur between the UE and the MCPTT, as shown with arrow 1550. In arrow 1550, if the USIM/ISIM is used, the MCPTT AS sends a message containing a least of, but not limited to, the second private user ID and the third public user ID, and optionally PLMN information.

In one embodiment, messages 1546 and 1550 are optional, and in this case, the MCPTT AS 1516 would need to generate the third public user ID. However, in this case the second private user ID would not be generated.

In the MCPTT AS 1516, a mapping occurs between some or all of the following: a first private user identity; a first public user identity; a second public user identity; an equipment identity; a second private user identity; and a third public user identity.

Message 1550 could be short message service (SMS) message containing Over The Air (OTA) information. The over the air message sequence could include a USAT REFRESH command with a qualifier "MCPTT private user ID update".

The UE, upon receipt of the configuration information at message 1550 could decode the message. The SMS destination address could be second public user ID. In one embodiment Appendix U shows possible changes to the 3GPP TS 31.103 specification which could equally apply in 3GPP TS 31.102.

Further, the command details could be provided in accordance with Appendix V, which show possible changes to the ETSI TS 102 223 specification.

If the ME receives a USAT REFRESH command qualifier of type "MCPTT private user ID update", the ME can update the private identifier on the device.

Alternatively, if an OMA DM, HTPP or XCAP are used then the UE receives the configuration for the UE by sending a message to the network (e.g. MCPTT AS etc). The network will respond back with configuration information which can include one or more of a private ID, public ID and network code. The information that may sent is shown with regard to FIG. 16.

Once the configuration mechanism 1540 is complete, a second authentication mechanism 1560 could occur. The second authentication mechanism 1560 includes a registration message 1562. Such message may be a SIP Register containing the second private user ID and optionally a third public user identifier. If the second private user ID was not received in the configuration information of message 1550, then the first private user ID would need to be used with the third public user identifier.

As will be appreciated by those in the art, the public and private user identifiers to use will be based on the PLMN that the UE is registered on. This means that if the ME may compare the registered PLMN (RPLMN) with the PLMNs in the validity area/3GPP location/<x>/PLMN leaf of FIG. 16. If there is a match then the public and private user ID that are used are associated with that PLMN. When the information is stored on the USIM/ISIM as shown in Appendix U the ME will compare the RPLMN with the PLMN field and choose the appropriate data.

The S-CSCF receives message 1562 and may optionally provide message 1564 to PS-UDF 1528. Message 1564 only occurs if the second private user identity has been used in message 1562. The second PS-UDF 1528 receives message 1564 and PS-UDF 1528 may use this information to create a mapping. Message 1566 may then be sent to MCPTT 1516 to obtain the authentication vectors for the first private ID if available, otherwise for the first public user ID. For example, message 1566 contains within its contents the first private ID if available and or the first public user ID.

MCPTT 1516 receives the message, and sends message 1570 to the PS-UDF 1514 requesting authentication vectors for the first private ID if available and/or the first public user ID. If the first public user ID was received, the MCPTT AS will use the mapping created above to determine the private user ID.

PS-UDF 1514 receives message 1570 requesting authentication vectors and generates the vectors. PS-UDF then sends message 1572 containing the authentication vectors for the first private user ID back to MCPTT 1516.

The MCPTT 1516 receives message 1572 containing the authentication vectors for the first private user ID and sends the message to the second PS-UDF 1528, as shown by message 1574. The second PS-UDF may then generate vectors for the third public user identity and second private user identity and these may be forwarded to the UE, as shown by messages 1580 and 1582.

As will be appreciated by those skilled in the art, FIG. 15 is merely an example. In alternative embodiments, the UE may perform the second authentication first, using the private user identity and public user identity stored on the UE. The UE may then perform the first authentication mechanism subsequently.

Further, in the context of the disclosure above, a second authentication mechanism is described in numerous embodiments with labels 1222, 1430, 1470, 1560. One will appreciate that the examples are based upon the SIP REGISTRATION procedure that as also includes an optional authentication component. Such SIP registration process has been described above with regards to FIG. 2. Per 3GPP TS 33.203, the 2nd Authentication mechanism starts by UE sending a SIP Register message to the network, the UE then receives a message from the network that contains the authentication challenge to which the UE will respond with another Register message.

Certification Generation Processes

In a further embodiment, instead of the enhancements to the protocols listed above to obtain private IDs, public IDs and device IDs, it is also possible to use certificates which could be used as well in conjunction with those embodiments described above.

The UE performs a first authentication mechanism procedure as described above and sets up a tunnel. After the tunnel has been set up, authentication of the first public user identity can take place using any authentication scheme. Examples of such authentication schemes include EAP, challenge handshake authentication protocol (CHAP), password authentication protocol (PAP), or message-digest 5 (MD-5), among others.

Thus, a first secure tunnel is set up between the UE and the network and then, within the tunnel, authentication of the public user identity takes place.

In the initial tunnel set-up a certificate may be provided. This, for example, could be an x.509 certificate. The certificate may be created in a new way in accordance with the description below. In one embodiment, the certificate may be pre-provisioned and may be linked to either the device ID or the private user identifier from the UICC.

The setting up of a tunnel creates a relationship in the network between the device and the private identifier. Then the public user identity authentication phase starts between the ME and the AAA server. If the AAA server is co-located with TTLS server, then there is a relationship in the TTLS server between the device ID, private ID, and public user ID. The TTLS/AAA server could be an IMS AS and in the context of the description above it may also be an MCPTT AS.

The UE performs a second authentication mechanism such as an IMS registration, which may take place either before or after the first authentication mechanism (e.g. the second authentication mechanism could have been an EAP-TTLS procedure). In the IMS registration the device includes the private user identifier that is linked to the certificate in the first authentication mechanism (e.g. that could have been EAP-TTLS operation) and a second public user identity. The S-CSCF in the IMS network performs a third party registration with the MCPTT AS which may include, but is not limited to, the IMS private user identifier, a second public user identifier for IMS and a device identifier.

At this point, there is now a linkage between the MCPTT AS and the IMS private user identifier, the second IMS public user identifier, the first public IMS user identifier and the device identifier.

Now when the MCPTT AS receives session requests, it has the option to hide the IMS second public user ID from the IMS network.

Figure 17:
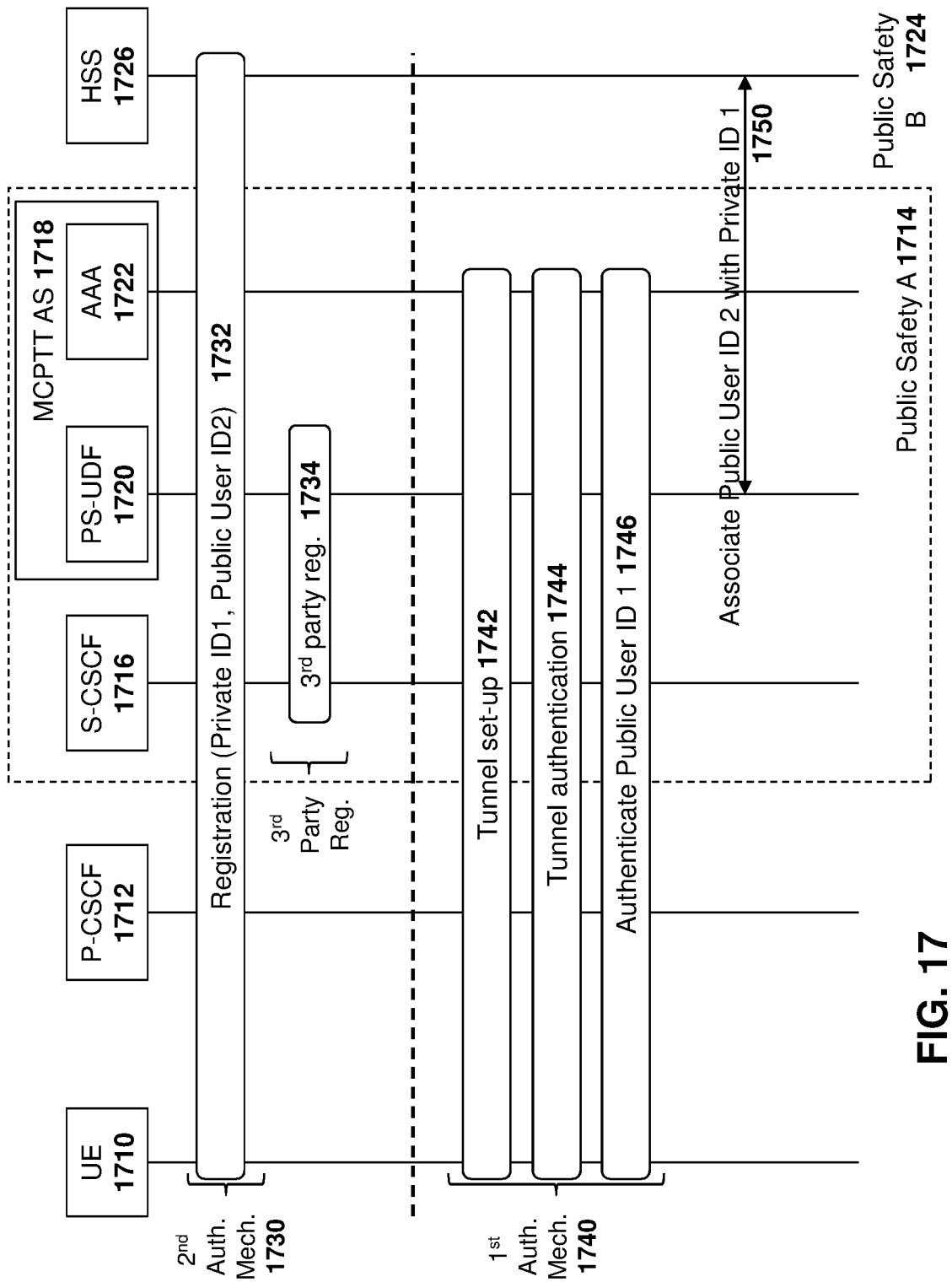
FIG. 17 is a data flow diagram showing authentication utilizing certificates.

Reference is now made to FIG. 17, which shows a UE 1710, P-CSCF 1712, a first public safety authority 1714 having a S-CSCF 1716 and an MCPTT AS 1718.

The MCPTT AS 1718 includes a PS-UDF 1720 and an AAA 1722.

A second public safety authority 1724 includes HSS 1726.

In the embodiment of FIG. 17, a second authentication mechanism 1730 occurs first, in which a registration between the UE and the second public safety authority happens. Registration includes the first private identity and a second public identity. In particular, as shown by block 1732 the registration includes the first private ID and second public user ID.

Based on the registration message of block 1732, a third party registration 1734 may occur.

The UE will start the second authentication process using the first private user ID and second public user ID stored in the IMSI on the device. Upon completion of the process, the S-CSCF will do a third party registration with the MCPTT AS. In the third party registration the first private user ID and second public user ID are included. The MCPTT server will receive this information and then map the first private user ID with the second public user ID against data stored.

Upon successful second authentication, a first authentication mechanism 1740 starts. The first part of the first authentication mechanism 1740 is a tunnel setup 1742. In the example of FIG. 17, it is the MCPTT AS 1718 that has the authentication function and the tunnel setup with the MCPTT AS.

As shown by block 1744, tunnel authentication next takes place. Certificates are exchanged between the UE and the network. The certificate is such that some or all of the following may be derived from it: the first private user ID on the (U)/ISIM; the second public user ID on the (U)/ISIM; and the IMEI or device identifier. During the tunnel setup authentication process, the MCPTT AS 1718 will create a database of the relationship between these items.

As shown by block 1746, after successful creation of the tunnel another authentication process will be started to authenticate the public user ID that is using the device. For example, such ID may be police officer credentials. This will be called the first public user ID.

Upon successful authentication the MCPTT will associate this identifier with the information stored in the database described above, as shown by arrow 1750.

Examples of certificates are provided below.

First Certificate Option

Figure 18:
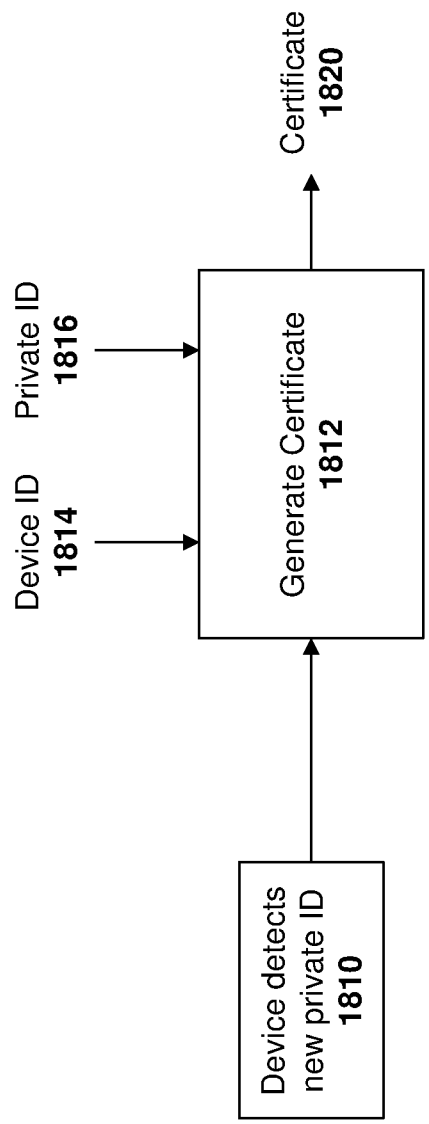
FIG. 18 is a block diagram showing the generation of a certificate.

Reference is now made to FIG. 18 which shows a device detecting a new private identifier at block 1810 and generating a certificate at block 1812. The generating certificate includes the device identifier 1814 and a private identifier 1816 as inputs to the generation block 1812. Blocks 1810 and 1816 both contain the same Private User identity.

A certificate 1820 is provided as an output to generation block 1812.

In one embodiment the device may or may not contain an initial certificate. Upon detection of a new UICC being inserted into the device or the detection that the IMSI or UICC code has changed, or a new USIM or ISIM is activated then the device will request a new certificate. The activation may, for example, be that the IMSI or IMS private user identity has changed.

The certificate that is created will identity the UICC/USIM/ISIM combination with the ME.

Second Certificate Option

In a second certificate option, a device ME_A is provisioned with a first certificate, where the first certificate contains a first public key that is used to verify signatures created by a first private key. The first private key is also provisioned to the ME_A.

USIM_A is inserted into the device with IMSI_A and a User_A logs into the device using UserIdA and pwdA.

Device ME_A signs [IMSI_A, pwdA, T_now] at time T_now to form the signature SigA.

Device sends CertA, SigA, [IMSI_A, UserIdA T_now] to the public safety operator who can now:
1) Identify ME_A from CertA
2) User_A from UserIdA and pwdA (assuming the public safety operator has its own copy of pwdA)
3) USIM_A from IMSI_A All of these identities may be authenticated by verifying SigA where:
1) The signature SigA is computed using IMSI_A, UserIdA and KeyA, T_now.

2) The signature SigA is authenticated using SigA, IMSI_A, UserIdA, T_now and PubKeyA The above therefore provides means to authenticate a user of a shared device without the need to change the UICC. The solutions provide various degrees of confidentiality of the user using the phone. The later out of band solutions provide means to hide a user, thus allowing the public safety operator to decide what information should be visible in the IMS network. They also provide various degrees of linkage between the IMS authentication mechanism and the user authentication mechanism.

The above creates a linkage so that the user, when authenticated on that device has to continue a session on that device unless they are authenticated again. The single logon does not allow a user to swap UICC SIM cards between devices for malicious purposes. Certificates on the device can be such that they can only be provisioned by the public safety operator, allowing only valid devices to be used on the network.

Figure 19:
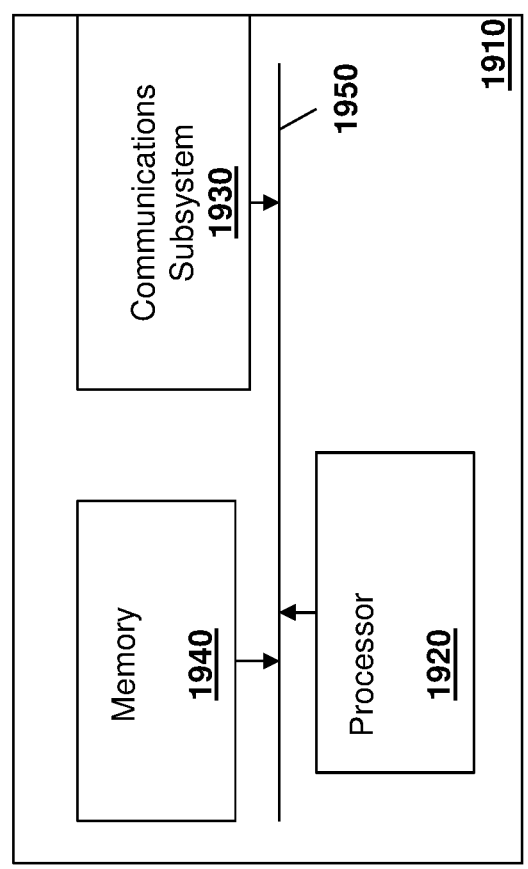
FIG. 19 is a simplified block diagram of an example network element.

The servers and network elements in the embodiments of FIGS. 1 to 17 above can be any network element, or part of any network element, including various network servers. Reference is now made to FIG. 19, which shows a generalized network element.

In FIG. 19, network element 1910 includes a processor 1920 and a communications subsystem 1930, where the processor 1920 and communications subsystem 1930 cooperate to perform the methods of the embodiments described above.

Processor 1920 is configured to execute programmable logic, which may be stored, along with data, on network element 1910, and shown in the example of FIG. 19 as memory 1940. Memory 1940 can be any tangible, non-transitory, storage medium.

Alternatively, or in addition to memory 1940, network element 1910 may access data or programmable logic from an external storage medium, for example through communications subsystem 1930.

Communications subsystem 1930 allows network element 1910 to communicate with other network elements. Examples of protocols for communication subsystem 1930 include cellular, Ethernet, WiFi, WiLAN, among others.

Communications between the various elements of network element 1910 may be through an internal bus 1950 in one embodiment. However, other forms of communication are possible.

Further, the above may be implemented by any UE. One exemplary device is described below with regard to FIG. 20.

UE 2000 is typically a two-way wireless communication device having voice and data communication capabilities. UE 2000 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 2000 is enabled for two-way communication, it may incorporate a communication subsystem 2011, including both a receiver 2012 and a transmitter 2014, as well as associated components such as one or more antenna elements 2016 and 2018, local oscillators (LOs) 2013, and a processing module such as a digital signal processor (DSP) 2020. As will be apparent to those skilled in the field of communications, the particular design of the communication subsystem 2011 will be dependent upon the communication network in which the device is intended to operate.

Network access requirements will also vary depending upon the type of network 2019. In some networks network access is associated with a subscriber or user of UE 2000. A UE may require a removable user identity module (RUIM) or a subscriber identity module (SIM) card in order to operate on a CDMA network. The SIM/RUIM interface 2044 is normally similar to a card-slot into which a SIM/RUIM card can be inserted and ejected. The SIM/RUIM card can have memory and hold many key configurations 2051, and other information 2053 such as identification, and subscriber related information.

Figure 20:
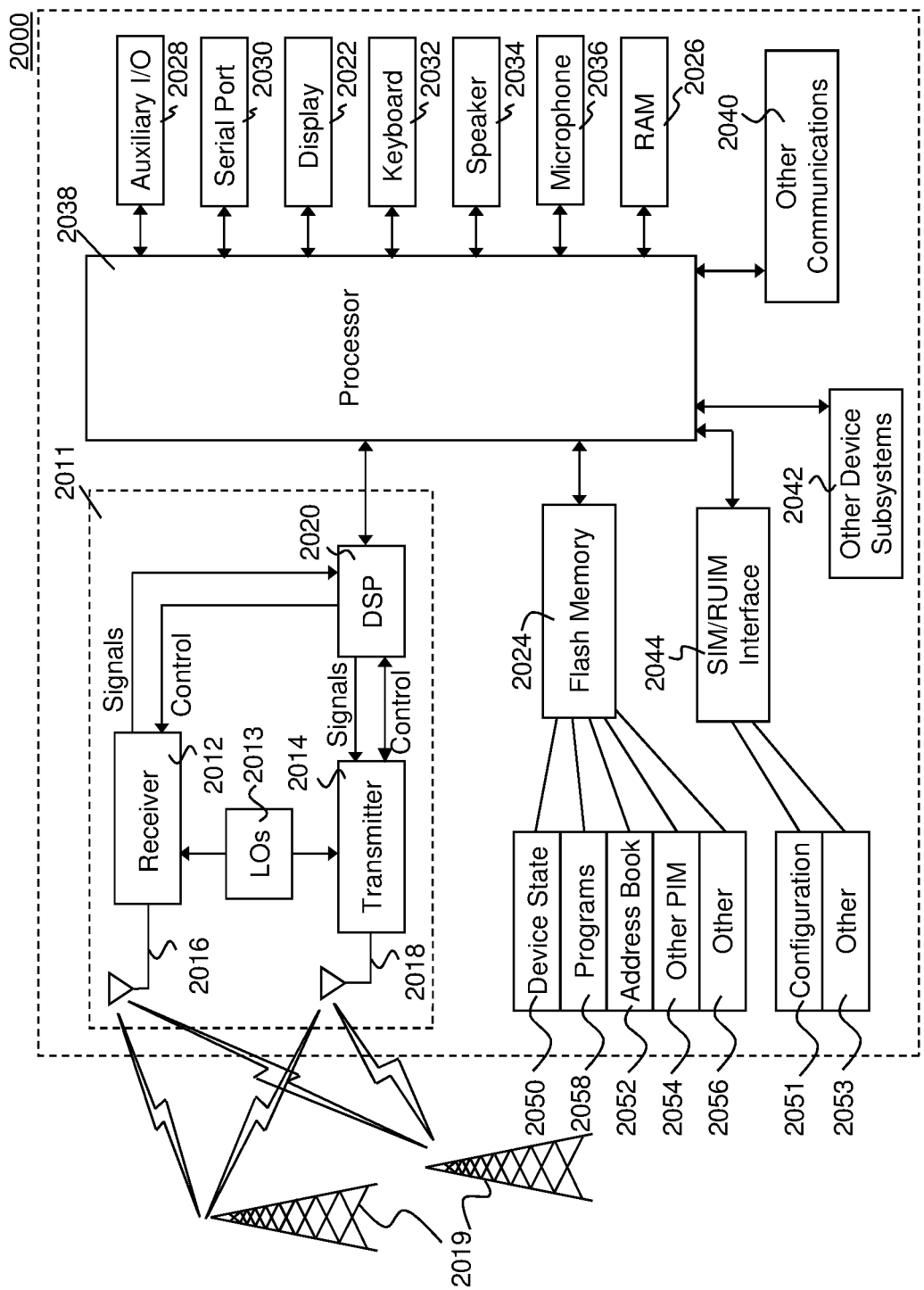
FIG. 20 is a block diagram of an example user equipment for use with the embodiments of the present disclosure.

When required network registration or activation procedures have been completed, UE 2000 may send and receive communication signals over the network 2019. As illustrated in FIG. 20, network 2019 can consist of multiple base stations communicating with the UE.

Signals received by antenna 2016 through communication network 2019 are input to receiver 2012, which may perform such common receiver functions as signal amplification, frequency down conversion, filtering, channel selection and the like. A/D conversion of a received signal allows more complex communication functions such as demodulation and decoding to be performed in the DSP 2020. In a similar manner, signals to be transmitted are processed, including modulation and encoding for example, by DSP 2020 and input to transmitter 2014 for digital to analog conversion, frequency up conversion, filtering, amplification and transmission over the communication network 2019 via antenna 2018. DSP 2020 not only processes communication signals, but also provides for receiver and transmitter control. For example, the gains applied to communication signals in receiver 2012 and transmitter 2014 may be adaptively controlled through automatic gain control algorithms implemented in DSP 2020.

UE 2000 generally includes a processor 2038 which controls the overall operation of the device. Communication functions, including data and voice communications, are performed through communication subsystem 2011. Processor 2038 also interacts with further device subsystems such as the display 2022, flash memory 2024, random access memory (RAM) 2026, auxiliary input/output (I/O) subsystems 2028, serial port 2030, one or more keyboards or keypads 2032, speaker 2034, microphone 2036, other communication subsystem 2040 such as a short-range communications subsystem and any other device subsystems generally designated as 2042. Serial port 2030 could include a USB port or other port known to those in the art.

Some of the subsystems shown in FIG. 20 perform communication-related functions, whereas other subsystems may provide "resident" or on-device functions. Notably, some subsystems, such as keyboard 2032 and display 2022, for example, may be used for both communication-related functions, such as entering a text message for transmission over a communication network, and device-resident functions such as a calculator or task list.

Operating system software used by the processor 2038 may be stored in a persistent store such as flash memory 2024, which may instead be a read-only memory (ROM) or similar storage element (not shown). Those skilled in the art will appreciate that the operating system, specific device applications, or parts thereof, may be temporarily loaded into a volatile memory such as RAM 2026. Received communication signals may also be stored in RAM 2026.

As shown, flash memory 2024 can be segregated into different areas for both computer programs 2058 and program data storage 2050, 2052, 2054 and 2056. These different storage types indicate that each program can allocate a portion of flash memory 2024 for their own data storage requirements. Processor 2038, in addition to its operating system functions, may enable execution of software applications on the UE. A predetermined set of applications that control basic operations, including at least data and voice communication applications for example, will normally be installed on UE 2000 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 2019. Further applications may also be loaded onto the UE 2000 through the network 2019, an auxiliary I/O subsystem 2028, serial port 2030, short-range communications subsystem 2040 or any other suitable subsystem 2042, and installed by a user in the RAM 2026 or a non-volatile store (not shown) for execution by the processor 2038. Such flexibility in application installation increases the functionality of the device and may provide enhanced on-device functions, communication-related functions, or both. For example, secure communication applications may enable electronic commerce functions and other such financial transactions to be performed using the UE 2000.

In a data communication mode, a received signal such as a text message or web page download will be processed by the communication subsystem 2011 and input to the processor 2038, which may further process the received signal for output to the display 2022, or alternatively to an auxiliary I/O device 2028.

A user of UE 2000 may also compose data items such as email messages for example, using the keyboard 2032, which may be a complete alphanumeric keyboard or telephone-type keypad, among others, in conjunction with the display 2022 and possibly an auxiliary I/O device 2028. Such composed items may then be transmitted over a communication network through the communication subsystem 2011.

For voice communications, overall operation of UE 2000 is similar, except that received signals would typically be output to a speaker 2034 and signals for transmission would be generated by a microphone 2036. Alternative voice or audio I/O subsystems, such as a voice message recording subsystem, may also be implemented on UE 2000. Although voice or audio signal output is generally accomplished primarily through the speaker 2034, display 2022 may also be used to provide an indication of the identity of a calling party, the duration of a voice call, or other voice call related information for example.

Serial port 2030 in FIG. 20 would normally be implemented in a personal digital assistant (PDA)-type UE for which synchronization with a user's desktop computer (not shown) may be desirable, but is an optional device component. Such a port 2030 would enable a user to set preferences through an external device or software application and would extend the capabilities of UE 2000 by providing for information or software downloads to UE 2000 other than through a wireless communication network. The alternate download path may for example be used to load an encryption key onto the device through a direct and thus reliable and trusted connection to thereby enable secure device communication. As will be appreciated by those skilled in the art, serial port 2030 can further be used to connect the UE to a computer to act as a modem.

Other communications subsystems 2040, such as a short-range communications subsystem, is a further optional component which may provide for communication between UE 2000 and different systems or devices, which need not necessarily be similar devices. For example, the subsystem 2040 may include an infrared device and associated circuits and components or a Bluetooth™ communication module to provide for communication with similarly enabled systems and devices. Subsystem 2040 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Figure 21:
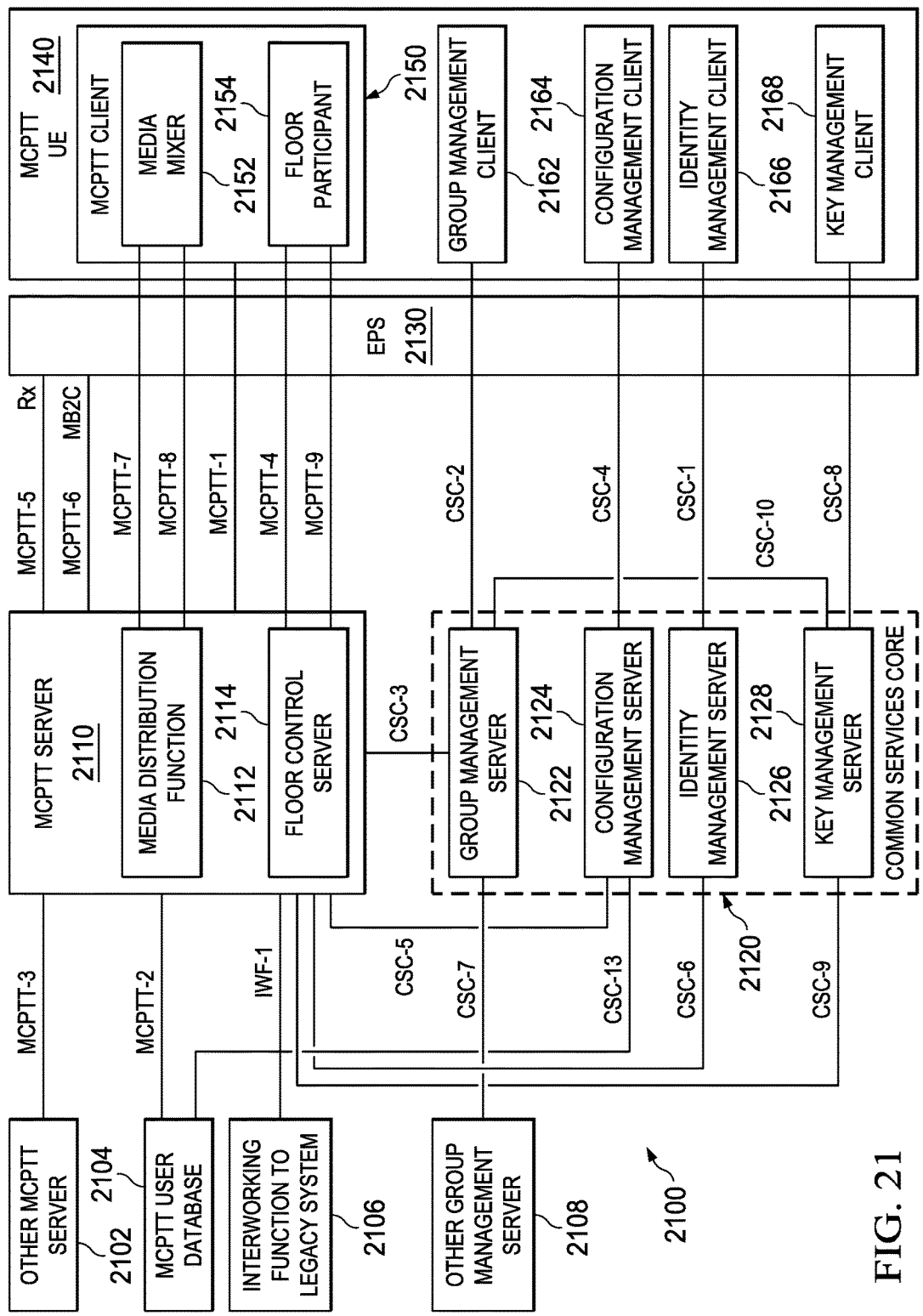
FIG. 21 is a schematic diagram illustrating the application layer architecture of an example MCPTT system, according to an implementation.

FIG. 21 is a schematic diagram illustrating the application layer architecture of an example MCPTT system 2100, according to an implementation.

The MCPTT user identity is also known as the MCPTT ID. The MCPTT ID is a globally unique identifier within the MCPTT service that represents the MCPTT user. The MCPTT ID identifies an MCPTT user. The MCPTT ID indicates to a MCPTT system where the MCPTT ID is defined may also identify an MCPTT profile for the user at the MCPTT application layer.

There are attributes associated with the MCPTT ID configured in the MCPTT service that relate to the human user of the MCPTT service. This information may identify the MCPTT user, by name or role, and may also identify a user's organization or agency. Such attributes associated with an MCPTT ID can be used by the MCPTT server to make authorization decisions about the MCPTT service granted to the user. For example, an attribute that identifies a user's role as an incident commander could automatically be used by the MCPTT service to grant the user additional administrative rights over the creation of groups, or access to privileged talk groups.

The MCPTT ID is formatted as a URI. The MCPTT ID uniquely identifies an MCPTT user in an MCPTT system.

The MCPTT group identity is also known as the MCPTT group ID. The MCPTT group ID is a globally unique identifier within the MCPTT service that represents a set of MCPTT users. The set of MCPTT users may belong to the same or different MCPTT systems. The MCPTT system for each user (within the group) is identified by each user's respective MCPTT ID.

The MCPTT group ID identifies an MCPTT group in an MCPTT system. It indicates both the MCPTT system where the MCPTT group is defined, and the MCPTT server within the MCPTT system where the group is defined. The MCPTT group ID can be used for identifying a set of identities of its group members, and used by the MCPTT client to address the MCPTT group. The MCPTT group ID is formatted as a URI.

At a high level, the example MCPTT system 2100 includes an MCPTT server 2110 that is communicatively coupled with an MCPTT UE 2140 through an EPS 2130. The MCPTT server 2110 is also communicatively coupled with a common services core 2120. As illustrated, the example MCPTT system 2100 can also include other group management server 2108, other MCPTT server 2102, MCPTT user database 2104, and interworking function to legacy system 2106.

The common services core 2120 represents an application, a set of applications, software, software modules, hardware, or combination thereof that can be configured to provide common services. As illustrated, the common services core 2120 includes a group management server 2122, a configuration management server 2124, an identity management server 2126, and a key management server 2128.

The group management server 2122 represents an application, a set of applications, software, software modules, hardware, or combination thereof that can be configured to manage groups supported within an MCPTT service provider. The group management server 2122 can be supported by the SIP Application Server (AS) and HTTP server functional entities of the signalling control plane. In some cases, group management clients supporting users belonging to a single group can use the same group management server for that group. A group management client supporting a user involved in multiple groups can have relationships with multiple group management servers. The group management server 2122 can manage media policy information for use by a UE for media mixing. The group management server can also manage group call policy information for use by the UE for both on-network and off-network group call control.

The configuration management server 2124 represents an application, a set of applications, software, software modules, hardware, or combination thereof that configures the MCPTT application with non-group management MCPTT service related information and configures data on a configuration management client. The configuration management server 2124 manages MCPTT service configuration supported within the MCPTT service provider. The configuration management server 2124 can be supported by the SIP AS and HTTP server functional entities of the signalling control plane.

The identity management server 2126 represents an application, a set of applications, software, software modules, hardware, or combination thereof that can be configured to manage user IDs of MCPTT users. The identity management server 2126 can authenticate the user IDs by verifying the credentials supplied by the MCPTT users. In some cases, the identity management server 2126 can be implemented in the same domain as the MCPTT server 2110.

The key management server 2128 represents an application, a set of applications, software, software modules, hardware, or combination thereof that can be configured to store security related information (e.g. encryption keys). The key management server 2128 can provide the security related information to key management clients, the group management server 2122, the MCPTT server 2110, or any combinations thereof to provide confidentiality and integrity of media and signalling.

The MCPTT server 2110 represents an application, a set of applications, software, software modules, hardware, or combination thereof that provides centralized support for MCPTT services. In some cases, the MCPTT clients supporting users belonging to a single group can use the same MCPTT server for that group. An MCPTT client supporting a user involved in multiple groups can have relationships with multiple MCPTT servers.

The MCPTT server 2110 can be supported by the SIP AS, HTTP client and HTTP server functional entities of the signalling control plane.

The MCPTT server 2110 may support the controlling role and the participating role. The MCPTT server 2110 may perform the controlling role for private calls and group calls. The MCPTT server 2110 performing the controlling role for a private call or group call may also perform a participating role for the same private call or group call. For each private call and group call, there may be one MCPTT server assuming the controlling role, while one or more MCPTT servers in participating roles may be involved.

An MCPTT server performing the controlling role can be responsible for the following functionalities:
  call control (e.g. policy enforcement for participation in the MCPTT group calls) towards all the MCPTT users of the group call and private call;
  managing floor control entity in a group call and private call; and
  managing media handling entity in call i.e. conferencing, transcoding.

An MCPTT server performing the participating role can be responsible for the following functionalities:
  call control (e.g., authorization for participation in the MCPTT group calls) to its MCPTT users for group call and private call;
  group affiliation support for MCPTT user, including enforcement of maximum N2 number of simultaneous group affiliations by a user;
  relaying the call control and floor control messages between the MCPTT client and the MCPTT server performing the controlling role; and
  media handling in call for its MCPTT users, i.e. transcoding, recording, lawful interception for both unicast and multicast media.

For group regrouping involving multiple groups from primary and partner MCPTT systems,
  the group host MCPTT server of the temporary group performs the controlling role and is responsible for the centralized floor control, and for arbitration according to the temporary group or user policies (e.g., priority);
  the group host MCPTT server of the constituent MCPTT group is responsible for providing call invitations to their group members, and for filtering between constituent group members' floor control requests according to the constituent group or user policies (e.g., priority); and
  the MCPTT server responsible for the constituent MCPTT group members performs the participating role.

The MCPTT server 2110 can include a media distribution function 2112 and a floor control server 2114.

The media distribution function 2112 represents an application, a set of applications, software, software modules, hardware, or combination thereof that can be configured to distribute media to call participants. Using information provided by the MCPTT server 2110 (e.g. IP addresses, transport layer ports, etc), the media distribution function 2112 can provide the following functionality:
  provide for the reception of uplink MCPTT UE media transmission by means of the MCPTT-7 reference point;

replicate the media as needed for distribution to those participants using unicast transport;

distribute downlink media to MCPTT UEs by IP unicast transmission to those participants utilizing unicast transport by means of the MCPTT-7 reference point;

distribute downlink media to MCPTT UEs using multicast downlink transport of media for the call by means of the MCPTT-8 reference point; and provide a media mixing function where multiple media streams are combined into a single media stream for transmission to the MCPTT UE.

If a media mixing function occurs within the media distribution function 2112, the media mixing function operates independently of the media mixer in the UE. The media mixing function within the media distribution function 2112 may not be possible where the media is end to end encrypted.

The floor control server 2114 represents an application, a set of applications, software, software modules, hardware, or combination thereof that can be configured to provide centralised floor control for on-network and distributed floor control for off-network operation. The floor control server 2114 may provide arbitration between floor control requests between different users, grant the floor in response to successful requests, and provide queuing in cases of contention. For on-network operation, the floor control server 2114 can be located with the MCPTT server 2110. For off-network operation, the floor control server 2114 can be located in the MCPTT UE 2140.

The MCPTT UE 2140 is a UE that participates in a MCPTT call. The MCPTT UE 2140 includes an MCPTT client 2150, a group management client 2162, a configuration management client 2164, an identity management client 2166, a key management client 2168.

The MCPTT client 2150 represents an application, a set of applications, software, software modules, hardware, or combination thereof that can be configured as a user agent for MCPTT application transactions. The MCPTT client 2150 can report the information of where the MCPTT client 2150 is currently located. The MCPTT client 2150 includes a media mixer 2152 and a floor participant 2154.

The media mixer 2152 represents an application, a set of applications, software, software modules, hardware, or combination thereof that can be configured to provide support for combining multiple media streams into one media stream through the enforcement of media policy information.

The floor participant 2154 represents an application, a set of applications, software, software modules, hardware, or combination thereof that can be configured to handle floor requests. The floor participant 2154 can be located in the MCPTT UE 2140 for both on-network and off-network operations.

The group management client 2162 represents an application, a set of applications, software, software modules, hardware, or combination thereof that can be configured as the application user agent for management of MCPTT groups. The group management client 2162 interacts with the group management server 2122. The group management client 2162 can be supported by the signalling user agent and HTTP client functional entities of the signalling control plane.

The configuration management client 2164 represents an application, a set of applications, software, software modules, hardware, or combination thereof that can be configured as the application user agent for configuration related transactions. The configuration management client 2164 interacts with the configuration management server 2124 to provide and receive configuration data. The configuration management client 2164 can be supported by the signalling user agent and HTTP client functional entities of the signalling control plane.

The identity management client 2166 represents an application, a set of applications, software, software modules, hardware, or combination thereof that can be configured as the application user agent for user ID transactions for MCPTT calls. The identity management client 2166 interacts with the identity management server 2126.

The key management client 2168 represents an application, a set of applications, software, software modules, hardware, or combination thereof that can be configured as the application user agent for key management functions. It interacts with the key management server 2128. The functionalities of the key management client 2168 and the key management server 2128 can include functionalities specified in 3GPP TS 33.179.

Turning to a general description, a UE, e.g., the MCPTT UE 2140, may include, without limitation, any of the following: computing device, mobile device, mobile electronic device, user device, mobile station, subscriber station, portable electronic device, mobile communications device, wireless modem, wireless terminal, television, printer or other peripheral, vehicle, or any other electronic device capable of sending and receiving data. Examples of a mobile device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices, having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

The MCPTT user database 2104 represents an application, a set of applications, software, software modules, hardware, or combination thereof that can be configured to store information of user configuration information associated with an MCPTT ID that is held by the MCPTT service provider at the application plane. User configuration information can be determined by the MCPTT service provider.

The other MCPTT server 2102 represents one or more MCPTT servers that interact with the MCPTT server 2110. Similarly, the other group management server 2108 represents one or more group management servers that interact with the group management server 2122. The interworking function legacy system 2106 represents an application, a set of applications, software, software modules, hardware, or combination thereof that provides interworking functions between the MCPTT system 2100 with legacy systems.

The EPS 2130 represents a network node that performs the core network functionalities of an 3GPP E-UTRAN network. At the application layer, the EPS 2130 provides connections between the MCPTT UE 2140 and application servers that provides MCPTT services.

In operation, the identity management client 2166 in the MCPTT UE 2140 authenticates the MCPTT user identity A with the network using an identity management server. The configuration management client 2164 then establishes secure (HTTPS/TLS) communications with the configuration management server 2124. The configuration management client 2164 downloads the MCPTT user profile (using the configuration management server 2124) from the MCPTT user database 2104. The MCPTT user profile can contain a contact list of the MCPTT IDs of all the users the user can contact and also all the MCPTT Group IDs for the groups the user can contact. The MCPTT user profile also contains the MCPTT ID of the user of the UE downloading the user profile. Alternatively, the user profile can contain one or more pointers or references to network contact lists or address books containing the MCPTT IDs of the MCPTT users that can be contacted. These contact lists can be based on the role (e.g. First responder) of the MCPTT user using the user profile. The user profile, or another profile can contain encryption keys to use as well as descriptions of services that can be used by the MCPTT UE 2140. An MCPTT user profile is an XML document and is downloaded using HTTPS. Therefore, it can be encrypted using TLS and may not be read by the PLMN operator when delivered to the MCPTT UE 2140.

While elements of FIG. 21 are shown as including various component parts, portions, or modules that implement the various features and functionality, nevertheless, these elements may, instead, include a number of sub-modules, third-party services, components, libraries, and such, as appropriate. Furthermore, the features and functionality of various components can be combined into fewer components, as appropriate. For example, the functionalities performed by multiple entities shown in FIG. 21 can be integrated together in a single software or hardware entity. Alternatively or additionally, the functionalities performed by any entity shown in FIG. 21 can be implemented separately in multiple software or hardware entities.

Figure 22:
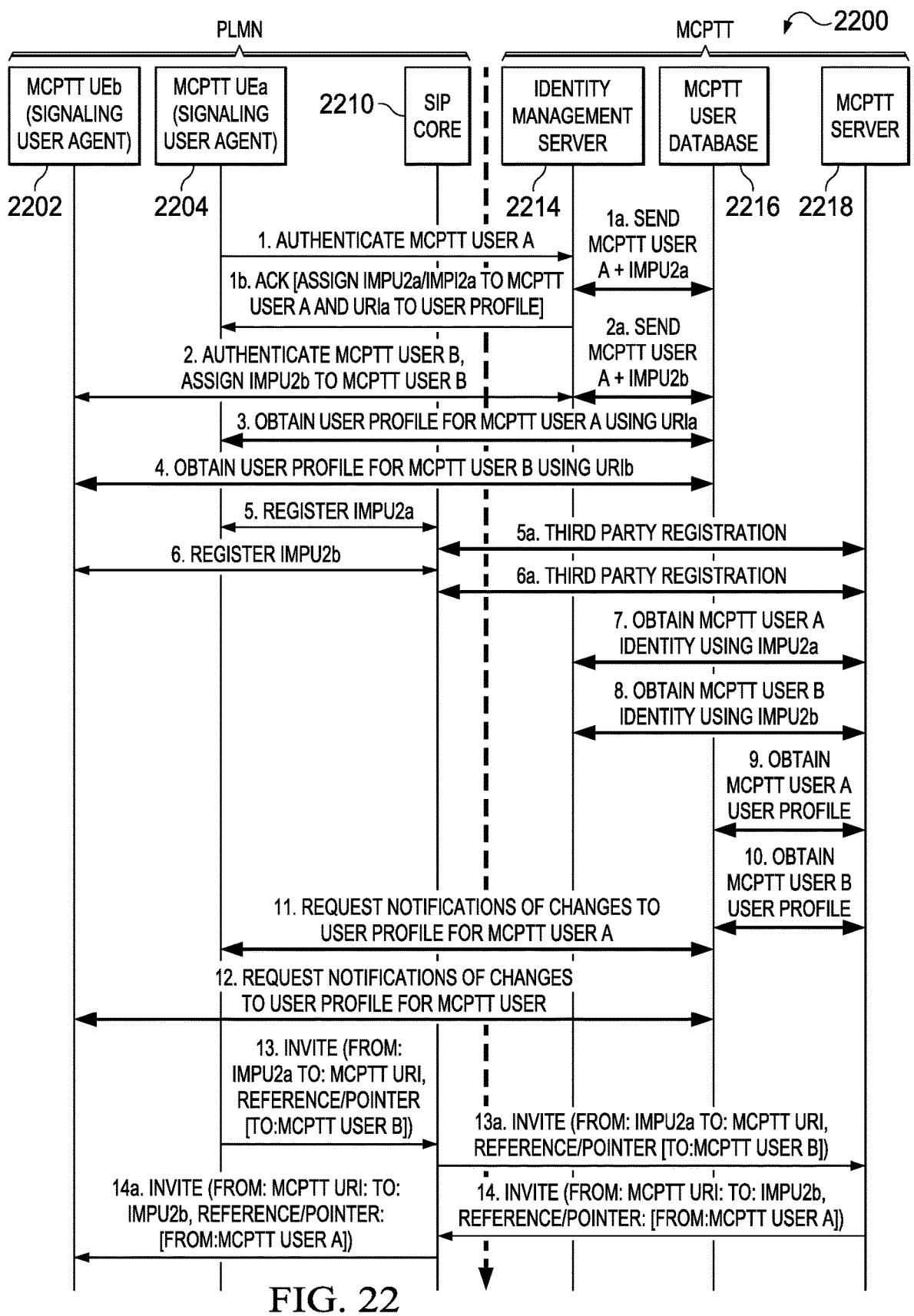
FIG. 22 is a flow diagram showing an example call flow for MCPTT user authentication, according to an implementation.

FIG. 22 is a flow diagram showing an example call flow 2200 for MCPTT user authentication according to an implementation. As illustrated, the call flow 2200 can be implemented by MCPTT UEa 2204, MCPTT UEb 2202, a SIP core 2210, an identity management server 2214, a MCPTT user database 2216, and a MCPTT server 2218. The call flow 2200 can also be implemented using additional, fewer, or different entities. For example, the functionalities performed by multiple entities shown in FIG. 22 can be integrated together in a single software or hardware entity. Alternatively or additionally, the functionalities performed by any entity shown in FIG. 22 can be implemented separately in multiple software or hardware entities.

Furthermore, the call flow 2200 can also be implemented using additional, fewer, or different operations, which can be performed in the order shown or in a different order. In some instances, an operation or a group of the operations can be iterated or repeated, for example, for a specified number of iterations or until a terminating condition is reached.

As illustrated, the MCPTT UEa 2204 performs MCPTT user authentication and optionally gets back user identities (Private & Public), user profile location(s) and an access token to be used in subsequent SIP registration. The MCPTT UEb 2202 then at some point obtains its user profile from the network using the profile location(s) received in the step of authenticating (if received) or using provisioned information. Both of these operations take place over a secure connection, an example of user authentication is described above. The MCPTT UEa 2204 then IMS Registers with the network using any received user identities and includes a token (if received in the authentication step). When the MCPTT UEa 2204 makes a session origination request to MCPTT UEb 2202, the session request includes a pointer or a reference to an entry in the user profile that was obtained by the MCPTT UEb 2202 earlier and which is also stored in the network, the pointer or the reference identifies an entry within the user profile that identifies MCPTT user b using MCPTT UEb.

In some cases, data that is identified as being sent in a user profile may be sent in different user profiles. For example, an address book, token(s), key value(s), and vector(s) can be received different user profiles.

A MCPTT user token is assigned to the UE by an identity management server during the MCPTT user authentication phase. The MCPTTUser token, used in the OpenID framework, can include 2 tokens: the access_token and the ID_token. These tokens can requested using the OAuth 2.0 protocol. FIG. 25 illustrates an example process 2500 for obtaining the tokens according to an implementation. As illustrated, at step 7, the identity manager server returns the access_token and the ID_token to the UE. FIG. 26 illustrates example codes 2602 and 2604 for obtaining the token according to an implementation. The example code 2602 shows a message including an access_token which is a string of characters. The id_token also appears as a string of characters. The id_token and access_token are part of the OPenID connect frame work where tokens are described using JSON claims, also known as JSON attributes. Standards claims can be found at, e.g., http://www.iana.org/assignments/jwt/jwt.xhtml.

The id_token resembles the concept of an identity card and is described in a JWT profile. It contains attributes that identify the user, e.g., name, address, phone numbers, etc. The example code 2604 illustrates an example JSON claim schema for an id_token. The id_token is coded as alphanumeric string. A more detailed description how tokens can be requested, encrypted and exchanged between parties can be found at, e.g., http://openid.net/specs/openid-connect-core-1_0. html#CodeFlowAuth.

Returning to FIG. 22, at step 1, the MCPTT UEa 2204 sends a request to the identity management server 2214 to authenticate the MCPTT UEa 2204. The request can include a MCPTT User Identity A for the MCPTT UEa 2204.

The identity management server 2214 authenticates MCPTT User Identity A. The authentication can be performed using the process described in FIG. 25. The identity management server 2214 optionally, at step 1a, sends at least one of MCPTT user identity, second IMS Public User Identity A, and one or more tokens, e.g. access_token, id_token to MCPTT User database.

The one or more tokens can include any of the following attributes:
the second IMS Public User Identity A in a user profile from the network (IMPU2a)
second IMS Private User Identity A (IMPI2a).
MCPTT user identity
Key
Vector
URI(s) to the location of an MCPTT user profile(s)

These above attributes could be encoded as JSON claims. A relationship is created and stored in the MPCTT identity management server 2214 between the MCPTT User Identity A and the second IMS Public User Identity A (IMPU2a), the second IMS Private User Identity A (IMPI2a), and the tokens, e.g. access_token, id_token.

The MCPTT user database 2216 optionally receives at least one of MCPTT User Identity A, second IMS Public User Identity A, IMS Private User Identity A and one or more tokens.

The one or more tokens can include any of the following attributes:

second IMS Public User Identity A (IMPU2a)
second IMS Private User Identity A (IMPI2a).
MCPTT user identity
Key
Vector
URI(s) to the location of an MCPTT user profile(s)

The MCPTT user database 2216 updates user profiles that contain MCPTT User Identity A and creates a relationship with data received in Step 1, e.g. second IMS Public User Identity A, IMS Private User Identity A and a token(s). The MCPTT user database 2216 may respond back to the identity management server 2214 with a message containing some of the attributes in the tokens, e.g. URIs of the user profile(s) associated with MCPTT User Identity A. This may enable the identity management server 2214 to send the URIs to the MCPTT UEa 2204.

At step 1 b, the identity management server 2214 sends the ack to the MCPTT UEa. The ack can include at least one of: a second IMS Public User Identity A (IMPU2a), one or more tokens, e.g. access_token, id_token.

The one or more tokens can include any of the following attributes:
second IMS Public User Identity A (IMPU2a)
second IMS Private User Identity A (IMPI2a).
MCPTT user identity
Key
Vector
URI(s) to the location of an MCPTT user profile(s)

These above attributes can be encoded as JavaScript Object Notation (JSON) claims. They can be stored in memory when received either in the mobile equipment (ME) or Universal Integrated Circuit Card (UICC) of the MCPTT UEa 2204.

At step 2, the MCPTT UEb 2202 authenticates with the identity management server 2214. Similar to step 1, the MCPTT UEb 2202 can send a request to the identity management server 2214. The request can include a MCPTT User Identity B for the MCPTT UEb 2202. The identity management server 2214 can authenticate MCPTT User Identity B, and send ack to the MCPTT UEb 2202. The ack can include at least one of second IMS Public User Identity B, and one or more tokens, e.g. access_token, id_token.

The one or more tokens can include any of the following attributes:
second IMS Public User Identity B (IMPU2b)
second IMS Private User Identity B (IMPI2b).
MCPTT user identity
Key
Vector
URI(s) to the location of an MCPTT user profile(s)

The identity management server 2214, the MCPTT user database 2216, or a combination thereof can store the relationship between the MCPTT User Identity B and the second IMS Public User Identity B, the second IMS Private User Identity B, and the one or more tokens.

In some cases, step 2 can initiated from another network node or the UE. Step 2 may also be included as part of the step of receiving requests for notifications for changes of user profiles, as discussed in association with step 11.

At step 3, the MCPTT UEa 2204 obtains the user profile(s) from the network. In some cases, the location of the user profile(s) may be stored or pre-provisioned in the ME and UICC in the MCPTT UEa 2204, or received at step 1 b, as discussed previously. The MCPTT UEa 2204 can receive one of the following information:
the second IMS Public User Identity A in a user profile from the network (IMPU2a)
second IMS Private User Identity A (IMPI2a).
Key value;
Vector value
MCPTT user identity In some cases, the user profile is stored in memory either in ME or UICC. The user profile may be deleted, or modified when the MCPTT user identity signs out, a MCPTT User Identity C is authenticated, or a combination thereof.

At step 4, the MCPTT UEb 2202 obtains the user profile(s) from the network. In some cases, the location of the user profile(s) may be stored or pre-provisioned in the ME and UICC in the MCPTT UEb 2202, or received at step 2, as discussed previously. The MCPTT UEb 2202 can receive one of the following information:
the second IMS Public User Identity B in a user profile from the network (IMPU2b)
second IMS Private User Identity B (IMPI2b).
Key value;
Vector value
MCPTT user identity At step 5, the MCPTT UEa 2204 registers with the SIP core 2210 using IMPU2a. The MCPTT UEa 2204 can also send a token, e.g., access_token to the SIP core 2210. At step 5a, the SIP core 2210 perform a 3rd party registration procedure with the MCPTT server 2218.

At step 6, the MCPTT UEb 2202 registers with the SIP core 2210 using IMPU2b. The MCPTT UEb 2202 can also send a token, e.g., access_token to the SIP core 2210. At step 5a, the SIP core 2210 performs a 3rd party registration procedure with the MCPTT server 2218.

At step 7, the MCPTT server 2218 sends a message to request for MCPTT User Identity A associated with at least one of second IMS Public User Identity A and a token, e.g. access_token, id_token. The identity management server 2214 determines the MCPTT User Identity A associated with the second IMS Public User Identity A or the token. The identity management server 2214 sends a message to the MCPTT server 2218 containing the determined MCPTT User Identity A.

Similarly, at step 8, the MCPTT server 2218 sends a message to request for MCPTT User Identity B associated with at least one of second IMS Public User Identity B and a token, e.g. access_token, id_token. The identity management server 2214 determines the MCPTT User Identity A associated with the second IMS Public User Identity A or the token. The identity management server 2214 sends a message to the MCPTT server 2218 containing the determined MCPTT User Identity A.

At step 9, the MCPTT server 2218 sends a message to request for user profiles associated with at least one of MCPTT User Identity A, a second IMS Public User Identity A or one or more tokens, e.g. access_token, id_token. The MCPTT user database 2216 sends user profile associated with the MCPTT User Identity A, the second IMS Public User Identity A, or the one or more tokens to MCPTT server 2218. The user profile may include a Key value, a Vector value, a MCPTT user identity, or any combinations thereof.

At step 10, the MCPTT server 2218 sends a message to request for user profiles associated with at least one of MCPTT User Identity B, a second IMS Public User Identity B or one or more tokens, e.g. access_token, id_token. The MCPTT user database 2216 sends user profile associated with the MCPTT User Identity B, the second IMS Public User Identity B, or the one or more tokens to MCPTT server

2218. The user profile may include a Key value, a Vector value, a MCPTT user identity, or any combinations thereof.

At step 11, the MCPTT UEa 2204 requests notification of changes to user profiles. In some cases, this step may occur before step 2 and might cause step 2 to happen because the MCPTT UEa 2204 does not have the user profile in memory that it requests notifications for. At step 12, the MCPTT UEb 2202 requests notification of changes to user profiles.

At step 13, a MCPTT user having the MCPTT User Identity A imitates a communicate with a MCPTT user having MCPTT User Identity B. The MCPTT UEa 2204 determines within memory which user profile contains MCPTT User Identity B. In the step of determining the UE also determines the reference or pointer that is associated with this user profile. The MCPTT UEa 2204 sends a message to the network containing the reference or pointer to what user profile to use. The reference or point may indicate a global phone book and a reference, a pointer, or a location to the entry in the user profile, e.g. position 30, that refers to the MCPTT User Identity B. In some cases, the entry location may be encrypted. In some cases, the encrypted entry location may include an offset. The message can also include second IMS Public User Identity A (IMPU2a).

At step 13a, the MCPTT server 2218 receives a message from a second IMS Public User Identity A containing the reference or pointer to a user profile. The message may also include the second IMS Public User Identity A (IMPU2a).

If an offset value is received in the message, the MCPTT server 2218 may determine that the entry location is encrypted. The MCPTT server 2218 may use the "Key" and "Vector" to perform decryption and obtain entry location.

In some cases, the following steps a)-e) can be used to determine the MCPTT User Identity B that MCPTT User Identity A wishes to communicate with. Once MCPTT User Identity B has been found, the MCPTT User Identity A may be hidden from the PLMN operator by using the same process in reverse. In these cases, when a SIP message is sent to MCPTT User Identity B, neither MCPTT User Identity A or MCPTT User Identity B is revealed. Thus IMS Public User Identity B can be discovered and a user profile belonging to MCPTT User Identity B can be used so that MCPTT User Identity A identity can be referenced.

a) The MCPTT server 2218 determines which MCPTT User Identity A user profile to use and the data within that profile. The MCPTT server 2218 can determine MCPTT User Identity A by using the second IMS Public User Identity A received in step 6 and determining to which MCPTT user identity that maps to. The mapping may be performed as step 3 or step 5.

b) Once MCPTT User Identity B has been obtained using step a) the MCPTT server 2218 can determine the second IMS Public User Identity B associated with MCPTT User Identity B. The mapping between the second IMS Public User Identity B and the MCPTT User Identity B may be performed at step 1.

c) The MCPTT server 2218 determines which user profile is associated with MCPTT User Identity B.

d) The MCPTT server 2218 determines which MCPTT User Identity B user profile contains MCPTT User Identity A. The MCPTT server 2218 determines the location within MCPTT User Identity B user profile.

e) The MCPTT server 2218 determines MCPTT User Identity B associated with the second IMS Public User Identity B.

At step 14, the MCPTT server 2218 sends a message to the SIP core 2210. At step 14a, the SIP core 2210 forwards the message to the MCPTT UEb 2202. The message includes a reference or a pointer to a MCPTT user B user profile and an entry location for the MCPTT User Identity A.

In some cases, the MCPTT server 2218 may encrypt the entry location. For example, the MCPTT server 2218 can use the "seed value" and "counter" to creates an offset to be included in the message. The "seed value" and "counter" may be obtained as part of function of obtaining user profile.

Figure 23:
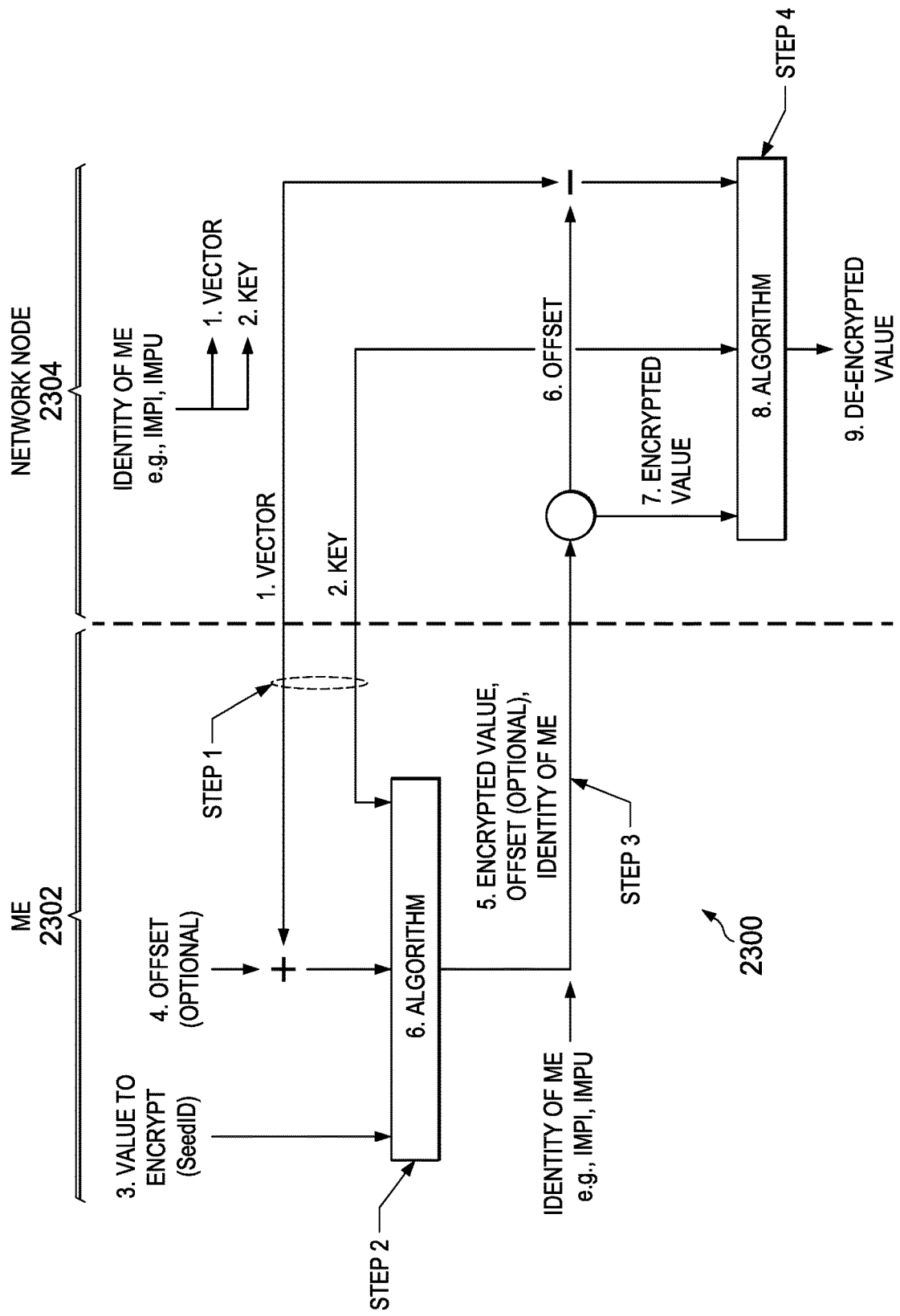
FIG. 23 illustrates an example framework for encryption and decryption, according to an implementation.

FIG. 23 illustrates an example framework 2300 for encryption and decryption according to an implementation. As illustrated, the example framework 2300 can be implemented using a ME 2302 and a network node 2304. The ME 2302 may be the ME of a MCPTT UE. The network node may be a network node that performs the MCPTT functionalities, e.g., the MCPTT server. The framework 2300 can also be implemented using additional, fewer, or different entities.

The framework 2300 can also be implemented using additional, fewer, or different operations as illustrated, which can be performed in the order shown or in a different order. In some instances, an operation or a group of the operations can be iterated or repeated, for example, for a specified number of iterations or until a terminating condition is reached.

As discussed previously, user profiles and entry locations within the user profiles can be used to refer to MCPTT user identities. If the user profile is to be available outside of the MCPTT trust domain e.g. P-CSCF, S-CSCF, session border control (SBC), the data may be accessible to a compromised third party outside of the MCPTT domain. In some cases, encryption may be used to protect, e.g., entry location to use in a profile, MCPTT user identities, or any other data associated with the user profile.

The example framework 2300 includes the following data: vector, key, offset, seeID. The key is a private key. The key may be the same for some or all MCPTT user identities. The key may also be unique to any particular MCPTT user identity. The key is known in the network and ME.

The vector is a value that changes over time by combining it with the offset value. The vector is known in the network and ME. The vector can be a timestamp or counter or flounce. In some cases, the vector can be communicated from the network node to the UE. In some cases, the vector may not be communicated from the network node to the UE, e.g., when the Vector is a timestamp.

The offset is a value that can be combined with the vector to be used as an input to encrypt seedID. The offset provides some random nature to the encryption. In some cases, the offset can be randomly generated every time an encryption is performed. Alternatively or additionally, the offset can increase or decrease in a known way.

The seeID is the data to be encrypted. The seedID can include a MCPTT user identity in the user profile, a location identifier used to address an item of data in the user profile, or a combination thereof.

As illustrated, at step 1, the network node 2304 sends in a message to the ME 2302. The message may include a vector and a key. The message may be encrypted. Encryption can be performed using Transport Layer Security (TLS) protocol, the OpenID framework, or a combination thereof. In some cases, the vector and key can be part of the tokens exchanged in step 7 in FIG. 25.

At step 2, the ME 2302 determines that a seedID is to be encrypted. The ME 2302 combines the offset and the vector, and uses the combined value, the seedID, and the key as input to the encryption algorithm to generate the encrypted value.

At step 3, the ME 2302 sends the encrypted value, the offset, the identity of the ME to the network node 2304. At step 4, the network node 2304 combines the offset with the vector, and uses the combined value, the key, and the encrypted value as input to the decryption algorithm to generate the decrypted data.

In some cases, the operation can be performed in reverse order. For example, the network node 2304 may encrypt a seedID using offset, vector, key, or any combinations thereof, and send the encrypted value to the ME 2302. The ME 2302 may decrypt the encrypted value and obtain the seedID.

In one example, an ME 2302 receives, from the network, the vector and key, and stores these values. The ME 2302 may determine that the user profile a and the location 5 in user profile a is to be used to communicate a user identity. The numeric value 5 can be put into the algorithm with the key and "vector+Offset" to generate an encrypted value, e.g., "x3e5." The value "x3e5" is sent to the network with offset. The network node 2304 receives the value "x3e5" and offset. The network node 2304 retrieves the vector and key associated with the identity received in the message. The network node 2304 combines offset and vector, and uses the combined value, the key and the value "x3e5" to decrypt and generate the location 5.

Figure 24A:
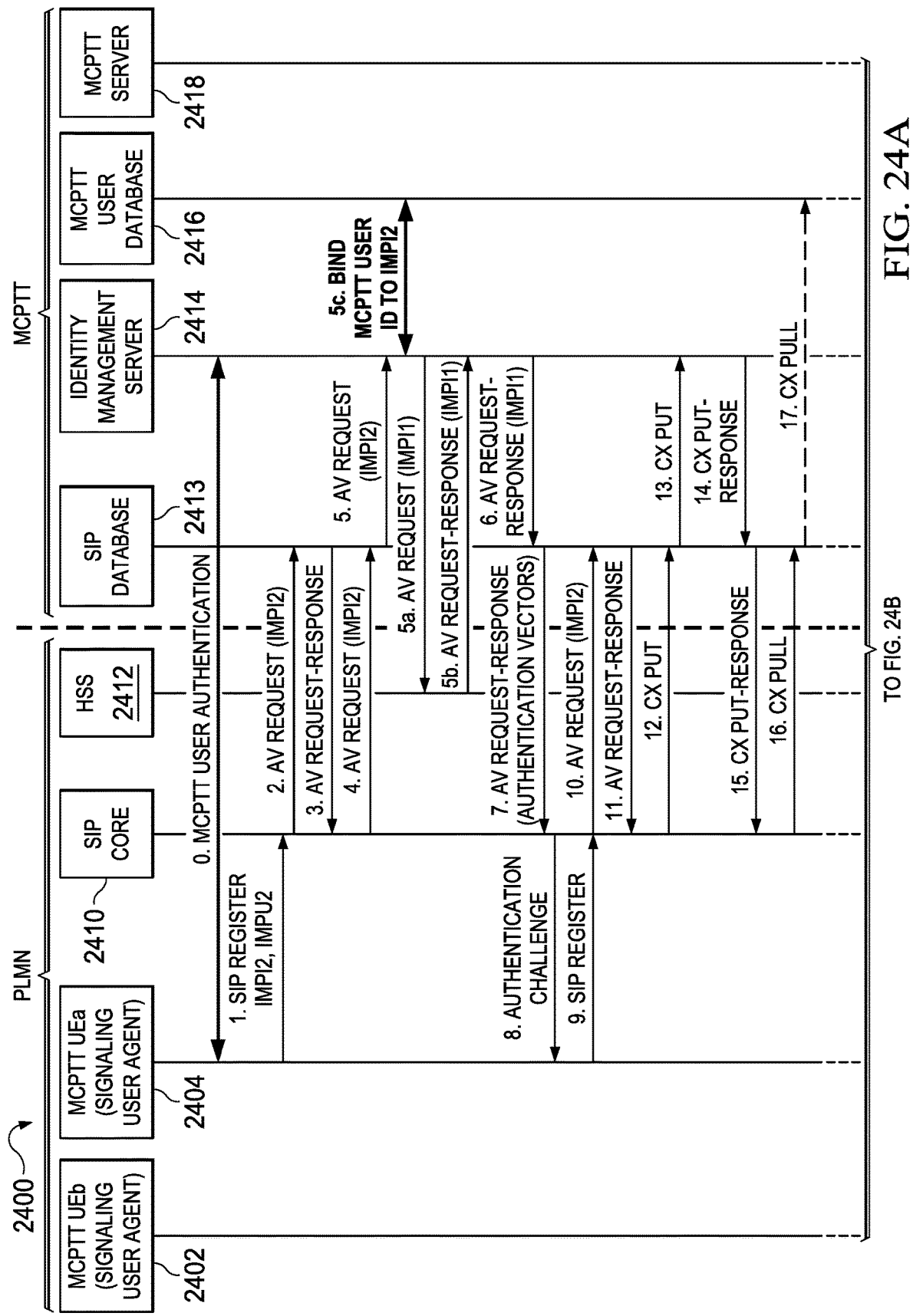
FIGS. 24A-B are a flow diagram showing an example call flow of for an MCPTT call, according to an implementation.
Figure 24B:
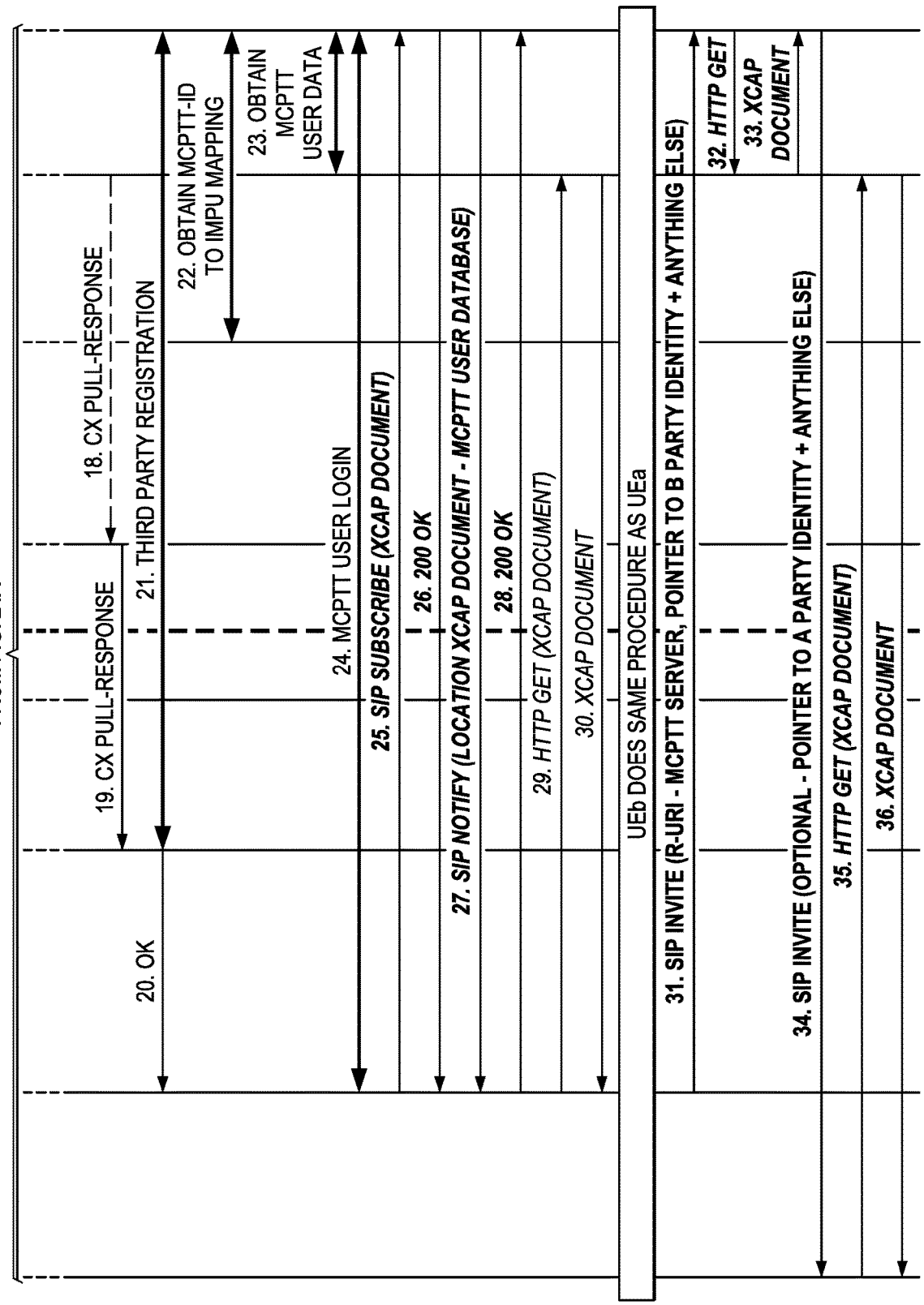

FIG. 24 (including FIGS. 24A and 24B) is a flow diagram showing an example call flow 2400 of for an MCPTT call, according to an implementation. As illustrated, the call flow 2400 can be implemented by MCPTT UEa 2404, MCPTT UEb 2402, a SIP core 2410, an identity management server 2414, a MCPTT user database 2416, a MCPTT server 2418, a Home Subscriber Server (HSS) 2412, and a SIP database 2413. The call flow 2400 can also be implemented using additional, fewer, or different entities. For example, the functionalities performed by multiple entities shown in FIG. 24 can be integrated together in a single software or hardware entity. Alternatively or additionally, the functionalities performed by any entity shown in FIG. 24 can be implemented separately, in multiple software or hardware entities.

Furthermore, the call flow 2400 can also be implemented using additional, fewer, or different operations, which can be performed in the order shown or in a different order. In some instances, an operation or a group of operations can be iterated or repeated, for example, for a specified number of iterations or until a terminating condition is reached.

If an MCPTT User (MCPTT User Identity A) wishes to place a call to another MCPTT user (MCPTT User Identity B), the MCPTT user can address the SIP INVITE request to the Public Service Identity (PSI) of the MCPTT server and includes in the body a recipient list containing the identity of the called party (or potentially called parties). To make the identity of the called party not readable by the PLMN operator, the content indirection mechanism defined in RFC 4483 [x] can be used to include the recipient list elements as a message/external-body MIME type. The recipient list elements can be formatted as the URL or an XML Configuration Access Protocol (XCAP) URI pointing to the called party's MCPTT ID within the contact list of the user's MCPTT user profile. Furthermore, the pointer to the location within the user profile can be encrypted. The encrypted part can be textual but using a private key and random component (e.g., counter+offset). If MCPTT User Identity A calls MCPTT User Identity B time after time the location part of the XCAP URI can be different. Alternatively, the user profile can contain one or more pointers or references to network contact lists or address books containing the MCPTT IDs of the MCPTT users that can be contacted. Potentially these contact lists can be based on the role (e.g. first responder) of the MCPTT user using the user profile. This second level of indirection allows the actual URI to not point to a particular MCPTT user but a profile identity that identifies the user's role.

Following is an example of contact list doc document XML (//UserProfile/user-role-ID/contact-list):

```
<?xml version="1.0" encoding="UTF-8"?>
<resource-lists xmlns="urn:ietf:params:xml:ns:resource-lists"
      xmlns:cp="urn:ietf:params:xml:ns:copycontrol">
    <list>
        <entry uri="sip:bill@example.com" cp:copyControl="to" />
        <entry uri="sip:randy@example.net" cp:copyControl="to" />
        <entry uri="sip:eddy@example.com" cp:copyControl="to" />
        <entry uri="sip:joe@example.org" cp:copyControl="to" />
        <entry uri="sip:carol@example.net" cp:copyControl="to" />
        <entry uri="sip:ted@example.net" cp:copyControl="to" />
        <entry uri="sip:andy@example.com" cp:copyControl="to" />
    </list>
</resource-lists>
```

Alternatively, the contact list can be separate from the MCPTT user profile and instead be a network stored directory of contacts. In that case the XCAP URI can point to the MCPTT ID of the network directory XML document. In some cases, the contact list in the MCPTT user profile can contain a list of XCAP URIs to each of the individual MCPTT IDs in the network stored directory of contacts that the MCPTT User can call.

If a user wishes to privately send to sip:joe@example.org (4th entry in the list) then the following Content-Type within a Multipart MIME body of a SIP INVITE can be used:

```
MIME-Version: 1.0
Content-Type: multipart/mixed; boundary=boundary42
--boundary42
Content-Type: message/external-body;
    access-type="URL",
    expiration="Mon, 24 June 2016 09:01:32 GMT";
    URL="https://xcap.example.com/UserProfile/user-role-ID/contact-
list/~/resource-lists/list/ entry%5b4%5d/@uri",
NOTE %5b4%5d is equivalent to[4] THAT HAS BEEN ESCAPED (%5b =
[ and %5d=] )
    size=62
    hash=10AB568E91245681AC1B
  Content-Type: application/recipient-list+xml
  Content-Disposition: recipient-list
  ---undary42--
```

The UE may include a message/external-body MIME body containing a XCAP URI pointing to the MCPTT ID either within the MCPTT user profile or within in an XML document that is accessible to both the MCPTT UE and the MCPTT server (such as a common network directory document).

When the MCPTT server receives the SIP request containing the recipient list as a message/external-body MIME body, the MCPTT obtains the MCPTT ID of the called party by resolving the XCAP URI included in the message/external-body MIME body. If the called MCPTT user is in a different MCPTT system, the MCPTT server can forward the request to the MCPTT server in the destination system and use an XCAP URI in the recipient list message/external-body MIME body that resolves to an XML document accessible to both MCPTT servers (such as a common network directory document). The MCPTT server can also include a message/external-body MIME body containing a XCAP URI pointing to the MCPTT ID of the calling MCPTT User in an XML document that is accessible to both MCPTT servers (such as a common network directory document).

Similarly, the MCPTT group ID can be identified using a message/external-body MIME body containing an XCAP URI pointing to the MCPTT group ID in the user profile contact list or alternatively in the group document that defines that group or alternatively in a common document that identifies one or more groups.

Returning to FIG. 24, at step 0, MCPTT user authentication is performed between MCPTT UEa 2404 and the identity management server 2414. In some cases, the authentication procedure can be performed using the process illustrated in FIG. 24. As part of the process, the identity management server 2414 sends to the MCPTT UEa 2404 a message containing authentication configuration information, e.g., access_token, id_token, or a combination thereof. Within the tokens the following JSON claims can be included:

Phone_number or phone_number_verified contain the E.164 that is assigned to MCPTT User Identity A;
Vector;
Key;
IMS_Private_identity: Contains an IMS Private identity assigned by the identity management server 2414. It is the identity that is used in the SIP Register.
IMS_Public_Identity: Contains an IMS Public Identity (e.g. SIP URI), is assigned by the identity management sever 2414.

Following is an example implementation using JSON schema for the id_token, where "private.random1@example.com" represents the IMPI2a, and "public.random1@example.com" represents the IMPU2a.

```
{
    "sub": "248289761001",
      "name": "Jane Doe",
    "given_name": "Jane",
    "family_name": "Doe",
    "preferred_username": "j.doe",
      "email": "janedoe@examplepolice.com",
    "picture": http://example.com/janedoe/me.jpg,
    "phone_number": +15105551212,
    "Vector": "janedoe@example.com",
    "Key": "janedoe@example.com",
    "IMS_Private_identity": "private.random1@example.com",
    "IMS_Public_identity": "public.random1@example.com",
    "MCPTT_User_identity": "jone.doe@examplepolice.com",
    "MCPTT_User_profile": https://xcap.example.com/
}
```

The MCPTT UEa 2404 receives the message and stores the data that was sent in step 0. The access_token, the id_token, or a combination thereof can be used as the MCPTT user authentication token.

At step 1, the MCPTT UEa 2404 sends a register message to the SIP core 2410 to perform SIP registration. The register message can include authentication information based on received authentication configuration information. For example, the authentication information can include IMPI2a, IMPU2a, vector, key, or any combinations thereof.

At step 5, the SIP database 2413 sends an authentication request to the identity management server 2414. The authentication request includes IMPI2a, IMPU2a, or a combination thereof. The identity management server 2414 determines that IMPI2a or IMPU2a maps to MCPTT User Identity A. At step 5a, the identity management server 2414 sends authentication request to the HSS 2412. The authentication request includes IMPI1a, IMPU1a, or a combination thereof that are associated with MCPTT User Identity A. At step 5b, the identity management server 2414 receives authentication response from the HSS 2412. The authentication response includes an authentication response vector generated based on IMPI1a, IMPU1a, or a combination thereof.

In some cases, at step 5c, the identity management server 2414 and the MCPTT user database 2416 bind the MCPTT User Identity A with the IMPI2a or IMPU2a. The identity management server 2414 can send a message containing at least one of: IMPI2a, IMPU2a, MCPTT user authentication token (generated as part of MCPTT User Identity A) and MCPTT User Identity A, to the MCPTT user database 2416. FIG. 27 illustrates an example implementation using the 3GPP Sh interface.

The MCPTT user database 2416 can check for user profiles that contain MCPTT User Identity A and update those user profiles to indicate that MCPTT User Identity A maps to IMPU2a.

The MCPTT user database 2416 sends a message to the identity management server 2414 indicating that the MCPTT User Identity A has been received and optionally includes URL/URI to user profiles associated with the MCPTT User Identity A.

In some cases, step 5c can be performed prior to step 5, e.g., when MCPTT user authentication (step 0) took place.

At step 6, the identity management server 2414 sends an authentication response to the SIP database 2413. The authentication response includes the authentication response vector received at step 5b, which is generated based on IMPI1a, IMPU1a, or a combination thereof.

At step 8, the MCPTT UEa 2404 receives an authentication challenge request using the SIP protocol.

At step 9, the MCPTT UEa 2404 sends an authentication response. The authentication response can be a SIP REGISTER message.

At step 21, the SIP core 2410 sends 3rd party registration to the MCPTT server 2418. The 3rd party registration can contain the token (that uniquely identifies the user (MPCTT User Identity A) and can also contain the IMPU2a, IMPI2a, e.g., using the procedure in 3GPP TS 24.229 for delivering the REGISTER request from the UE in the 3rd party registration.

At step 22, the MCPTT server 2418 interacts with the identity management server 2414 to obtain the MCPTT User Identity A based on the MCPTT user authentication token received or IMPU2a or IMPI2a. Thus a mapping of IMPU2a to MCPTT User Identity A can be created. HTTP or DIAMETER protocol can be used to perform this step. FIG. 28

(including FIGS. 28A and 28B) illustrates an example implementation using the 3GPP Sh interface.

The MCPTT server 2418 sends a message containing at least one of the following: IMPI2a, IMPU2a, MCPTT user authentication token.

The identity management server 2414 receives the message containing at least one of IMPI2a, IMPU2a, MCPTT user authentication token and an indication that the MCPTT user identity mapping is needed. The identity management server 2414 determines the MCPTT User Identity A that is mapped to at least one of IMPI2a, IMPU2a. The identity management server 2414 sends message containing the MCPTT User Identity A to the MCPTT server 2418. In one example, an SH-Pull Resp is sent containing the MCPTT User Identity A in the User data AVP of the Sh-Pull Resp.

At step 23, the MCPTT server 2418 sends a message #23a to the MCPTT user database 2416. The message #23a contains at least one of the MCPTT User Identity A, IMPU2a, IMPI2a. The message may also contain an indication that the user profile is requested. FIG. 29 illustrates an example implementation using the 3GPP Sh interface. The MCPTT user database 2416 searches user profiles related to the MCPPT User Identity A. Below is an example user profile:

| MCPTT User Identity A; Optionally second IMS Public User Identity A, Key, Vector | | |
|---|---|---|
| a) | Position 1 | MCPTT User Identity B |
| b) | Position 2 | MCPTT User Identity C |
| c) | Position 3 | Group Identity A; |
| d) | Position 4 | Group Identity C |
| e) | Position 5 | Codec AMR |
| f) | Position 6 | |

The MCPTT user database 2416 sends a message #23b containing i) pointers or references to where user profile can be found for the MCPTT User Identity A; or ii) user profiles for the MCPTT User Identity A. FIGS. 30 and 31 (including FIGS. 31A and 31B) illustrate an example implementation using the 3GPP Sh interface.

The MCPTT server 2418 receives message #23b. If message #23b contains user profile data, the MCPTT server 2418 sends message #23c to the MCPTT user database 2416 to request to be notified if the user profile changes. FIG. 32 illustrates an example implementation using the 3GPP Sh interface.

If there are changes that occur in the data that is stored for the MCPTT User Identity A that were included in message #23c, the MCPTT user database 2416 can send message #23d. Message #23d contains at least one of IMPI2a, IMPU2a, MCPTT User Identity A and the data that has changed.

Alternatively or additionally, step 23 can be performed using the following procedures:

a) The MCPTT server 2418 sends a SIP SUBSCRIBE message to the MCPTT user database 2416. The SIP Subscribe contains the MCPTT User Identity A and optionally IMPU2a.

b) The MCPTT user database 2416 optionally searches for user profiles related to the MCPPT User Identity A.

c) The MCPTT user database 2416 sends a 200 OK to the MCPTT server 2418.

d) The MCPTT user database 2416 sends a SIP NOTIFY containing either user profile for the MCPTT User Identity A from step 23a), or a pointer or reference to the location of the user profile for MCPTT User Identity A from step 23a).

e) The MCPTT server 2418 receives the SIP NOTIFY(s) and stores the pointer(s)/reference(s) to the user profile(s) associated with the MCPTT User Identity A sent in 23a).

Step 23d) & e) can be repeated many times if the user profile changes, e.g., as result of Step 5c)b) from other MCPTT user identities being used.

Alternatively, if a pointer or reference is received by the MCPTT server 2418, then the MCPTT server 2418 may use the procedure associated with step 29 to perform the step 23, e.g., using HTTP Get and XCAP 200. The R-URI can be that of the MCPTT user database with the MCPTT User Identity A appended to it. FIG. 33 illustrates an example implementation of the messages.

Alternatively the user profile can contain a URI a network stored directory of contacts. In that case the XCAP URI can point to the MCPTT ID of the network directory XML document. FIG. 34 illustrates an example implementation of the message.

In addition, the contact list in the MCPTT user profile can contain a list of XCAP URIs to each of the individual MCPTT IDs in the network stored directory of contacts that the MCPTT user is allowed to call. FIG. 35 illustrates an example contact list according to an implementation.

If the MCPTT UEa 2404 is not provisioned with the location of the user profile(s), then steps 25-30 can be performed.

At step 25, the MCPTT UEa 2404 sends a SIP SUBSCRIBE to the MCPTT server 2418. The SIP SUBSCRIBE contains the MCPTT User Identity A or the second IMS Public User Identity A that will subsequently be used by the UE in SIP messages.

At step 26, the MCPTT server 2418 sends 200 OK. At step 27, the MCPTT server 2418 sends a SIP NOTIFY to the MCPTT UEa 2404, the SIP NOTIFY containing a reference or pointer to the user profile that was references in step 25.

In some cases, the MCPTT UEa 2404 may be provisioned with the location of the user profile for MCPTT User Identity A. The information could be provisioned in UICC, OMA DM MO, via XML, received as part of MCPTT user authentication Token in Oauth mechanism (in step 0) or another mechanism that was used to authenticate the MCPTT User Identity A.

If the user profile location has been provisioned on the UICC, in either the USI/ISIM or another application the ME may retrieve the user profile location information from the application on the UICC.

In another implementation the location of the user profile can be derived by having a known location and appending the MCPTT User Identity A, IMPU2a, or IMPI2a. For example, MCPTT-User-A is included in the GET message below:

GET https://xcap.example.com/UserProfile/user-role-ID/MCPTT-User-A.xml HTTP/1.1.

At step 29, the MCPTT UEa 2404 sends a message (HTTP GET) to obtain the user profile. The message can be sent over an optional tunnel (TLs, TTLS, IPsec etc) to the MCPTT user database. The R-URI of the HTTP GET is that of the document URI. The HTTP GET contains the MCPTT User Identity A or the second IMS Public User Identity A that will subsequently be used by the UE in SIP messages, if available.

The MCPTT user database 2416 receives the HTTP GET. The MCPTT user database 2416 uses the identity (MCPTT User Identity A or the second IMS Public User Identity A that will subsequently be used by the UEa in SIP messages) that was received in the HTTP GET to obtain the user profile.

At step 30, the MCPTT user database 2416 sends the user profile to the MCPTT UEa 2404. A user profile sent to the MCPTT UEa 2404 may contain IMPU2a, IMPI 2a, or a combination thereof. The MCPTT UEa 2404 receives the user profile and stores it either on internal memory or removable card (UICC).

At step 31, the MCPTT UEa 2404 sends a SIP METHOD. The R-URI is the MCPTT server. The SIP METHOD can include 0 to many reference or pointers to user profiles. The reference or pointers may contain additional information that points to a specific entry within the user profile e.g., TO address, SDP entries.

If a user wishes to privately send to sip:joe@example.org (4th entry in the list as shown in Table Y1) then the following Content-Type within a Multipart MIME body of a SIP INVITE can be used, the "%5b4%5d" (escaped 4) may be encrypted:

```
MIME-Version: 1.0
Content-Type: multipart/mixed; boundary=boundary42
--boundary42
Content-Type: message/external-body;
    access-type="URL",
    expiration="Mon, 24 June 2016 09:01:32 GMT";
    URL="https://xcap.example.com/UserProfile/user-role-ID/contact-
list/~~/resource-lists/list/ entry%5b%5d/@uri",
    size=62
    hash=10AB568E91245681AC1B
Content-Type: application/recipient-list+xml
Content-Disposition: recipient-list
---undary42--
```

At step 32, the MCPTT server 2418 checks if IMPU2a (received in step 31) is in a user profile stored locally on the MCPTT server 2418, e.g., via looking for IMPU2a (e.g., from, contact header etc) in user profiles or checking the included pointer or reference has been retrieved and stored. If the user profile is not stored, the MCPTT server 2418 obtains the user profile by sending the HTTP GET message to the MCPTT user database 2416. Following is an example implementation of the GET message:

```
GET   https://xcap.example.com/UserProfile/user-role-ID/contact-
list/~~/resource-lists/list/ entry/%5b4%/%5d/@uri HTTP/1.1
User-Agent: IMS subscriber
Date: Thu, 08 Jan 2004 11:13:17 GMT
Content-Length: 0
```

At step 34, the MCPTT user database 2416 sends the user profile to the MCPTT server 2418.

At step 34, the MCPTT server 2418 searches for the referenced party in the user profile. If the offset parameter was received, the MCPTT server can decrypt the location before searching.

If B party (To address) is referenced, the MCPTT server 2418 determines MCPTT User Identity B for B party from A party user data.

The MCPTT server 2418 determines if B party MCPTT User Identity B has user profile stored in MCPTT server 2418 by looking for B party MCPTT User Identity B in user profiles. If no user profiles exist, the MCPTT server 2418 obtains user profile using the procedure described previously.

The MCPTT server 2418 determines if MCPTT User Identity A exists in B party user profile.

The MCPTT server 2418 determines if other referenced data that was referred to in the incoming received message is in the user profile B. If other referenced data in the same user profile A party exists, the MCPTT server 2418 includes a reference or pointer to that other referenced data in SIP METHOD. If the other referenced data is in another B party user profile, the MCPTT server 2418 includes a reference or pointer to the other B party user profile in SIP METHOD.

If A party identity exists, the MCPTT server 2418 sends SIP METHOD containing reference to user profile that contains the A party.

If the data is not in B party user profile, the MCPTT server 2418 chooses an existing B party user profile. The MCPTT server 2418 creates a new entry in the chosen user profile. The MCPTT server 2418 may act as an XCAP client as defined in 3GPP TS 24.623/RFC 4825 [x] and perform the actions to create a new attribute. The new attribute can be constructed to enable the B party to derive the A parties MCPTT user identity based on an entry, e.g.:

Location X MCPTT User identity or
IMPU2a MCPTT User identity

When MCPTT server 2418 sends the SIP METHOD it may also update or change the URI lifetime so that the MCPTT UEb 2402 knows the document has changed.

The MCPTT UEb 2402 receives the SIP METHOD. The SIP METHOD may contain 0 to many references or pointers to user profiles. If the MCPTT UEb 2402 has previously obtained the XML document that is made reference to in the reference or pointer, then the MCPTT UEb 2402 may check to see if the URI lifetime is valid. If the URI lifetime is not valid then the MCPTT UEb 2402 may perform step 35.

If the URI lifetime is valid, or the MCPTT UEb 2402 has retrieved the user profile using steps 35 and 36 the MCPTT UEb 2402 may use the received references or pointers to obtain the information. In the case of references or pointers identifying a contact identity, said contact identity may be displayed on the screen.

If the URI lifetime is not valid, the MCPTT UEb 2402 may retrieve the user profile that was referenced in the SIP METHOD.

While this disclosure contains many specific implementation details, these should not be construed as limitations on the scope of any invention or on the scope of what may be claimed, but rather as descriptions of features that may be specific to particular implementations of particular inventions. For example, the solutions described herein can apply to mission critical services in addition to MCPTT. Examples of these mission critical services include mission critical video (MCVideo), mission critical data (MCData), or any other mission critical services. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

APPENDIX A

On sending an unprotected REGISTER request, the UE shall populate the header fields as follows:

a) a From header field set to the SIP URI that contains:

1) if the UE supports RFC 6140 [191] and performs the functions of an external attached network, the main URI of the UE; else 2) the public user identity to be registered;

b) a To header field set to the SIP URI that contains:

1) if the UE supports RFC 6140 [191] and performs the functions of an external attached network, the main URI of the UE; else 2) the public user identity to be registered;

c) a Contact header field set to include SIP URI(s) containing the IP address or FQDN of the UE in the hostport parameter. If the UE:

1) supports GRUU (see table A.4, item A.4/53);

2) supports multiple registrations;

3) has an IMEI available; or 4) has an MEID available;

the UE shall include a "+sip.instance" header field parameter containing the instance ID. Only the IMEI shall be used for generating an instance ID for a multi-mode UE that supports both 3GPP and 3GPP2 defined radio access networks.

NOTE 2: The requirement placed on the UE to include an instance ID based on the IMEI or the MEID when the UE does not support GRUU and does not support multiple registrations does not imply any additional requirements on the network.

If the UE supports multiple registrations it shall include "reg-id" header field parameter as described in RFC 5626 [92]. The UE shall include all supported ICSI values (coded as specified in subclause 7.2A.8.2) in a g.3gpp.icsi-ref media feature tag as defined in subclause 7.9.2 and RFC 3840 [62] for the IMS communication services it intends to use, and IARI values (coded as specified in subclause 7.2A.9.2), for the IMS applications it intends to use in a g.3gpp.iari-ref media feature tag as defined in subclause 7.9.3 and RFC 3840 [62].

If the UE supports MCPTT application it shall include the g.3gpp.icsi-ref-mcptt feature tag.

if the UE supports RFC 6140 [191] and performs The functions of an external attached network, for the registration of bulk number contacts the UE shall shall include a Contact URI without a user portion and containing the "bnc" URI parameter;

If the UE supports MCPTT application it shall include a Contact URI and containing the " doubleauthentication " URI parameter.

d) a Via header field set to include the sent-by field containing the IP address or FQDN of the UE and the port number where the UE expects to receive the response to this request when UDPis used. For TCP, the response is received on the TCP connection on which the request was sent. For the UDP, the UE shall also include a "rport" header field parameter with no value in the Via header field. Unless the UE has been configured to not send keep-alives, and unless the UE is directly connected to an IP-CAN for which usage of NAT is not defined, it shall include a "keep" header field parameter with no value in the Via header field, in order to indicate support of sending keep-alives associated with the registration, as described in RFC 6223 [143];

NOTE 3: When sending the unprotected REGISTER request using UDP, the UE transmit the request from the same IP address and port on which it expects to receive the response to this request.

e) a registration expiration interval value of 600 000 seconds as the value desired for the duration of the registration;

NOTE 4: The registrar (S-CSCF) might decrease the duration of the registration in accordance with network policy. Registration attempts with a registration period of less than a predefined minimum value defined in the registrar will be rejected with a 423 (Interval Too Brief) response.

f) a Request-URI set to the SIP URI of the domain name of the home network used to address the REGISTER request;

g) the Supported header field containing the option-tag "path", and 1) if GRUU is supported, the option-tag "gruu"; ~~and~~

2) if multiple registrations is supported, the option-tag "outbound";

3) if MCPTT application is supported, the option-tag "double authentication"

5.1.1.2.2 Initial registration using IMS AKA

On sending a REGISTER request, as defined in subclause 5.1.1.2.1, the UE shall additionally populate the header fields as follows:

a) an Authorization header field, with:

- the "username" header field parameter, set to the value of the private user identity;

- the "realm" header field parameter, set to the domain name of the home network;

- the "uri" header field parameter, set to the SIP URI of the domain name of the home network;

- the "nonce" header field parameter, set to an empty value; and

- the "response" header field parameter, set to an empty value;

NOTE 1: If the UE specifies its FQDN in the hostport parameter in the Contact header field and in the sent-by field in the Via header field, then it has to ensure that the given FQDN will resolve (e.g., by reverse DNS lookup) to the IP address that is bound to the security association.

NOTE 2: The UE associates two ports, a protected client port and a protected server port, with each pair of security association. For details on the selection of the port values see 3GPP TS 33.203 [19].

b) additionally for the Contact header field, if the REGISTER request is protected by a security association, include the protected server port value in the hostport parameter;

c) additionally for the Via header field, for UDP, if the REGISTER request is protected by a security association, include the protected server port value in the sent-by field; and d) a Security-Client header field set to specify the signalling plane security mechanism the UE supports, the IPsec layer algorithms the UE supports and the parameters needed for the security association setup. The UE shall support the setup of two pairs of security associations as defined in 3GPP TS 33.203 [19]. The syntax of the parameters needed for the security association setup is specified in annex H of 3GPP TS 33.203 [19]. If the UE supports the MCPPT application then the UE shall support the "ipsec-MCPTT" security mechanism otherwise the UE shall support the "ipsec-3gpp" securitylhanism, as specified in RFC 3329 [48]. The UE shall support the IPsec layer algorithms for integrity and confidentiality protection as defined in 3GPP TS 33.203 [19], and shall announce support for them according to the procedures defined in RFC 3329 [48].

Possible change to 3GPP TS 24.229

APPENDIX B

| Table 6.3.2: Authentication Data content – Request | | | |
|---|---|---|---|
| Information element name | Mapping to Diameter AVP | Cat. | Description |
| Authentication Scheme (See 7.9.2) | SIP-Authentication-Scheme | M | This information element indicates the authentication scheme. It shall contain:<br>- "Digest-AKAv1-MD5" if the S-CSCF knows that IMS-AKA is to be used.<br>- "biometric finger prnt " if the S-CSCF knows that biometric finger prnt is to be used and 2 sets of authentications vectors are required.<br>- "Digest-AKAv2-SHA-256" if the S-CSCF knows that IMS-AKA using HTTP Digest AKAv2 is to be used.<br>- "Digest-AKAv2-SHA-256" if the S-CSCF knows that IMS-AKA using HTTP Digest AKAv2 is to be used and 2 sets of authentications vectors are required.<br>- "SIP Digest" if the S-CSCF knows that SIP Digest is to be used.<br>- "NASS-Bundled" if the S-CSCF knows that NASS Bundled authentication is to be used.<br>- "Early-IMS-Security" if the S-CSCF knows that GPRS-IMS-Bundled Authentication is to be used.<br>- "Unknown" if the S-CSCF can not know the authentication scheme at this point. |

Possible change to 3GPP 29.228

APPENDIX C

| Table 6.3.2: Authentication Data content – Request ||||
|---|---|---|---|
| Information element name | Mapping to Diameter AVP | Cat. | Description |
| Authentication Scheme (See 7.9.2) | MCPTT SIP-Authentication-Scheme | O | This information element indicates the MCPTT authentication scheme. It shall contain:<br>- " biometric finger prnt " if the S-CSCF knows that biometric finger prnt is to be used.- "Digest-AKAv2-SHA-256" if the S-CSCF knows that IMS-AKA using HTTP Digest AKAv2 is to be used.<br>- "SIP Digest" if the S-CSCF knows that SIP Digest is to be used.<br>- "NASS-Bundled" if the S-CSCF knows that NASS Bundled authentication is to be used.<br>- "Early-IMS-Security" if the S-CSCF knows that GPRS-IMS-Bundled Authentication is to be used.<br>- "biometric finger prnt" if the S-CSCF knows biometric finger print is being used.<br><br>- "Unknown" if the S-CSCF can not know the authentication scheme at this point. |

Possible change to 3GPP 29.228

APPENDIX D

| Table 6.3.5.bis: Authentication Data content – Response for IMS-AKA ||||
|---|---|---|---|
| Information element name | Mapping to Diameter AVP | Cat. | Description |
| Item Number (See 7.9.1) | SIP-Item-Number | C | This information element shall be present in a SIP-Auth-Data-Item grouped AVP in circumstances where there are multiple occurrences of SIP-Auth-Data-Item AVPs, and the order in which they should be processed is significant. In this scenario, SIP-Auth-Data-Item AVPs with a low SIP-Item-Number value should be processed before SIP-Auth-Data-Items AVPs with a high SIP-Item-Number value. |
| Authentication Scheme (See 7.9.2) | SIP-Authentication-Scheme | M | Authentication scheme. It shall contain " biometric finger prnt " or "DDigest-AKAv2-SHA-256" for IMS-AKA using HTTp Digest AKAv2. |
| Authentication Information (See 7.9.3) | SIP-Authenticate | M | It shall contain, binary encoded, the concatenation of the authentication challenge RAND and the token AUTN. See 3GPP TS 33.203 [3] for further details about RAND and AUTN. The Authentication Information has a fixed length of 32 octets; the 16 most significant octets shall contain the RAND, the 16 least significant octets shall contain the AUTN. |
| Authorization Information (See 7.9.4) | SIP-Authorization | M | It shall contain, binary encoded, the expected response XRES. See 3GPP TS 33.203 [3] for further details about XRES. |
| Confidentiality Key (See 7.9.5) | Confidentiality-Key | O | This information element, if present, shall contain the confidentiality key. It shall be binary encoded. |
| Integrity Key (See 7.9.6) | Integrity-Key | M | This information element shall contain the integrity key. It shall be binary encoded. |

Possible change to 3GPP 29.228

APPENDIX E

5.1.1.5 Authentication
5.1.1.5.1    IMS AKA - general
Authentication is performed during initial registration. A UE can be re-authenticated during subsequent reregistrations, deregistrations or registrations of additional public user identities. When the network requires authentication or re-authentication of the UE, the UE will receive a 401 (Unauthorized) response to the REGISTER request.
On receiving a 401 (Unauthorized) response to the REGISTER request, the UE shall:

1) extract the RAND and AUTN parameters;

2) check the validity of a received authentication challenge, as described in 3GPP TS 33.203 [19] i.e. the locally calculated XMAC must match the MAC parameter derived from the AUTN part of the challenge; and the SQN parameter derived from the AUTN part of the challenge must be within the correct range; and 3) check the existence of the Security-Server header field as described in RFC 3329 [48]. If the Security-Server header field is not present or it does not contain the parameters required for the setup of the set of security associations (see annex H of 3GPP TS 33.203 [19]), the UE shall abandon the authentication procedure and send a new REGISTER request with a new Call-ID.

In the case that the 401 (Unauthorized) response to the REGISTER request is deemed to be valid the UE shall:

If the UE supports the MCPTT application, the UE requested double authentication (see step 1 above) and the 401 (Unauthorized) response to the REGISTER request contains a second instance of the WWW-Authenticate header, then the UE shall:

1) extract the CHALLENGE and AUTHN parameters;

2) check the validity of a received authentication challenge by using the AUTHN parameter; and

In the case that the AUTHN parameter is deemed to be valid the UE shall:
  1) execute the MCPTT application authentication as described in 3GPP TS 33.xxx [19];

1)    calculate the RES parameter and derive the keys CK and IK from RAND as described in

Possible change to 3GPP TS 24.229

APPENDIX F

> 5.1.1.4.2 IMS AKA as a security mechanism
> On sending a REGISTER request, as defined in subclause 5.1.1.4.1, the UE shall additionally populate the header fields as follows:
> a) an Authorization header field, with:
>
> - the "username" header field parameter set to the value of the private user identity;
>
> - the "realm" header field parameter directive, set to the value as received in the "realm" WWW-Authenticate header field parameter;
>
> - the "uri" header field parameter, set to the SIP URI of the domain name of the home network;
>
> - the "nonce" header field parameter, set to last received nonce value; and
>
> - the "response" header field parameter, set to the last calculated response value with the second calculated response appended to the 1$^{st}$ using "|".

Possible change to 3GPP TS 24.229

APPENDIX G

| Table 6.3.2: Authentication Data content – Request ||||
|---|---|---|---|
| Information element name | Mapping to Diameter AVP | Cat. | Description |
| Authentication Scheme (See 7.9.2) | SIP-Authentication-Scheme | M | This information element indicates the authentication scheme. It shall contain:<br>- "Digest-AKAv1-MD5" if the S-CSCF knows that IMS-AKA is to be used.<br>- "Digest-AKAv2-SHA-256" if the S-CSCF knows that IMS-AKA using HTTP Digest AKAv2 is to be used.<br>- "SIP Digest" if the S-CSCF knows that SIP Digest is to be used.<br>- "NASS-Bundled" if the S-CSCF knows that NASS Bundled authentication is to be used.<br>- "Early-IMS-Security" if the S-CSCF knows that GPRS-IMS-Bundled Authentication is to be used.<br>- "Unknown" if the S-CSCF can not know the authentication scheme at this point.<br>- "Public-User-Authentication" if the S-CSCF knows that Public User Identity is to be authenticated. |
| Authentication Context (See 7.9.7) | SIP-Authentication-Context | C | It shall contain authentication-related information relevant for performing the authentication. When Authentication Scheme contains "Digest-AKAv1-MD5" "Public-User-Authentication" or "Digest-AKAv2-SHA-256", this AVP is not used and shall be missing. |

Possible change to 3GPP 29.228

APPENDIX H

Table 6.3.1: Authentication Request

| Information element name | Mapping to Diameter AVP | Cat. | Description |
|---|---|---|---|
| Public User Identity (See 7.2) | Public-Identity | M | This information element contains the Distinct Public User Identity of the user |
| Private User Identity (See 7.3) | User-Name | M | This information element contains the Private User Identity |
| Number Authentication Items (See 7.10) | SIP-Number-Auth-Items | M | This information element indicates the number of authentication vectors requested. Certain authentication schemes do not support more than one set of authentication vectors (e.g. SIP Digest, GIBA). |
| Authentication Data (See 7.9) | SIP-Auth-Data-Item | M | See Tables 6.3.2 and 6.3.3 for the contents of this information element. The content shown in table 6.3.2 shall be used for a normal authentication request; the content shown in table 6.3.3 shall only be used for an IMS-AKA authentication request after synchronization failure. |
| S-CSCF Name (See 7.4) | Server-Name | M | This information element contains the name (SIP URL) of the S-CSCF. |
| Routing Information (See 7.13) | Destination-Host | C | If the S-CSCF knows the HSS name this AVP shall be present. This information is available if the MAR belongs to an already existing registration, e.g. in case of the re-registration, where the HSS name is stored in the S-CSCF. The HSS name is obtained from the Origin-Host AVP, which is received from the HSS, e.g. included in the MAA command. This information may not be available if the command is sent in case of the initial registration. In this case the Destination-Host AVP is not present and the command is routed to the next Diameter node, e.g. SLF, based on the Diameter routing table in the client. |

3GPP 29.228 Authentication Request Data

APPENDIX I

| Table 6.3.5.bis: Authentication Data content – Response for IMS-AKA ||||
|---|---|---|---|
| Information element name | Mapping to Diameter AVP | Cat. | Description |
| Item Number (See 7.9.1) | SIP-Item-Number | C | This information element shall be present in a SIP-Auth-Data-Item grouped AVP in circumstances where there are multiple occurrences of SIP-Auth-Data-Item AVPs, and the order in which they should be processed is significant. In this scenario, SIP-Auth-Data-Item AVPs with a low SIP-Item-Number value should be processed before SIP-Auth-Data-Items AVPs with a high SIP-Item-Number value. |
| Authentication Scheme (See 7.9.2) | SIP-Authentication-Scheme | M | Authentication scheme. It shall contain "DDigest-AKAv1-MD5" or "DDigest-AKAv2-SHA-256" for IMS-AKA using HTTP Digest AKAv2.<br>- "Public-User-Authentication" if the S-CSCF knows that Public User Identity is to be authenticated. |
| Authentication Information (See 7.9.3) | SIP-Authenticate | M | It shall contain, binary encoded, the concatenation of the authentication challenge RAND and the token AUTN. See 3GPP TS 33.203 [3] for further details about RAND and AUTN. The Authentication Information has a fixed length of 32 octets; the 16 most significant octets shall contain the RAND, the 16 least significant octets shall contain the AUTN.<br>If "Public-User-Authentication" is included this field is blank<br>ALTERNATIVE IMPLEMENTATION<br>This field contains the challenge to be sent to the device. |
| Authorization Information (See 7.9.4) | SIP-Authorization | M | It shall contain, binary encoded, the expected response XRES. See 3GPP TS 33.203 [3] for further details about XRES. |
| Confidentiality Key (See 7.9.5) | Confidentiality-Key | O | This information element, if present, shall contain the confidentiality key. It shall be binary encoded. |
| Integrity Key (See 7.9.6) | Integrity-Key | M | This information element shall contain the integrity key. It shall be binary encoded. |

Possible change to 3GPP 29.228

APPENDIX J

6.3.15 Server-Assignment-Type AVP
The Server-Assignment-Type AVP is of type Enumerated, and indicates the type of server update, request or notification being performed in a Server-Assignment-Request operation. The following values are defined:
  NO_ASSIGNMENT (0)

> This value is used to request from HSS the user profile assigned to one or more public identities and to retrieve the S-CSCF restoration information for a registered Public User Identity, without affecting the registration state of those identities.

REGISTRATION (1)

> The request is generated as a consequence of a first registration of an identity.

....

RESTORATION (14)

> Used in the SWx protocol, defined in 3GPP TS 29.273 [18]. This value is not used in the Cx protocol.

MCPTT REGISTRATION (14)

> The request is generated as a consequence of a registration of an identity for MCPTT service.

Possible Changes to 3GPP 29.229

APPENDIX K

6.1.3 Server-Assignment-Request (SAR) Command

The Server-Assignment-Request (SAR) command, indicated by the Command-Code field set to 301 and the 'R' bit set in the Command Flags field, is sent by a Diameter Multimedia client to a Diameter Multimedia server in order to request it to store the name of the server that is currently serving the user.

Message Format

```
<Server-Assignment-Request> ::=  < Diameter Header: 301, REQ, PXY, 16777216 >
                < Session-Id >
                { Vendor-Specific-Application-Id }
                { Auth-Session-State }
                { Origin-Host }
                { Origin-Realm }
                [ Destination-Host ]
                { Destination-Realm }
                [ User-Name ]
                [ OC-Supported-Features ]
               *[ Supported-Features ]
               *[ Public-Identity ]
                [ Wildcarded-Public-Identity ]
                { Server-Name }
                { Server-Assignment-Type }
                { User-Data-Already-Available }
                [ SCSCF-Restoration-Info ]
                [ Multiple-Registration-Indication ]
                [ Session-Priority ]
                [ Application-Registration]
                       *[ AVP ]
                       *[ Proxy-Info ]
                       *[ Route-Record ]
```

6.3.X  Application-Registration AVP

The Applications-Registration AVP is of type Grouped and it contains the application that the user is registering for.

AVP format

Supported-Applications ::=  < AVP header: 12345678 >
                *[ Application ]

Application is of OctectString or UTF*String and contains the name of the application being registered for.  Valid entries are:

"MCPTT"

Possible Changes to 3GPP 29.229

APPENDIX L

5.1.1.5 Authentication
5.1.1.5.1 IMS AKA - general

Authentication is performed during initial registration. A UE can be re-authenticated during subsequent reregistrations, deregistrations or registrations of additional public user identities. When the network requires authentication or re-authentication of the UE, the UE will receive a 401 (Unauthorized) response to the REGISTER request.

......

4) send another REGISTER request towards the protected server port indicated in the response using the temporary set of security associations to protect the message. The header fields are populated as defined for the initial REGISTER request that was challenged with the received 401 (Unauthorized) response, with the addition that the UE shall include an Authorization header field containing:

If UE does not wants to perform Public User Identity authentication for a specific application then:

- the "realm" header field parameter set to the value as received in the "realm" WWW-Authenticate header field parameter;

- the "username" header field parameter, set to the value of the private user identity

- the "response" header field parameter that contains the RES parameter, as described in RFC 3310 [49]

- the "uri" header field parameter, set to the SIP URI of the domain name of the home network;

- the "algorithm" header field parameter, set to the value received in the 401 (Unauthorized) response; and

- the "nonce" header field parameter, set to the value received in the 401 (Unauthorized) response.

If UE does wants to perform Public User Identity authentication for a specific application then:

- the "realm" header field parameter set to the value as received in the "realm" WWW-Authenticate header field parameter;

*THEN*

- the "username" header field parameter, set to the value of the private user identity, and if MCPTT application is supported appended the Public User Identity to be used for MCPTT application as defined in 3GPP TS 23.003 [yy].

*OR ALTERNATIVE*

- the "username" header field parameter, set to the value of the Public User Identity to be authenticated;

*FOLLOWING IS COMMON*

- the "response" header field parameter that contains the RES parameter, for the Public User Identity to be used for MCPTT application

- the "uri" header field parameter, set to the SIP URI of the domain name of the home network;

- the "algorithm" header field parameter, set to the value "public user authentication"; and

- the "nonce" header field parameter, set to the value "public user authentication".

The UE shall also insert the Security-Client header field that is identical to the Security-Client header field that was included in the previous REGISTER request (i.e. the REGISTER request that was challenged with the received 401 (Unauthorized) response). The UE shall also insert the Security-Verify header field into the request, by mirroring in it the content of the Security-Server header field received in the 401 (Unauthorized) response. The UE shall set the Call-ID of the security association protected REGISTER request which carries the authentication challenge response to the same value as the Call-ID of the 401 (Unauthorized) response which carried the challenge.

Possible Changes to 3GPP 29.229

APPENDIX M

7.1.2 Command parameters and data

......

| Code | Value |
|------|-------|
| CLA  | As specified in TS 31.101 [11] |
| INS  | '88' |
| P1   | '00' |
| P2   | See table 1 below |
| Lc   | See below |
| Data | See below |
| Le   | '00', or maximum length of data expected in response |

Parameter P2 specifies the authentication context as follows:

Table 1: Coding of the reference control P2

| Coding b8-b1 | Meaning |
|--------------|---------|
| '1-------'   | Specific reference data (e.g. DF specific/application dependant key) |
| '----- XXX'  | Authentication context:<br>000 Reserved<br>001 IMS AKA<br>010 HTTP Digest<br>101 external authentication |

All other codings are RFU.

.....

7.1.2.1a      external extension

| Byte(s) | Description | Length |
|---------|-------------|--------|
| 1 | Length of RAND (L1) | 1 |
| 2 to (L1+1) | RAND | L1 |
| (L1+2) | Length of AUTN (L2)        (see note) | 1 |
| (L1+3) to (L1+L2+2) | AUTN<br>        (see note) | L2 |
| L1+L2+3) to (L1+L2+L3+2) | External authentication input key | L3 |
| Note: Parameter present if and only if in 3G security context. | | |

The coding of AUTN is described in TS 33.102 [13]. The most significant bit of RAND is coded on bit 8 of byte 2. The most significant bit of AUTN is coded on bit 8 of byte (L1+3).

The external authentication input key is of variable length of alphanumeric digits. It consists of a tag , length and content.

Response parameters/data, case 1, 3G security context, command successful:

| Byte(s) | Description | Length |
|---|---|---|
| 1 | "Successful 3G authentication" tag = 'DB' | 1 |
| 2 | Length of RES (L3) | 1 |
| 3 to (L3+2) | RES | L3 |
| (L3+3) | Length of CK (L4) | 1 |
| (L3+4) to (L3+L4+3) | CK | L4 |
| (L3+L4+4) | Length of IK (L5) | 1 |
| (L3+L4+5) to (L3+L4+L5+4) | IK | L5 |
| (L3+L4+L5+5) | Length of $K_C$ (= 8)    (see note) | 1 |
| (L3+L4+L5+6 to (L3+L4+L5+13) | $K_C$    (see note) | 8 |
| Note: | Parameter present if and only if Service n°27 is "available". | |

The most significant bit of RES is coded on bit 8 of byte 3. The most significant bit of CK is coded on bit 8 of byte (L3+4). The most significant bit of IK is coded on bit 8 of byte (L3+L4+5).

Response parameters/data, case 2, 3G security context, synchronisation failure:

| Byte(s) | Description | Length |
|---|---|---|
| 1 | "Synchronisation failure" tag = 'DC' | 1 |
| 2 | Length of AUTS (L1) | 1 |
| 3 to (L1+2) | AUTS | L1 |

The coding of AUTS is described in TS 33.102 [13]. The most significant bit of AUTS is coded on bit 8 of byte 3.

Response parameters/data, case 3, GSM security context, command successful:

| Byte(s) | Description | Length |
|---|---|---|
| 1 | Length of SRES (= 4) | 1 |
| 2 to 5 | SRES | 4 |
| 6 | Length of $K_C$ (= 8) | 1 |
| 7 to 14 | $K_C$ | 8 |

The most significant bit of SRES is coded on bit 8 of byte 2. The most significant bit of Kc is coded on bit 8 of byte 7.

Possible Changes to 3GPP TS 31.103

APPENDIX N

| Table 6.3.1: Authentication Request | | | |
|---|---|---|---|
| Information element name | Mapping to Diameter AVP | Cat. | Description |
| Public User Identity (See 7.2) | Public-Identity | M | This information element contains the Distinct Public User Identity of the user |
| Private User Identity (See 7.3) | User-Name | M | This information element contains the Private User Identity |
| Number Authentication Items (See 7.10) | SIP-Number-Auth-Items | M | This information element indicates the number of authentication vectors requested. Certain authentication schemes do not support more than one set of authentication vectors (e.g. SIP Digest, GIBA). |
| Authentication Data (See 7.9) | SIP-Auth-Data-Item | M | See Tables 6.3.2 and 6.3.3 for the contents of this information element. The content shown in table 6.3.2 shall be used for a normal authentication request; the content shown in table 6.3.3 shall only be used for an IMS-AKA authentication request after synchronization failure. |
| S-CSCF Name (See 7.4) | Server-Name | M | This information element contains the name (SIP URL) of the S-CSCF. |
| Routing Information (See 7.13) | Destination-Host | C | If the S-CSCF knows the HSS name this AVP shall be present.<br>This information is available if the MAR belongs to an already existing registration, e.g. in case of the re-registration, where the HSS name is stored in the S-CSCF. The HSS name is obtained from the Origin-Host AVP, which is received from the HSS, e.g. included in the MAA command.<br>This information may not be available if the command is sent in case of the initial registration. In this case the Destination-Host AVP is not present and the command is routed to the next Diameter node, e.g. SLF, based on the Diameter routing table in the client. |

Authentication Function

APPENDIX O

8.2.X Identity attributes
8.2.X.1   AT_Identity_Request attribute

```
 7    6    5    4    3    2    1    0
┌─────────────────────────────────────────┬────────┐
│ Attribute Type = AT_Identity_Request    │ octet 1│
├─────────────────────────────────────────┼────────┤
│ Length = 1                              │ octet 2│
├─────────────────────────────────────────┼────────┤
│                                         │ octet 3│
│ Value                                   │ octet 4│
└─────────────────────────────────────────┴────────┘
```

Figure 8.2.X.1-1: AT_Identity_Request attribute

Table 8.2.X.1-1: : AT_Identity_Request attribute

Octet 1 indicates the type of attribute as AT_Identity_Request with a value of 1XX.

Octet 2 is the length of this attribute which shall be set to 1 as per IETF RFC 4187 [33]

Octet 3 and 4 is the value of the attribute. Octet 3 is reserved and shall be coded as zero. Octet 4 shall be set as follows. All other values are reserved.

| 7 | 6 | 5 | 4 | 3 | 2 | 1 | 0 | Identity request |
|---|---|---|---|---|---|---|---|------------------|
| 0 | 0 | 0 | 0 | 0 | 0 | 0 | 1 | Public User Identity |
| 0 | 0 | 0 | 0 | 0 | 0 | 1 | 0 | Private User Identity |
| 0 | 0 | 0 | 0 | 0 | 0 | 1 | 1 | Private and Public User Identity |

Possible changes to 3GPP TS 24.302

APPENDIX P

8.2.X.2 AT_Identity_Request_RESP attribute

8.2.X.2.1 General

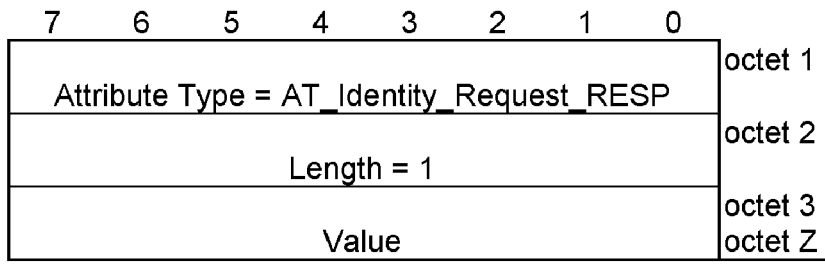

Figure 8.2.X.1-1: AT_Identity_Request attribute_RESP

8.2.x.2.2 Value

There may be multiple Values encoded in the AT_Identity_Request_RESP.

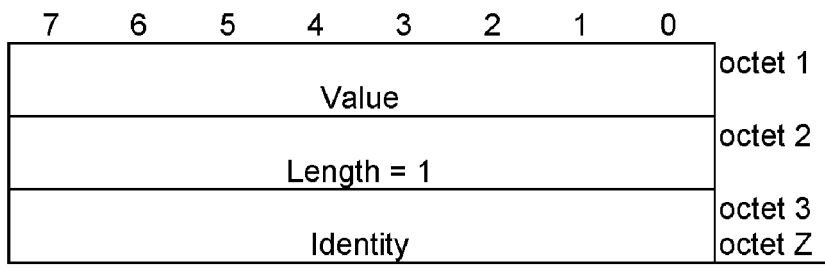

Figure 8.2.X.1-1: AT_Identity_Request attribute_RESP Value

Table 8.2.X.1-1: : AT_Identity_Request attribute_RESP Value

| Octet 1 indicates the identity that is encoded. . |
|---|
| Octet 1 shall be set as follows. All other values are reserved.<br>7 6 5 4 3 2 1 0   Identity Encoded<br>0 0 0 0 0 0 0 1   Public User Identity<br>0 0 0 0 0 0 1 0   Private User Identity<br>0 0 0 0 0 0 1 1   Private and Public User Identity |

8.2.x.2.3 Identity

The identity field is an octet string encoded according to UTF-8 encoding rules as specified in IETF RFC 3629 [34].

Possible changes to 3GPP TS 24.302

APPENDIX Q

6.1.2 Data Update (Sh-Update)

This procedure is used between the AS and the HSS. The procedure is invoked by the AS and is used:
- To allow the AS to update the transparent (repository) data stored at the HSS for each IMS Public User Identity (for Public User Identities matching a Wildcarded Public User Identity, the transparent data shall be stored per Wildcarded Public User Identity, and not for each specific Public User Identity matching that Wildcarded Public User Identity) or Public Service Identity (for Public Service Identities matching a Wildcarded PSI, the transparent data shall be stored per Wildcarded PSI, and not for each specific Public Service Identity matching that Wildcarded PSI).

- To allow the AS to update the PSI Activation State of a distinct Public Service Identity in the HSS.

- To allow the AS to update the Dynamic Service Activation Info stored at the HSS.

- To allow the AS to update the Short Message Service Registration Info stored at the HSS.

- To allow the AS to update a service repository function (e.g. PS-UDF) with identities that have registered for that service.

This procedure is mapped to the commands Profile-Update-Request/Answer in the Diameter application specified in 3GPP TS 29.329 [5]. Tables 6.1.2.1 and 6.1.2.2 detail the involved information elements.

7.6.3 IMS User State

This information element contains the IMS User State of the public identifier referenced. Its possible values are:
- REGISTERED,
- NOT_REGISTERED,
- AUTHENTICATION_PENDING,
- REGISTERED_UNREG_SERVICES.
- REGISTERED for service X,
- NOT_REGISTERED for service X,

If the IMS Public User Identity is shared between multiple Private User Identities, HSS shall indicate the most registered state of the shared IMS Public User Identity to an AS. The most registered state of a shared IMS Public User Identity is defined as follows:
- If the shared IMS Public User Identity is registered with any of the Private User Identities, the most registered state of the shared IMS Public User Identity is REGISTERED.

- If the shared IMS Public User Identity is not currently registered with any of the Private User Identities, but it is in state > REGISTERED_UNREG_SERVICES, then the most registered state of the shared IMS Public User Identity is REGISTERED_UNREG_SERVICES.
>
> - If the shared IMS Public User Identity is not currently registered with any of the Private User Identities, and it is not in state REGISTERED_UNREG_SERVICES, but it is in the process of being authenticated with any of the Private User Identities, then the most registered state of the shared IMS Public User Identity is AUTHENTICATION_PENDING.
>
> - If the shared IMS Public User Identity is not currently registered with any of the Private User Identities, and it is not in state REGISTERED_UNREG_SERVICES, and it is not in the process of being authenticated with any of the Private User Identities, then the most registered state of the shared IMS Public User Identity is NOT_REGISTERED.
>
> NOTE X ABOVE IS REPLACED WITH MCPTT
>
> ## 7.6.X    Service Registered for
> This information element contains the ID of the Service that the IMS User has registered for. Its possible values are:
>
> - MCPTT (0)
>
> - PTT (1)
>
> ## 7.6.X+1  Device ID
> This information element contains the Device ID of the device that the IMS User has registered for MCPTT services. Its possible values are:
>
> - Instance-ID (see 3GPP TS 24.229)

Possible changes to 3GPP TS 29.328

APPENDIX R

| Information element name | Mapping to Diameter AVP | Cat. | Description |
|---|---|---|---|
| User Identity (See 7.1) | User-Identity | M | IMS Public User Identity or Public Service Identity or MSISDN for which data has changed.<br>If the request refers to a Wildcarded PSI, the HSS may include any PSI matching the corresponding Wildcarded PSI in this information element. The AS shall find the corresponding Wildcarded PSI with this information.<br>See section 7.1 for the content of this AVP. |
| Wildcarded PSI (See 7.1A) | Wildcarded-Public-Identity | O | If the request refers to a Wildcarded PSI, the HSS shall include the corresponding Wildcarded PSI in this information element.<br><br>If this element is present, it shall be used by the AS instead of the User Identity to identify the identity affected by the request. |
| Wildcarded Public User Identity (See 7.1B) | Wildcarded-IMPU | O | If the request refers to a Wildcarded Public User Identity, the HSS shall include the corresponding Wildcarded Public User Identity in this information element.<br><br>If this element is present, it shall be used by the AS instead of the User Identity to identify the identity affected by the request. |
| Data (See 7.6) | User-Data | M | Changed data. |
| Private Identity (see 7.6.19) | User-Name | C | Private Identity of the user for whom the data is required.<br>This information element shall be present only if the associated request included the Private Identity. |

Table 6.1.4.1: Sh-Notify

7.6.3 IMS User State

This information element contains the IMS User State of the public identifier referenced. Its possible values are:

- REGISTERED,

- NOT_REGISTERED,

- AUTHENTICATION_PENDING,

- REGISTERED_UNREG_SERVICES.

- REGISTERED for service X,

- NOT_REGISTERED for service X,

If the IMS Public User Identity is shared between multiple Private User Identities, HSS shall indicate the most registered state of the shared IMS Public User Identity to an AS. The most registered state of a shared IMS Public User Identity is defined as follows:
- If the shared IMS Public User Identity is registered with any of the Private User Identities, the most registered state of the shared IMS Public User Identity is REGISTERED.

- If the shared IMS Public User Identity is not currently registered with any of the Private User Identities, but it is in state REGISTERED_UNREG_SERVICES, then the most registered state of the shared IMS Public User Identity is REGISTERED_UNREG_SERVICES.

- If the shared IMS Public User Identity is not currently registered with any of the Private User Identities, and it is not in state REGISTERED_UNREG_SERVICES, but it is in the process of being authenticated with any of the Private User Identities, then the most registered state of the shared IMS Public User Identity is AUTHENTICATION_PENDING.

- If the shared IMS Public User Identity is not currently registered with any of the Private User Identities, and it is not in state REGISTERED_UNREG_SERVICES, and it is not in the process of being authenticated with any of the Private User Identities, then the most registered state of the shared IMS Public User Identity is NOT_REGISTERED.

7.6.X Service Registered for
This information element contains the ID of the Service that the IMS User has registered for. Its possible values are:

- MCPTT (0)

- PTT (1)

-

7.6.X+1    Device ID
This information element contains the Device ID of the device that the IMS User has registered for MCPTT services. Its possible values are:

- Instance-ID (see 3GPP TS 24.229)

Possible Changes to 3GPP 29.328.

APPENDIX S

8.2.X Identity attributes
8.2.X.1 AT_Identity_Request attribute

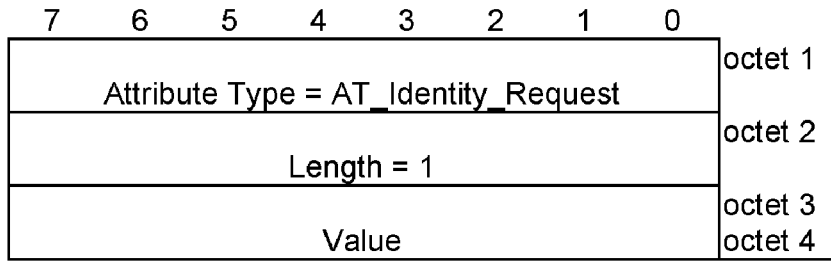

Figure 8.2.X.1-1: AT_Identity_Request attribute

Table 8.2.X.1-1: : AT_Identity_Request attribute

Octet 1 indicates the type of attribute as AT_Identity_Request with a value of 1XX.

Octet 2 is the length of this attribute which shall be set to 1 as per IETF RFC 4187 [33]

Octet 3 and 4 is the value of the attribute. Octet 3 is reserved and shall be coded as zero. Octet 4 shall be set as follows. All other values are reserved.

```
7 6 5 4 3 2 1 0    Identity request
0 0 0 0 0 0 0 1    ME identifier
0 0 0 0 0 0 1 0    PLMN registered on
0 0 0 0 0 0 1 1    ME identifier and PLMN registered on
```

Possible changes to 3GPP TS 24.302

APPENDIX T

8.2.X.2 AT_PLMN_ID_attribute_RESP
8.2.X.2.1 General

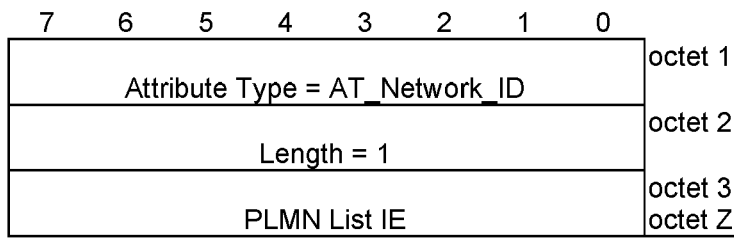

Figure 8.2.X.1-1: AT_PLMN_ID attribute_RESP

8.2.X.2.2 PLMN List IE

The PLMN List information element is used by the network to determine the MCPTT server that should be selected. The format of the PLMN List information element coded according to 3GPP TS 24.007 [48] subclause 11.2.2.1 is shown in figure 8.2.X.2.2-1

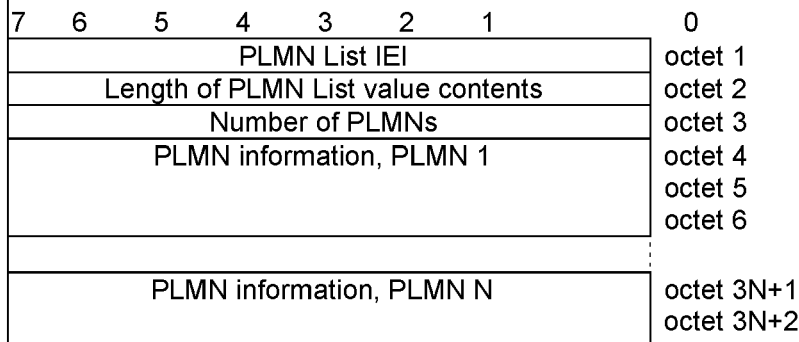

Figure 8.2.X.2.1.2-1: *PLMN List* information element

The "Number of PLMNs" (octet 3) contains the number of PLMN information items in the list. Bit 7 of octet 3 is the most significant bit and bit 0 of octet 3 the least significant bit.
The format of the PLMN information item according to 3GPP TS 24.007 [48] subclause 11.2.2.1 is shown in figure 8.2.X.2.2-2:

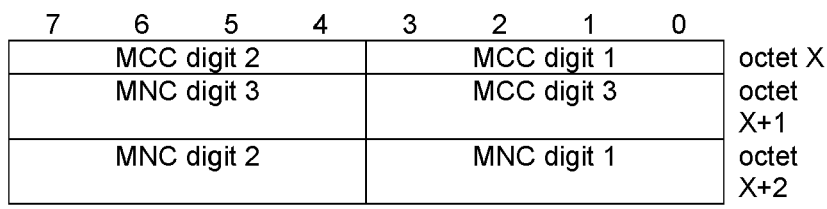

Figure 8.2.X.2.2-2: *PLMN information* item of the PLMN List IE

8.2.X.3 AT_ME_ID_attribute_RESP
8.2.X.3.1 General
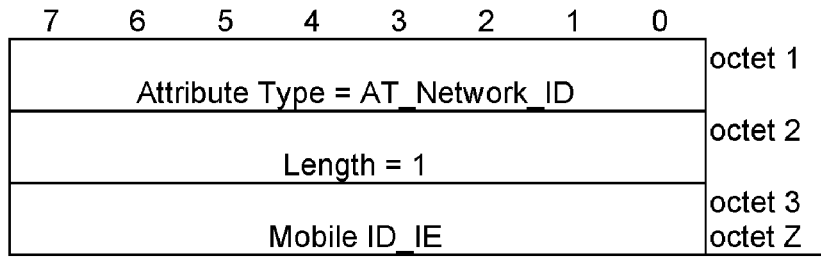
Figure 8.2.X.3-1: AT_ME_ID attribute_RESP
8.2.X.3.2 Mobile_ID_IE
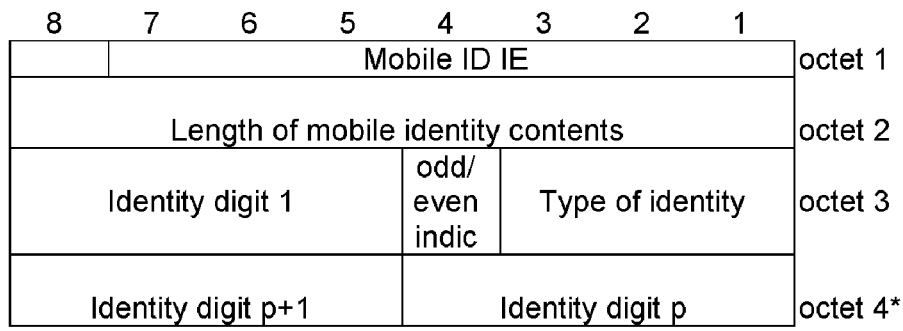
Figure 10.5.4/3GPP TS 24.008 *Mobile Identity* information element
```
Type of identity (octet 3)
Bits
3 2 1
0 0 1   IMSI
0 1 0   IMEI
0 1 1   IMEISV
1 0 0   TMSI/P-TMSI/M-TMSI
1 0 1   TMGI and optional MBMS Session Identity
0 0 0   No Identity (note 1)
```
Possible changes to 3GPP TS 24.302 [16]

APPENDIX U

4.2.2 EFIMPIMCPTT (user identities_for_MCPTT)

This EF contains the private user identity of the user for accessing MCPTT based services.

| Identifier: '6F02' | Structure: transparent | Mandatory |
|---|---|---|
| SFI: '02' | | |
| File size: X bytes | Update activity: low | |

Access Conditions:
    READ          PIN
    UPDATE      ADM
    DEACTIVATE  ADM
    ACTIVATE    ADM

| Bytes | Description | M/O | Length |
|---|---|---|---|
| 1 to X | NAI TLV data object (Private ID) | M | X bytes |
| | NAI TLV data object (Public ID) | O | |
| X+1 to X+3 | 1st PLMN (highest priority) | O | 3 bytes |
| X+4 to X+5 | 1st PLMN Access Technology Identifier | O | 2 bytes |
| X+6 to X+8 | 2nd PLMN | O | 3 bytes |
| X+9 to X+10 | 2nd PLMN Access Technology Identifier | O | 2 bytes |
| : | : | | |
| 36 to 38 | 8th PLMN | O | 3 bytes |
| 39 to 40 | 8th PLMN Access Technology Identifier | O | 2 bytes |

- NAI Private ID

Contents:

- Private user identity of the user.

Coding:

- For contents and syntax of NAI TLV data object values see IETF RFC 2486 [24]. The NAI shall be encoded to an octet string according to UTF-8 encoding rules as specified in IETF RFC 3629 [27]. The tag value of the NAI TLV data object shall be '80'.

- NAI Public ID

Contents:

- Private user identity of the user.

Coding:

- For contents and syntax of NAI TLV data object values see IETF RFC 2486 [24]. The NAI shall be encoded to an octet string according to UTF-8 encoding rules as specified in IETF RFC 3629 [27]. The tag value of the NAI TLV data object shall be '80'.

- PLMN

Contents:
- Mobile Country Code (MCC) followed by the Mobile Network Code (MNC).

Coding:
- according to TS 24.008 [9].
- Access Technology Identifier:

Coding:
- 2 bytes are used to select the access technology where the meaning of each bit is as follows:
  - bit = 1: access technology selected;
  - bit = 0: access technology not selected.

Byte5n-1:

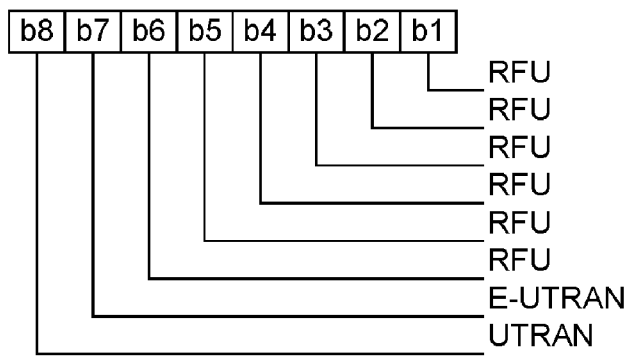

Byte 5n:

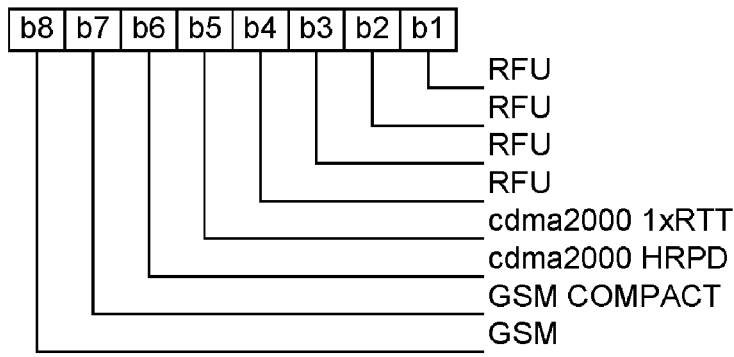

Possible changes to 3GPP TS 31.103

APPENDIX V

8.6 Command details

| Byte(s) | Description | Length |
|---|---|---|
| 1 | Command details tag | 1 |
| 2 | Length = '03' | 1 |
| 3 | Command number | 1 |
| 4 | Type of command | 1 |
| 5 | Command Qualifier | 1 |

Command number:
- Contents and coding: see clause 6.5.1.

Type of command:
- Contents:

- the Type of Command specifies the required interpretation of the data objects which follow, and the required terminal procedure;

- Coding:

- see clause 9.4;

- the terminal shall respond to reserved values (i.e. values not listed) with the result "Command type not understood".

Command Qualifier:
- Contents: qualifiers specific to the command;

- Coding:

- REFRESH:

- '00' = NAA Initialization and Full File Change Notification;

- '01' = File Change Notification;

- '02' = NAA Initialization and File Change Notification;

- '03' = NAA Initialization;

- '04' = UICC Reset;

- '05' = NAA Application Reset, only applicable for a 3G platform;

- '06' = NAA Session Reset, only applicable for a 3G platform;

- '07' = Reserved by 3GPP ("Steering of Roaming" REFRESH support);

- '08' = Reserved by 3GPP (Steering of Roaming for I-WLAN);

- '09' = Reserved by 3GPP (MCPTT Private User ID update);

- '0A' to 'FF' = reserved values.

- MORE TIME: this byte is RFU.

Possible Changes to ETSI TS 102 223

The invention claimed is:

1. A method, comprising:

transmitting, from a user equipment (UE) to a first network node, a first message requesting authentication configuration information, wherein the first message is formatted according to a first protocol, and the first network node is an identity management server;

in response to the first message, receiving, at the UE and from the identity management server, a second message that includes the authentication configuration information, wherein the authentication configuration information comprises, a phone number that is assigned to a Mission Critical Push to Talk (MCPTT) user identity, a public identity assigned by the identity management server during a user authentication process, and a private identity assigned by the identity management server during the user authentication process;

transmitting, from the UE to a second network node, a third message that includes authentication information based upon the received authentication configuration information, wherein the third message is formatted according to a second protocol, and the third message comprises the public identity and the private identity received in the second message;

in response to the third message that includes the public identity and the private identity, receiving, at the UE and from the second network node, an authentication challenge request that is formatted according to the second protocol; and in response to receiving the authentication challenge request, transmitting an authentication response to the second network node.

2. The method of claim 1, wherein the second network node comprises a Session Initiation Protocol (SIP) core.

3. The method of claim 1, wherein the first protocol is at least one of a Hypertext Transfer Protocol (HTTP), an Extensible Authentication Protocol (EAP), or a Session Initiation Protocol (SIP).

4. The method of claim 1, wherein the second protocol is a Session Initiation Protocol (SIP).

5. A user equipment (UE), comprising:

at least one hardware processor; and a non-transitory computer-readable storage medium coupled to the at least one hardware processor and storing programming instructions for execution by the at least one hardware processor, wherein the programming instructions instruct the at least one hardware processor to:

transmit, from the UE to a first network node, a first message requesting authentication configuration information, wherein the first message is formatted according to a first protocol, and the first network node is an identity management server;

in response to the first message, receive, from the identity management server, a second message that includes the authentication configuration information, wherein the authentication configuration information comprises, a phone number that is assigned to a Mission Critical Push to Talk (MCPTT) user identity, a public identity assigned by the identity management server during a user authentication process, and a private identity assigned by the identity management server during the user authentication process;

transmit, from the UE to a second network node, a third message that includes authentication information based upon the received authentication configuration information, wherein the third message is formatted according to a second protocol, and the third message comprises the public identity and the private identity received in the second message;

in response to the third message that includes the public identity and the private identity, receive, at the UE and from the second network node, an authentication challenge request that is formatted according to the second protocol; and in response to receiving the authentication challenge request, transmit an authentication response to the second network node.

6. The UE of claim 5, wherein the second network node comprises a Session Initiation Protocol (SIP) core.

7. The UE of claim 5, wherein the first protocol is at least one of a Hypertext Transfer Protocol (HTTP), an Extensible Authentication Protocol (EAP), or a Session Initiation Protocol (SIP).

8. The UE of claim 5, wherein the second protocol is a Session Initiation Protocol (SIP).

9. A method, comprising:

receiving, at a first network node, a first authentication request, wherein the first authentication request includes a first user identifier (ID) associated with a first Mission Critical Push to Talk (MCPTT) system, and the first network node is an identity management server;

determining that the first user ID is mapped to a second user ID that is associated with a second Mission Critical Push to Talk (MCPTT) system;

transmitting, from the first network node to a user equipment (UE), authentication configuration information, wherein the authentication configuration information includes a phone number that is assigned to the first ID, the second user and a third user ID, the second user ID comprises a private user identity assigned by the identity management server during a user authentication process, and the third user ID comprises a public user identity assigned by the identity management server during the user authentication process;

transmitting, from the first network node to a second network node, a second authentication request, wherein the second authentication request includes the second user ID;

in response to the second authentication request, receiving a first authentication response including an authentication response vector; and in response to receiving the first authentication response, transmitting a second authentication response including the authentication response vector.

10. The method of claim 9, wherein the first network node is part of a common services core.

11. The method of claim 9, wherein the authentication response vector is generated based on the second user ID.

* * * * *